United States Patent
Deng et al.

(10) Patent No.: US 11,616,965 B2
(45) Date of Patent: Mar. 28, 2023

(54) RESTRICTION ON APPLICABILITY OF CROSS COMPONENT MODE

(71) Applicants: Beijing Bytedance Network Technology Co., Ltd., Beijing (CN); Bytedance Inc., Los Angeles, CA (US)

(72) Inventors: Zhipin Deng, Beijing (CN); Li Zhang, San Diego, CA (US); Hongbin Liu, Beijing (CN); Kai Zhang, San Diego, CA (US); Jizheng Xu, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/479,192

(22) Filed: Sep. 20, 2021

(65) Prior Publication Data

US 2022/0030220 A1  Jan. 27, 2022

Related U.S. Application Data

(63) Continuation of application No. PCT/CN2020/085654, filed on Apr. 20, 2020.

(30) Foreign Application Priority Data

Apr. 18, 2019  (WO) ................. PCT/CN2019/083320

(51) Int. Cl.
*H04N 19/30* (2014.01)
*H04N 19/105* (2014.01)
(Continued)

(52) U.S. Cl.
CPC ........... *H04N 19/30* (2014.11); *H04N 19/105* (2014.11); *H04N 19/132* (2014.11);
(Continued)

(58) Field of Classification Search
CPC .............. H04N 19/105; H04N 19/146; H04N 19/176; H04N 19/196; H04N 19/96
See application file for complete search history.

(56) References Cited

U.S. PATENT DOCUMENTS

| 10,200,700 B2 | 2/2019 | Zhang et al. |
| 10,469,847 B2 | 11/2019 | Xiu et al. |

(Continued)

FOREIGN PATENT DOCUMENTS

| CN | 103139565 A | 6/2013 |
| CN | 103227917 A | 7/2013 |

(Continued)

OTHER PUBLICATIONS

Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1001, 2019.

(Continued)

*Primary Examiner* — Joseph W Becker
(74) *Attorney, Agent, or Firm* — Perkins Coie LLP

(57) ABSTRACT

A method for visual media processing, including performing a conversion between a current chroma chroma block of visual media data and a bitstream representation of the current chroma chroma block, wherein, during the conversion, a chroma residual of the current chroma chroma block is scaled based on a scaling coefficient, wherein the scaling coefficient is derived at least based on luma samples located in predefined positions.

20 Claims, 23 Drawing Sheets

Locations of the samples used for the derivation of α and β

(51) Int. Cl.
*H04N 19/176* (2014.01)
*H04N 19/186* (2014.01)
*H04N 19/132* (2014.01)
*H04N 19/70* (2014.01)
*H04N 19/146* (2014.01)
*H04N 19/196* (2014.01)
*H04N 19/96* (2014.01)

(52) U.S. Cl.
CPC ......... *H04N 19/146* (2014.11); *H04N 19/176* (2014.11); *H04N 19/186* (2014.11); *H04N 19/196* (2014.11); *H04N 19/70* (2014.11); *H04N 19/96* (2014.11)

(56) References Cited

U.S. PATENT DOCUMENTS

| | | | |
|---|---|---|---|
| 10,609,395 | B2 | 3/2020 | Kerofsky et al. |
| 10,652,588 | B2 | 5/2020 | Kerofsky et al. |
| 10,939,128 | B2 | 3/2021 | Zhang et al. |
| 10,979,717 | B2 | 4/2021 | Zhang et al. |
| 11,190,790 | B2 * | 11/2021 | Jang ................. H04N 19/44 |
| 11,284,084 | B1 | 3/2022 | Zhang et al. |
| 2011/0243232 | A1 | 10/2011 | Alshina et al. |
| 2014/0010300 | A1 | 1/2014 | Rapaka et al. |
| 2014/0086502 | A1 | 3/2014 | Guo et al. |
| 2014/0307773 | A1 | 10/2014 | Minoo et al. |
| 2015/0016512 | A1 | 1/2015 | Pu et al. |
| 2015/0373343 | A1 | 12/2015 | Hendry et al. |
| 2017/0105014 | A1 | 4/2017 | Lee et al. |
| 2017/0244975 | A1 | 8/2017 | Huang et al. |
| 2017/0272749 | A1 | 9/2017 | Pettersson et al. |
| 2018/0063527 | A1 | 3/2018 | Chen et al. |
| 2018/0063531 | A1 | 3/2018 | Hu et al. |
| 2018/0167615 | A1 | 6/2018 | Kim et al. |
| 2018/0176594 | A1 | 6/2018 | Zhang et al. |
| 2019/0116376 | A1 | 4/2019 | Chen et al. |
| 2019/0320191 | A1 | 10/2019 | Song et al. |
| 2019/0349607 | A1 | 11/2019 | Kadu et al. |
| 2020/0252619 | A1 | 8/2020 | Zhang et al. |
| 2020/0267392 | A1 | 8/2020 | Lu et al. |
| 2020/0288126 | A1 | 9/2020 | Hu et al. |
| 2020/0288159 | A1 | 9/2020 | Van Der Auwera et al. |
| 2020/0288173 | A1 | 9/2020 | Ye et al. |
| 2020/0359051 | A1 | 11/2020 | Zhang et al. |
| 2020/0366896 | A1 | 11/2020 | Zhang et al. |
| 2020/0366910 | A1 | 11/2020 | Zhang et al. |
| 2020/0366933 | A1 | 11/2020 | Zhang et al. |
| 2020/0382769 | A1 | 12/2020 | Zhang et al. |
| 2020/0382771 | A1 | 12/2020 | Liu et al. |
| 2020/0382800 | A1 | 12/2020 | Zhang et al. |
| 2020/0396453 | A1 | 12/2020 | Zhang et al. |
| 2020/0396458 | A1 | 12/2020 | Francois et al. |
| 2021/0029361 | A1 | 1/2021 | Lu et al. |
| 2021/0092395 | A1 | 3/2021 | Zhang et al. |
| 2021/0092396 | A1 | 3/2021 | Zhang et al. |
| 2021/0112262 | A1 | 4/2021 | Jang |
| 2021/0211738 | A1 | 7/2021 | Yin et al. |
| 2021/0329273 | A1 | 10/2021 | Rusanovskyy et al. |
| 2021/0385469 | A1 | 12/2021 | Deng et al. |
| 2021/0392351 | A1 | 12/2021 | Deng et al. |
| 2021/0400257 | A1 | 12/2021 | Zhao et al. |
| 2021/0409753 | A1 | 12/2021 | Rufitskiy et al. |
| 2022/0030257 | A1 | 1/2022 | Deng et al. |
| 2022/0086428 | A1 | 3/2022 | Lim et al. |
| 2022/0109885 | A1 | 4/2022 | Deng et al. |
| 2022/0217405 | A1 | 7/2022 | Paluri et al. |

FOREIGN PATENT DOCUMENTS

| | | |
|---|---|---|
| CN | 104471940 A | 3/2015 |
| CN | 104521232 A | 4/2015 |
| CN | 104620574 A | 5/2015 |
| CN | 104685872 A | 6/2015 |
| CN | 105049843 A | 11/2015 |
| CN | 105637866 A | 6/2016 |
| CN | 105706451 A | 6/2016 |
| CN | 105723707 A | 6/2016 |
| CN | 105981381 A | 9/2016 |
| CN | 107079157 A | 8/2017 |
| CN | 107439012 A | 12/2017 |
| CN | 109005408 A | 12/2018 |
| CN | 109155853 A | 1/2019 |
| CN | 109196867 A | 1/2019 |
| CN | 109417620 A | 3/2019 |
| CN | 109479133 A | 3/2019 |
| CN | 109691102 A | 4/2019 |
| CN | 109804625 A | 5/2019 |
| EP | 3386198 A1 | 10/2018 |
| EP | 3703366 A1 | 9/2020 |
| EP | 3932063 A1 | 1/2022 |
| EP | 3949395 A1 | 2/2022 |
| EP | 3977738 A1 | 4/2022 |
| JP | 2012080571 A | 4/2012 |
| JP | 20212780 A | 1/2021 |
| JP | 2022532277 A | 7/2022 |
| WO | 2009050889 A1 | 4/2009 |
| WO | 2012090504 A1 | 7/2012 |
| WO | 2015066525 A1 | 5/2015 |
| WO | 2016066028 A1 | 5/2016 |
| WO | 2016123219 A1 | 8/2016 |
| WO | 2016132145 A1 | 8/2016 |
| WO | 2016164235 A1 | 10/2016 |
| WO | 2017019818 A2 | 2/2017 |
| WO | 2017091759 A1 | 6/2017 |
| WO | 2017144881 A1 | 8/2017 |
| WO | 2017158236 A2 | 9/2017 |
| WO | 2017165494 A2 | 9/2017 |
| WO | 2018016381 A1 | 1/2018 |
| WO | 2018045207 A1 | 3/2018 |
| WO | 2018118940 A1 | 6/2018 |
| WO | 2018132475 A1 | 7/2018 |
| WO | 2019006300 A1 | 1/2019 |
| WO | 2020176459 A1 | 9/2020 |
| WO | 2020211862 A1 | 10/2020 |

OTHER PUBLICATIONS

Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N1001, 2019.

Chen et al. "Algorithm Description for Versatile Video Coding and Test Model 4 (VTM 4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1002, 2019.

Chen et al. "Algorithm description for Versatile Video Coding and Test Model 5 (VTM 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N 1002, 2019.

Chen et al. ""Description of Core Experiment 2 (CE2): Luma-Chroma Dependency Reduction,"" Joint Video Experts Team (JVET)of ITU-T SG 16 WP 3 and ISO/IEC JTC 1/SC 29/WG 1114th Meeting: Geneva, CH, Mar. 19-27, 2019, document JVET-N 1022, 2019.

Francois et al. "Chroma Residual Scaling with Separate Luma/Chroma Tree," Joint Video Experts Team (JVET) of ITU-T SG 16 WP3 and ISO/IEC JTC 1/SC 29/WG 11, 14th Meeting, Geneva, Mar. 19-27, 2019, document JVET-N0389, 2019.

Francois et al. "AHG16/Non-CE3: Study of CCLM Restrictions in Case of Separate Luma/Chroma Tree," Joint Video Experts Team (JVET) of ITU-T SG 16 WP3 and ISO/IEC JTC 1/SC 29/WG 11, 14th Meeting, Geneva, Mar. 27, 2019, document JVET-N0390, 2019.

Francois et al. ""Suggested Luma Mapping with Chroma Scaling Modifications in N0220/N0389/N0477,"" Joint Video Experts Team (JVET)of ITU-T SG 16 WP 3 and ISO/IEC JTC 1/SC 29/WG 1114th Meeting: Geneva, CH, Mar. 19-27, 2019, document JVET-N0806, 2019.

(56) References Cited

OTHER PUBLICATIONS

"High Efficiency Video Coding," Series H: Audiovisual and Multimedia Systems: Infrastructure of Audiovisual Services—Coding of Moving Video, ITU-T Telecommunication Standardization Sector of ITU, H.265, Nov. 2019.
Huo et al. ""CE3-1.5: Cclm Derived with Four Neighbouring Samples,"" Joint Video Experts Team (JVET)of ITU-T SG 16 WP 3 and ISO/IEC JTC 1/SC 29/WG 1114th Meeting: Geneva, CH, Mar. 19-27, 2019, document JVET-N0271, 2019.
Lin et al. ""AHG16: Subblock-Based Chroma Residual Scaling,"" Joint Video Experts Team (JVET)of ITU-T SG 16 WP 3 and ISO/IEC JTC 1/SC 29/WG 1114th Meeting: Geneva, CH, Mar. 19-27, 2019, document JVET-N0113, 2019.
Lu et al. "CE12: Mapping Functions (Test CE12-1 and CE12-2)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0427, 2019.
Lu et al. "AHG16: Simplification of Reshaper Information," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0220, 2019.
Luo et al. "CE2-Related: Prediction Refinement with Optical Flow for Affine Mode," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0236, 2019.
Pfaff et al. "CE3: Affine Linear Weighted Intra Prediciton (CE3-4.1, CE3-4.2)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0217, 2019.
Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2016, document JCTVC-Y1002, 2016.
Wang et al. ""AHG17: Signalling of reshaper parameters in APS,"" Joint Video Experts Team (JVET)of ITU-T SG 16 WP 3 and ISO/IEC JTC 1/SC 29/WG 1114th Meeting: Geneva, CH, Mar. 19-27, 2019, document JVET-N0117, 2019.
Ye et al. ""On Luma Mapping with Chroma Scaling,"" Joint Video Experts Team (JVET)of ITU-T SG 16 WP 3 and ISO/IEC JTC 1/SC 29/WG 1114th Meeting: Geneva, CH, Mar. 19-27, 2019, document JVET-N0477, 2019.
Zhao et al. ""On Luma Dependent Chroma Residual Scaling of In-loop Reshaper,"" Joint Video Experts Team (JVET) of ITU-T SG 16 WP 3 and ISO/IEC JTC 1/SC 29/WG 1114th Meeting: Geneva, CH, Mar. 19-27, 2019, document JVET-N0299, 2019.
VTM software: https://vcgit.hhi.fraunhofer.de/jvet/VVCSoftware_VTM.git.
International Search Report and Written Opinion from International Patent Application No. PCT/CN2020/085654 dated Jul. 20, 2020 (9 pages).
International Search Report and Written Opinion from International Patent Application No. PCT/CN2020/085655 dated Jul. 21, 2020 (10 pages).
International Search Report and Written Opinion from International Patent Application No. PCT/CN2020/085672 dated Jul. 20, 2020 (10 pages).
International Search Report and Written Opinion from International Patent Application No. PCT/CN2020/085674 dated Jul. 14, 2020 (12 pages).
International Search Report and Written Opinion from International Patent Application No. PCT/CN2020/086111 dated Jul. 22, 2020 (12 pages).
International Search Report and Written Opinion from International Patent Application No. PCT/CN2020/089096 dated Aug. 14, 2020 (12 pages).
International Search Report and Written Opinion from International Patent Application No. PCT/CN2020/097374 dated Oct. 10, 2020 (10 pages).
International Search Report and Written Opinion from International Patent Application No. PCT/CN2020/100573 dated Oct. 13, 2020 (9 pages).
Non Final Office Action from U.S. Appl. No. 17/405,236 dated Dec. 17, 2021.
Non Final Office Action from U.S. Appl. No. 17/405,212 dated Dec. 24, 2021.
Notice of Allowance from U.S. Appl. No. 17/406,284 dated Jan. 4, 2022.
Non Final Office Action from U.S. Appl. No. 17/494,974 dated Jan. 24, 2022.
Bross et al. "Versatile Video Coding (Draft 2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.
Bross et al. "Versatile Video Coding (Draft 3)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L1001, 2018.
Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N 1001, 2019. (v10).
Chen et al. "Algorithm Description of Joint Exploration Test Model 7 (JEM 7)," Joint Video Exploration Team (JVET) of TU-T SG 16 WP 3 and ISO/IEC JTC 1/SC 29/WG 11, 7th Meeting: Torino, IT, Jul. 13-21, 2017, document JVET-G1001, 2017.
Chen et al. "CE4: Separate List for Sub-Block Merge Candidates (Test 4.2.8)," Joint Video Experts Team (JVET) of TU-T SG 16 WP 3 and ISO/IEC JTC 1/SC 29/WG 11, 12th Meeting, Macao, CN, Oct. 3-12, 2018, document JVET-L0369, 2018.
Chen et al. "Crosscheck of JVET-L0142 (CE4: Simplification of the Common Base for Affine Merge (Test 4.2.6))," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0632, 2018.
Chen et al. "Description of Core Experiment 2 (CE2): Luma-Chroma Dependency Reduction," Joint Video Experts Team (JVET) of ITU-T SG 16 WP 3 and ISO/IEC JTC 1/SC 29/WG 11 14th Meeting: Geneva, CH, Mar. 19-27, 2019, document JVET-M1022, 2019.
Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0100, 2018.
Francois et al. "CE12-Related: Block-Based In-Loop Luma Reshaping," Joint Video Experts Team (JVET) of ITU-T SG 16 WP 3 and ISO/IEC JTC 1/SC 29/WG 11, 13th Meeting, Marrakech, MA Jan. 9-18, 2019, document JVET-M0109, 2019.
Francois et al. "CE12-Related: In-Loop Luma Reshaping with Approximate Inverse Mapping Function," Joint Video Experts Team (JVET) of ITU-T SG 16 WP 3 and ISO/IEC JTC 1/SC 29/WG 11, 13th Meeting, Marrakech, MA Jan. 9-18, 2019, document JVET-M0640, 2019.
Han et al. "CE4.1 3: Affine Motion Compensation Prediction," Joint Video Exploration Team (JVET) of ITU-T SG 16 NP 3 and ISO/IEC JTC 1/SC 29/WG 11, 11th Meeting, Ljubljana, SI, Jul. 10-18, 2018, document JVET-K0337, 2018.
"Information Technology—High Efficiency Coding and Media Delivery in Heterogeneous Environments—Part 2: High Efficiency Video Coding" Apr. 20, 2018, ISO/DIS 23008, 4th Edition.
Jeong et al. "CE4 Ultimate Motion Vector Expression (Test 4.5.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0054, 2018.
Jung et al. "AHG16/CE3-Related: CCLM Mode Restriction for Increasing Decoder Throughput," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0376, 2019.
Lee et al. "CE4: Simplification of the Common Base for Affine Merge (Test 4.2.2)," Joint Video Experts Team (JVET) of ITU-T SG

(56) References Cited

OTHER PUBLICATIONS

16 WP 3 and ISO/IEC JTC 1/SC 29/WG 11, 12th Meeting, Macau, CN, Oct. 8-12, 2012, document JVET-L0142, 2018.

Pu et al. "CE12-4: SDR In-Loop Reshaping," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0246, 2018.

Rasch et al. "CE10: Uniform Directional Diffusion Filters for Video Coding," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0157, 2018.

Rusanovskyy et al. "CE14: Test on In-Loop Bilateral Filter From JVET-J0021/JVET-K0384 with Parametrization (CE14.2)," Joint Video Experts Team (JVET) of ITU-T SG 16 WP 3 and ISO/IEC JTC 1/SC 29/WG 11, 12th Meeting, Macao, CN, 3-12, Oct. 2018, document JVET-L0406, 2018.

Sethuraman, Sriram. "CE9: Results of DMVR Related Tests CE9.2.1 and CE9.2.2," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0147, 2019.

Stepin et al. "CE2 Related: Hadamard Transform Domain Filter," Joint Video Expters Team (JVET) of ITU-T SG 16 and ISO/IEC JTC 1/SC 29/WG 11, 11th Meeting, Ljubljana, SI, Jul. 10-18, 2018, document JVET-K0068, 2018.

Wang et al. "AHG17: On Header Parameter Set (HPS)," Joint Video Experts Team (JVET) of ITU-T SG 16 WP 3 and SO/IEC JTC 1/SC 29/WG 11, 13th Meeting, Marrakech, MA, Jan. 9-18, 2019, document JVET-M0132, 2019.

JEM-7.0: https://jvet.hhi.fraunhofer.de/svn/svn_HMJEMSoftware/tags/HM-16.6-JEM-7_0.

https://vcgit.hhi.fraunhofer.de/jvet/VVCSoftware_VTM/tags/VTM-2.1.

English Translation of JP2021002780A (Takeshi et al. Video Decoding Device and Video Coding Device).

Partial Supplementary European Search Report from European Patent Application No. 20791687.5 dated Mar. 30, 2022 (14 pages).

International Search Report and Written Opinion from International Patent Application No. PCT/CN2020/078385 dated Jun. 4, 2020 (10 pages).

International Search Report and Written Opinion from International Patent Application No. PCT/CN2020/078388 dated May 29, 2020 (10 pages).

International Search Report and Written Opinion from International Patent Application No. PCT/CN2020/078393 dated Jun. 5, 2020 (9 pages).

Non Final Office Action from U.S. Appl. No. 17/357,093 dated Aug. 19, 2021.

Non Final Office Action from U.S. Appl. No. 17/357,166 dated Oct. 5, 2021.

Final Office Action from U.S. Appl. No. 17/357,166 dated Jan. 28, 2022.

Non Final Office Action from U.S. Appl. No. 17/546,621 dated Apr. 4, 2022.

Chubach et al. "CE7-Related: Support of Quantization Matrices for VVC," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0847, 2019. (cited in EP20792015.8 EESR dated Jun. 15, 2022).

Zhao et al. "CE2-Related: CCLM for Dual Tree with 32×32 Latency," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O0196, 2019. (cited in EP20801570.1 EESR dated May 27, 2022).

Extended European Search Report from European Patent Application No. 20801570.1 dated May 27, 2022 (15 pages).

Extended European Search Report from European Patent Application No. 20792015.8 dated Jun. 15, 2022 (9 pages).

Chen et al. "CE2: Related: Luma-Chroma Dependency Reduction on Chroma Scaling," Joint Video Experts (JVET) of ITU-T SG 16 WP 3 AND ISO/IEC JTC 1/SC 29/WG 11 15th Meeting Gothenburg SE, Jul. 3-12, 2019, document JVET-O0627, 2019. (cited in EP 20836333.3 ESSR dated Jul. 14, 2022).

Chen et al. "Non-CE2: Unification of Chroma Residual Scaling Design," Joint Video Experts Team (JVET) of ITU-T SG 16 WP 3 and ISO/IEC JTC 1/SC 29/WG 11 15th Meeting, Gothenburg SE Jul. 3-12, 2019, document JVET-O1109, 2019. (cited in EP20836333.3 EESR dated Jul. 14, 2022).

Lu et al. "CE12-Related: Universal Low complexity Reshaper for SDR and HDR Video," Joint Video Experts Team (JVET) of ITU-SG 16 WP 3 AND ISO/IEC JTC 1/SC 29/WG 11 12th Meeting: Macao, CN, Oct. 3-12, 2018, document JVET-L0247, 2018. (cited in JP2021-551761 OA1 dated Aug. 9, 2022).

Lu et al. "Non-CE2: Alternative Solutions for Chroma Residual Scaling Factors Derivation for Dual Tree," Joint Video Experts Team (JVET) of ITU-T SG 16 WP 3 and ISO/IEC JTC 1/SC 29/WG 11 15th Meeting Gothenburg SE, Jul. 3-12, 2019, document JVET-O0429, 2019. (cited in EP20836333.3 EESR dated Jul. 14, 2022).

Extended European Seach Report from European Patent Application No. 20836333.3 dated Jul. 14, 2022 (8 pages).

Extended European Search Report from European Patent Application No. 20791687.5 dated Jul. 18, 2022 (16 pages).

Extended European Search Report from European Patent Application No. 2083291.9 dated Aug. 1, 2022 (11 pages).

Extended European Search Report from European Patent Application No. 20795818.2 dated Aug. 19, 2022 (14 pages).

Non-Final Office Action from U.S. Appl. No. 17/406,284 dated Aug. 30, 2022.

Chen et al. "Single Depth Intra Coding Mode in 3D-HEVC," Proceeding of 2015 IEEE International Symposium on Circuits and Systems (May 27, 2015) IEEE pp. 1130-1133, ISBN:978-1-4799-8391-9<doi:10.1109/ISCAS.2015.7168837>(cited in JP2021-559969 OA dated Nov. 15, 2022).

Notice of Allowance from U.S. Appl. No. 17/546,621 dated Nov. 30, 2022.

\* cited by examiner

An example of "collocated" luma block and "corresponding" luma block of the current chroma block in different color formats An example of "collocated" block and "corresponding" block of the current block in the same color component An example of a collocated luma block covering multiple partitions An example of a corresponding luma block within a bigger luma partion block

1600

1602 performing a conversion between a current video block of visual media data and a bitstream representation of the current video block, wherein, during the conversion, one or more luma prediction samples or luma reconstruction samples in a current frame other than a reference frame and are used to derive a chroma residual scaling factor in a luma mapping with chroma scaling (LMCS) mode processing step

1902 — during a conversion between a current chroma video block of visual media data and a bitstream representation of the current chroma video block, making a determination of selectively enabling or disabling application of a cross-component linear model (CCLM) and/or a chroma residual scaling (CRS) on the current chroma video block, based at least in part on one or more conditions associated with a collocated luma block of the current chroma video block

2002 — selectively enabling or disabling application of a luma dependent chroma residual scaling (CRS) on chroma components of a current video block of visual media data for encoding the current video block in a video region of a visual media data into a bitstream representation of the visual media data 2004 — making a determination of including or excluding a field in the bitstream representation of the visual media data, wherein the field is indicative of the selectively enabling or disabling and, if included, is signaled, other than at a first syntax level associated with the current video block

2202 — selectively enabling or disabling application of a cross-component linear model (CCLM) on a current video block of visual media data for encoding the current video block into a bitstream representation of the visual media data 2204 — making a determination of including or excluding a field in a bitstream representation of the visual media data, wherein the field is indicative of the selectively enabling or disabling and, if included, is signaled, other than at a first syntax level associated with the current video block

FIG. 22

RESTRICTION ON APPLICABILITY OF CROSS COMPONENT MODE

CROSS REFERENCE TO RELATED APPLICATIONS

This application is a continuation of International Application No. PCT/CN2020/085654, filed on Apr. 20, 2020, which claims the priority to and benefit of International Patent Application No. PCT/CN2019/083320, filed on Apr. 18, 2019. All the aforementioned patent applications are hereby incorporated by reference in their entireties.

TECHNICAL FIELD

This patent document relates to video coding and decoding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding/decoding, and specifically, simplified linear model derivations for the cross-component linear model (CCLM) prediction mode in video coding/decoding are described. The described methods may be applied to both the existing video coding standards (e.g., High Efficiency Video Coding (HEVC)) and future video coding standards (e.g., Versatile Video Coding (VVC)) or codecs.

In one representative aspect, a method for visual media processing is disclosed. The method includes performing a conversion between a current chroma video block of visual media data and a bitstream representation of the current chroma video block, wherein, during the conversion, a chroma residual of the current chroma video block is scaled based on a scaling coefficient, wherein the scaling coefficient is derived at least based on luma samples located in pre-defined positions.

In one representative aspect, a method for visual media processing is disclosed. The method includes performing a conversion between a current video block of visual media data and a bitstream representation of the current video block, wherein, during the conversion, a second set of color component values of the current video block are derived, using a cross-component linear model (CCLM) and/or a luma mapping with chroma scaling (LMCS) mode processing step, from a first set of color component values of the visual media data.

In another representative aspect, a method for visual media processing is disclosed. The method includes performing a conversion between a current video block of visual media data and a bitstream representation of the current video block, wherein, during the conversion, one or more reconstruction samples associated with a current frame of the visual media data are used to derive a chroma residual scaling factor in a luma mapping with chroma scaling (LMCS) mode processing step.

In another representative aspect, a method for visual media processing is disclosed. The method includes performing a conversion between a current video block of visual media data and a bitstream representation of the current video block, wherein, during the conversion, one or more luma prediction samples or luma reconstruction samples in a current frame other than a reference frame and are used to derive a chroma residual scaling factor in a luma mapping with chroma scaling (LMCS) mode processing step.

In another representative aspect, a method for visual media processing is disclosed. The method includes checking, during a conversion between a current chroma video block and a bitstream representation of the current chroma video block, availability of one or more neighboring luma blocks of a corresponding luma block which covers a top-left sample of a collocated luma block; determining, based on the availability of one or more neighboring luma blocks, whether to retrieve neighboring luma samples of the corresponding luma block; deriving, based on the determining, a scaling coefficient; scaling, based on the scaling coefficient, a chroma residual of the current chroma video block to generate a scaled chroma residual; and performing the conversion based on the scaled chroma residual.

In another representative aspect, a method for visual media processing is disclosed. The method includes deriving, during a conversion between a current video block of visual media data and a bitstream representation of the current video block, a second set of color component values of the current video block from a first set of color component values of the visual media data using a model associated with a processing step, wherein the first set of color component values are neighboring samples of a corresponding luma block which covers a top-left sample of a collocated luma block.

In another representative aspect, a method for visual media processing is disclosed. The method includes during a conversion between a current chroma video block of visual media data and a bitstream representation of the current chroma video block, making a determination of selectively enabling or disabling application of a cross-component linear model (CCLM) and/or a chroma residual scaling (CRS) on the current chroma video block, based at least in part on one or more conditions associated with a collocated luma block of the current chroma video block.

In another representative aspect, a method for visual media processing is disclosed. The method includes selectively enabling or disabling application of a luma dependent chroma residual scaling (CRS) on chroma components of a current video block of visual media data for encoding the current video block in a video region of a visual media data into a bitstream representation of the visual media data; and making a determination of including or excluding a field in the bitstream representation of the visual media data, wherein the field is indicative of the selectively enabling or disabling and, if included, is signaled, other than at a first syntax level associated with the current video block.

In another representative aspect, a method for visual media processing is disclosed. The method includes parsing a field in a bitstream representation of visual media data, wherein the field is included in a level other than at a first syntax level associated with a current video block; and selectively enabling or disabling, based on the field, application of a luma dependent chroma residual scaling (CRS) on chroma components of the current video block of visual media data for generating a decoded video region from the bitstream representation.

In another representative aspect, a method for visual media processing is disclosed. The method includes selectively enabling or disabling application of a cross-component linear model (CCLM) on a current video block of visual media data for encoding the current video block into a bitstream representation of the visual media data; and making a determination of including or excluding a field in a bitstream representation of the visual media data, wherein the field is indicative of the selectively enabling or disabling and, if included, is signaled, other than at a first syntax level associated with the current video block.

In another representative aspect, a method for visual media processing is disclosed. The method includes parsing a field in a bitstream representation of visual media data, wherein the field is included a level other than at a first syntax level associated with a current video block; and selectively enabling or disabling, based on the field, application of a cross-component linear model (CCLM) on the current video block of visual media data for generating a decoded video region from the bitstream representation.

In yet another example aspect, a video encoder or decoder apparatus comprising a processor configured to implement an above described method is disclosed.

In another example aspect, a computer readable program medium is disclosed. The medium stores code that embodies processor executable instructions for implementing one of the disclosed methods.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

The above and other aspects and features of the disclosed technology are described in greater detail in the drawings, the description and the claims.

BRIEF DESCRIPTION OF THE DRAWINGS

FIG. 16 shows a flowchart of an example method for visual media processing.

FIG. 19 shows a flowchart of an example method for visual media processing.

FIG. 20 shows a flowchart of an example method for visual media processing

FIG. 22 shows a flowchart of an example method for visual media processing.

DETAILED DESCRIPTION 2.1 A Brief Review on HEVC 2.1.1 Intra Prediction in HEVC/H.265

Intra prediction involves producing samples for a given TB (transform block) using samples previously reconstructed in the considered colour channel. The intra prediction mode is separately signalled for the luma and chroma channels, with the chroma channel intra prediction mode optionally dependent on the luma channel intra prediction mode via the 'DM_CHROMA' mode. Although the intra prediction mode is signalled at the PB (prediction block) level, the intra prediction process is applied at the TB level, in accordance with the residual quad-tree hierarchy for the CU, thereby allowing the coding of one TB to have an effect on the coding of the next TB within the CU, and therefore reducing the distance to the samples used as reference values.

Figure 1:
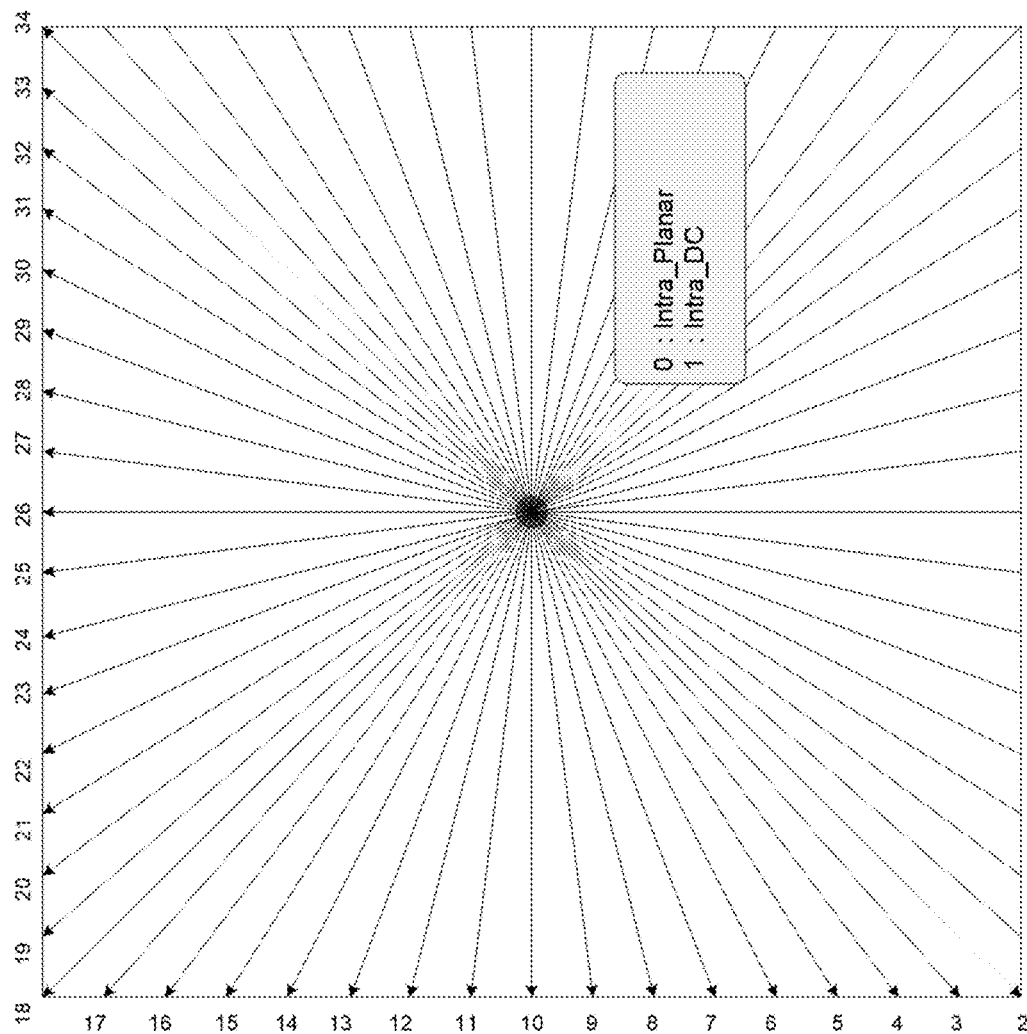
FIG. 1 shows an example of angular intra prediction modes in HEVC.

HEVC includes 35 intra prediction modes—a DC mode, a planar mode and 33 directional, or 'angular' intra prediction modes. The 33 angular intra prediction modes are illustrated in FIG. 1.

For PBs associated with chroma colour channels, the intra prediction mode is specified as either planar, DC, horizontal, vertical, 'DM_CHROMA' mode or sometimes diagonal mode '34'.

Note for chroma formats 4:2:2 and 4:2:0, the chroma PB may overlap two or four (respectively) luma PBs; in this case the luma direction for DM_CHROMA is taken from the top left of these luma PBs.

The DM_CHROMA mode indicates that the intra prediction mode of the luma colour channel PB is applied to the chroma colour channel PBs. Since this is relatively common, the most-probable-mode coding scheme of the intra_chroma_pred_mode is biased in favor of this mode being selected.

2.2 Versatile Video Coding (VVC) Algorithm Description 2.2.1 VVC Coding Architecture To explore the future video coding technologies beyond HEVC, Joint Video Exploration Team (JVET) was founded by VCEG and MPEG jointly in 2015. The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

As in most preceding standards, VVC has a block-based hybrid coding architecture, combining inter-picture and intra-picture prediction and transform coding with entropy coding. The picture partitioning structure divides the input video into blocks called coding tree units (CTUs). A CTU is split using a quadtree with nested multi-type tree structure into coding units (CUs), with a leaf coding unit (CU) defining a region sharing the same prediction mode (e.g. intra or inter). In this document, the term 'unit' defines a region of an image covering all colour components; the term 'block' is used to define a region covering a particular colour component (e.g. luma), and may differ in spatial location when considering the chroma sampling format such as 4:2:0.

2.2.2 Dual/Separate Tree Partition in VVC

Luma component and chroma component can have separate partition trees for I slices. Separate tree partitioning is under 64×64 block level instead of CTU level. In VTM software, there is an SPS flag to control the dual-tree on and off.

2.2.3 Intra Prediction in VVC

2.2.3.1 67 Intra Prediction Modes

Figure 2:
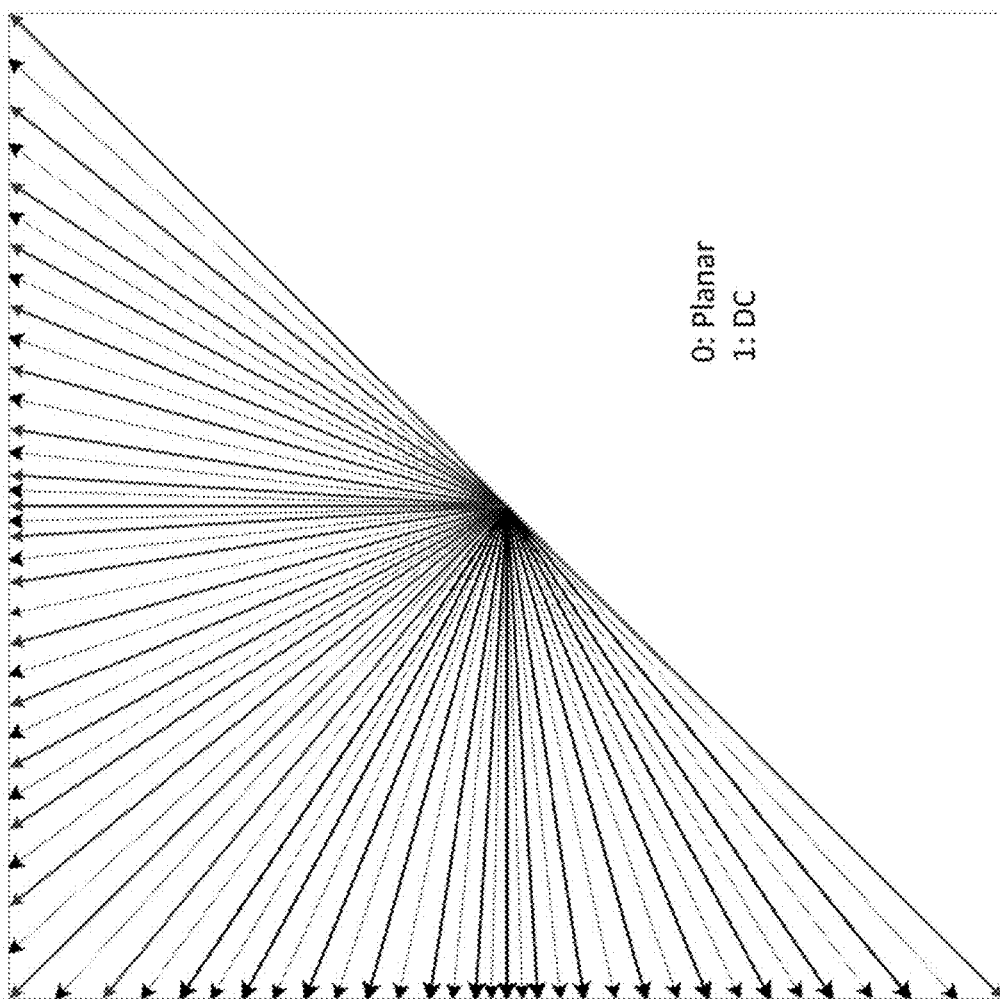
FIG. 2 shows an example of directional modes not in HEVC.

To capture the arbitrary edge directions presented in natural video, the number of directional intra modes in VTM4 is extended from 33, as used in HEVC, to 65. The new directional modes not in HEVC are depicted as red dotted arrows in FIG. 2, and the planar and DC modes remain the same. These denser directional intra prediction modes apply for all block sizes and for both luma and chroma intra predictions.

2.2.3.2 Cross-Component Linear Model Prediction (CCLM)

Figure 3:
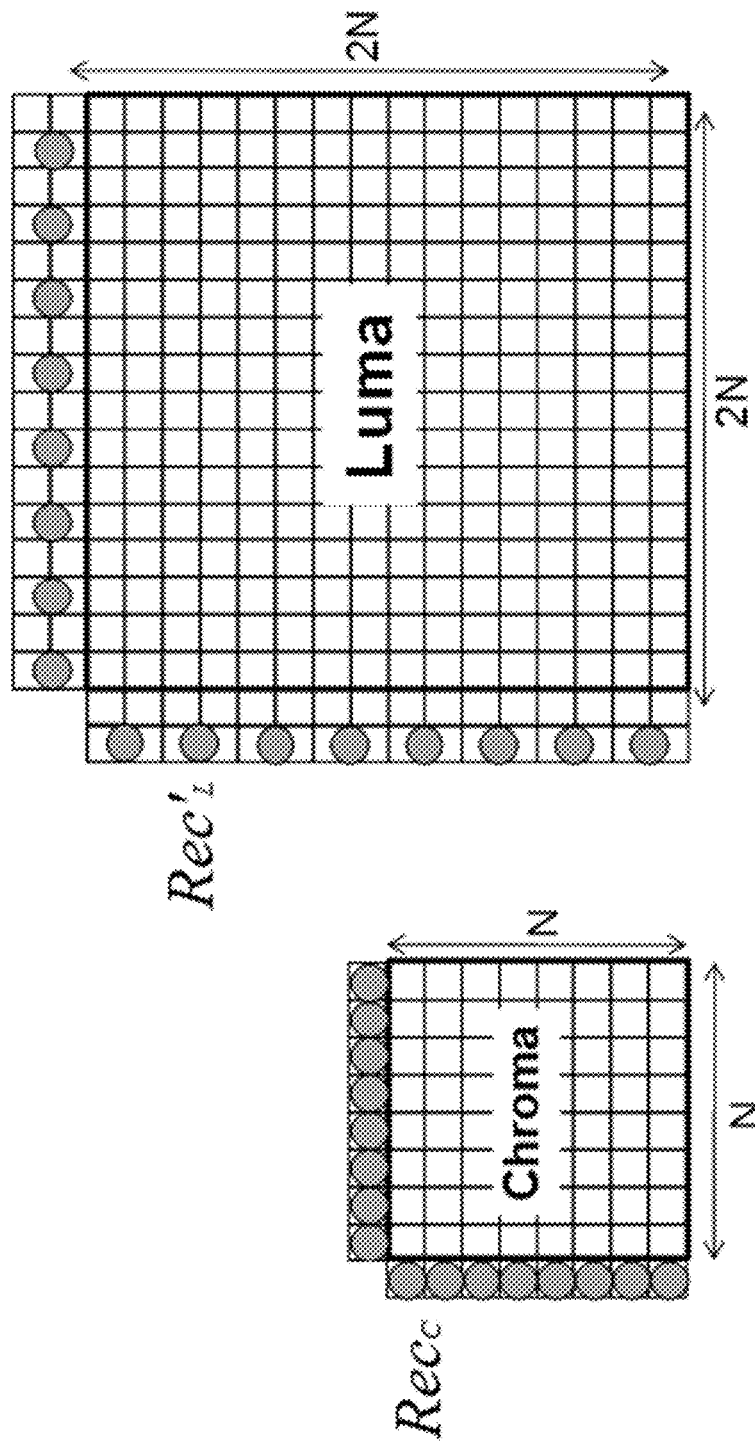
FIG. 3 shows an example in connection with the CCLM mode.

To reduce the cross-component redundancy, a cross-component linear model (CCLM) prediction mode is used in the VTM4, for which the chroma samples are predicted based on the reconstructed luma samples of the same CU by using a linear model as follows:

$$pred_C(i,j) = \alpha \cdot rec_L(i,j) + \beta$$

where $pred_C(i,j)$ represents the predicted chroma samples in a CU and $rec_L(i,j)$ represents the downsampled reconstructed luma samples of the same CU. Linear model parameter $\alpha$ and $\beta$ are derived from the relation between luma values and chroma values from two samples, which are luma sample with minimum sample value and with maximum sample inside the set of downsampled neighboring luma samples, and their corresponding chroma samples. The linear model parameters $\alpha$ and $\beta$ are obtained according to the following equations.

$$\alpha = \frac{Y_a - Y_b}{X_a - X_b}$$

$$\beta = Y_b - \alpha \cdot X_b$$

Where $Y_a$ and $X_a$ represent luma value and chroma value of the luma sample with maximum luma sample value. And $X_b$ and $Y_b$ represent luma value and chroma value of the luma sample with minimum luma sample, respectively. FIG. 3 shows an example of the location of the left and above samples and the sample of the current block involved in the CCLM mode.

The division operation to calculate parameter $\alpha$ is implemented with a look-up table. To reduce the memory required for storing the table, the diff value (difference between maximum and minimum values) and the parameter a are expressed by an exponential notation. For example, diff is approximated with a 4-bit significant part and an exponent. Consequently, the table for 1/diff is reduced into 16 elements for 16 values of the significand as follows:

DivTable[ ]={0,7,6,5,5,4,4,3,3,2,2,1,1,1,1,0}

This would have a benefit of both reducing the complexity of the calculation as well as the memory size required for storing the needed tables Besides the above template and left template can be used to calculate the linear model coefficients together, they also can be used alternatively in the other 2 LM modes, called LM_A, and LM_L modes.

In LM_A mode, only the above template are used to calculate the linear model coefficients. To get more samples, the above template are extended to (W+H). In LM_L mode, only left template are used to calculate the linear model coefficients. To get more samples, the left template are extended to (H+W).

For a non-square block, the above template are extended to W+W, the left template are extended to H+H.

To match the chroma sample locations for 4:2:0 video sequences, two types of downsampling filter are applied to luma samples to achieve 2 to 1 downsampling ratio in both horizontal and vertical directions. The selection of downsampling filter is specified by a SPS level flag. The two downsampling filters are as follows, which are corresponding to "type-0" and "type-2" content, respectively.

$$rec'_L(i, j) = \begin{bmatrix} rec_L(2i-1, 2j-1) + 2 \cdot rec_L(2i-1, 2j-1) + rec_L(2i+1, 2j-1) + \\ rec_L(2i-1, 2j) + 2 \cdot rec_L(2i, 2j) + rec_L(2i+1, 2j) + 4 \end{bmatrix} \gg 3$$

$$rec'_L(i, j) = \begin{bmatrix} rec_L(2i, 2j-1) + rec_L(2i-1, 2j) + 4 \cdot rec_L(2i, 2j) + \\ rec_L(2i+1, 2j) + rec_L(2i, 2j+1) + 4 \end{bmatrix} \gg 3$$

Note that only one luma line (general line buffer in intra prediction) is used to make the downsampled luma samples when the upper reference line is at the CTU boundary.

This parameter computation is performed as part of the decoding process, and is not just as an encoder search operation. As a result, no syntax is used to convey the $\alpha$ and $\beta$ values to the decoder.

For chroma intra mode coding, a total of 8 intra modes are allowed for chroma intra mode coding. Those modes include five traditional intra modes and three cross-component linear model modes (CCLM, LM_A, and LM_L). Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

2.2.3.2.1 Corresponding Modified Working Draft (JVET-N0271)

The following spec is based on the modified working draft of JVET-M1001 and the adoption in JVET-N0271. The modification of the adopted JVET-N0220 is shown in bold and underlining
Syntax Table
Sequence Parameter Set RBSP Syntax

| | |
|---|---|
| sps_dmvr_enabled_flag | *u(1)* |
| sps_cclm_enabled_flag | *u(1)* |
| if( sps_cclm_enabled_flag && chroma_format_idc == 1 ) | |
| sps_cclm_colocated_chroma_flag | *u(1)* |
| sps_mts_enabled_flag | *u(1)* |

Semantics
sps_cclm_enabled_flag equal to 0 specifies that the cross-component linear model intra prediction from luma component to chroma component is disabled. sps_cclm_enabled_flag equal to 1 specifies that the cross-component linear model intra prediction from luma component to chroma component is enabled.
Decoding Process
In 8.4.4.2.8 Specification of INTRA_LT_CCLM, INTRA_L_CCLM and INTRA_T_CCLM Intra Prediction Mode
Inputs to this process are:
the intra prediction mode predModeIntra,
a sample location (xTbC, yTbC) of the top-left sample of the current transform block relative to the top-left sample of the current picture,
a variable nTbW specifying the transform block width,
a variable nTbH specifying the transform block height,
chroma neighbouring samples p[x][y], with x=−1, y=0 . . . 2*nTbH−1 and x=0 . . . 2*nTbW−1, y=−1.
Output of this process are predicted samples predSamples [x][y], with x=0 . . . nTbW−1, y=0 . . . nTbH−1.
The current luma location (xTbY, yTbY) is derived as follows:

$$(xTbY, yTbY)=(xTbC<<1, yTbC<<1) \quad (8\text{-}156)$$

The variables availL, availT and availTL are derived as follows:
The availability of left neighbouring samples derivation process for a block as specified in clause 6.4.X [Ed. (BB): Neighbouring blocks availability checking process tbd] is invoked with the current chroma location (xCurr, yCurr) set equal to (xTbC, yTbC) and the neighbouring chroma location (xTbC−1, yTbC) as inputs, and the output is assigned to availL.
The availability of top neighbouring samples derivation process for a block as specified in clause 6.4.X [Ed. (BB): Neighbouring blocks availability checking process tbd] is invoked with the current chroma location (xCurr, yCurr) set equal to (xTbC, yTbC) and the neighbouring chroma location (xTbC, yTbC−1) as inputs, and the output is assigned to availT.
The availability of top-left neighbouring samples derivation process for a block as specified in clause 6.4.X [Ed. (BB): Neighbouring blocks availability checking process tbd] is invoked with the current chroma location (xCurr, yCurr) set equal to (xTbC, yTbC) and the neighbouring chroma location (xTbC−1, yTbC−1) as inputs, and the output is assigned to availTL.
The number of available top-right neighbouring chroma samples numTopRight is derived as follows:
The variable numTopRight is set equal to 0 and availTR is set equal to TRUE.
When predModeIntra is equal to INTRA_T_CCLM, the following applies for x=nTbW . . . 2*nTbW−1 until availTR is equal to FALSE or x is equal to 2*nTbW−1:
The availability derivation process for a block as specified in clause 6.4.X [Ed. (BB): Neighbouring blocks availability checking process tbd] is invoked with the current chroma location (xCurr, yCurr) set equal to (xTbC, yTbC) and the neighbouring chroma location (xTbC+x, yTbC−1) as inputs, and the output is assigned to availableTR
When availableTR is equal to TRUE, numTopRight is incremented by one.
The number of available left-below neighbouring chroma samples numLeftBelow is derived as follows:
The variable numLeftBelow is set equal to 0 and availLB is set equal to TRUE.
When predModeIntra is equal to INTRA_L_CCLM, the following applies for y=nTbH . . . 2*nTbH−1 until availLB is equal to FALSE or y is equal to 2*nTbH−1:
The availability derivation process for a block as specified in clause 6.4.X [Ed. (BB): Neighbouring blocks availability checking process tbd] is invoked with the current chroma location (xCurr, yCurr) set equal to (xTbC, yTbC) and the neighbouring chroma location (xTbC−1, yTbC+y) as inputs, and the output is assigned to availableLB
When availableLB is equal to TRUE, numLeftBelow is incremented by one.
The number of available neighbouring chroma samples on the top and top-right numTopSamp and the number of available neighbouring chroma samples on the left and left-below nLeftSamp are derived as follows:
If predModeIntra is equal to INTRA_LT_CCLM, the following applies:

$$numSampT=availT?nTbW:0 \quad (8\text{-}157)$$

$$numSampL=availL?nTbH:0 \quad (8\text{-}158)$$

Otherwise, the following applies:

$$numSampT=(availT \&\& \\ predModeIntra==INTRA\_T\_CCLM)?(nTbW+ \\ \mathbf{Min}(numTopRight, \mathbf{\textit{,nTbH}})):0 \quad (8\text{-}159)$$

$$numSampL=(availL \&\& \\ predModeIntra==INTRA\_L\_CCLM)?(nTbH+ \\ \mathbf{Min}(numLeftBelow, \mathbf{\textit{,nTbW}})):0 \quad (8\text{-}160)$$

*The variable bCTU boundary is derived as follows:*

*bCTUboundary = (*
*yTbC & ( 1 << ( CtbLog2SizeY*
*− 1 ) − 1 ) = = 0 ) ? TRUE : FALSE.* (8-161)

*The variable cntN and array pickPosN[] with N being replaced by L and T, are derived as follows:*

*The variable numIs4N is set equal to ((availT && availL && predModeIntra == INTRA_LT_CCLM ) ? 0 : 1).*

*The variable startPosN is set equal to numSampN >> ( 2 + numIs4N ).*

*The variable pickStepN is set equal to Max( 1, numSampN >> ( 1 + numIs4N )).*

*If availN is equal to TRUE and predModeIntra is equal to INTRA_LT_CCLM or INTRA_N_CCLM, cntN is set equal to Min( numSampN, ( 1 + numIs4N ) << 1 ), and pickPosN[ pos ] is set equal to (startPosN + pos * pickStepN), with pos = 0..( cntN − 1 ).*

*Otherwise, cntN is set equal to 0.*

The prediction samples predSamples[x][y] with x=0 . . . nTbW−1, y=0 . . . nTbH−1 are derived as follows:

If both numSampL and numSampT are equal to 0, the following applies:

$$predSamples[x][y]=1<<(BitDepth_C-1) \quad (8\text{-}162)$$

Otherwise, the following ordered steps apply:

1. The collocated luma samples pY[x][y] with x=0 . . . nTbW*2−1, y=0 . . . nTbH*2−1 are set equal to the reconstructed luma samples prior to the deblocking filter process at the locations (xTbY+x, yTbY+y).

2. The neighbouring luma samples samples pY[x][y] are derived as follows:

When numSampL is greater than 0, the neighbouring left luma samples pY[x][y] with x=−1 . . . −3, y=0 . . . 2*numSampL−1, are set equal to the reconstructed luma samples prior to the deblocking filter process at the locations (xTbY+x, yTbY+y).

When numSampT is greater than 0, the neighbouring top luma samples pY[x][y] with x=0 . . . 2*numSampT−1, y=−1, −2, are set equal to the reconstructed luma samples prior to the deblocking filter process at the locations (xTbY+x, yTbY+y).

When availTL is equal to TRUE, the neighbouring top-left luma samples pY[x][y] with x=−1, y=−1, −2, are set equal to the reconstructed luma samples prior to the deblocking filter process at the locations (xTbY+x, yTbY+y).

3. The down-sampled collocated luma samples pDsY[x][y] with x=0 . . . nTbW −1, y=0 . . . nTbH−1 are derived as follows:

If sps_cclm_colocated_chromajlag is equal to 1, the following applies:

pDsY[x][y] with x=1 . . . nTbW−1, y=1 . . . nTbH−1 is derived as follows:

$$pDsY[x][y]=(pY[2*x][2*y-1]+pY[2*x-1][2*y]+4*pY[2*x][2*y]+pY[2*x+1][2*y]+pY[2*x][2*y+1]+4)>>3 \quad (8\text{-}163)$$

If availL is equal to TRUE, pDsY[0][y] with y=1 . . . nTbH−1 is derived as follows:

$$pDsY[0][y]=(pY[0][2*y-1]+pY[-1][2*y]+4*pY[0][2*y]+pY[1][2*y]+pY[0][2*y+1]+4)>>3 \quad (8\text{-}164)$$

Otherwise, pDsY[0][y] with y=1 . . . nTbH−1 is derived as follows:

$$pDsY[0][y]=(pY[0][2*y-1]+2*pY[0][2*y]+pY[0][2*y+1]+2)>>2 \quad (8\text{-}165)$$

If availT is equal to TRUE, pDsY[x][0] with x=1 . . . nTbW−1 is derived as follows:

$$pDsY[x][0]=(pY[2*x][-1]+pY[2*x-1][0]1+4*pY[2*x][0]+pY[2*x+1][0]+pY[2*x][1]+4)>>3 \quad (8\text{-}166)$$

Otherwise, pDsY[x][0] with x=1 . . . nTbW−1 is derived as follows:

$$pDsY[x][0]=(pY[2*x-1][0]+2*pY[2*x][0]+pY[2*x+1][0]+2)>>2 \quad (8\text{-}167)$$

If availL is equal to TRUE and availT is equal to TRUE, pDsY[0][0] is derived as follows:

$$pDsY[0][0]=(pY[0][-1]+pY[-1][0]+4*pY[0][0]+pY[1][0]+pY[0][1]+4)>>3 \quad (8\text{-}168)$$

Otherwise if availL is equal to TRUE and availT is equal to FALSE, pDsY[0][0] is derived as follows:

$$pDsY[0][0]=(pY[-1][0]+2*pY[0][0]+pY[1][0]+2)>>2 \quad (8\text{-}169)$$

Otherwise if availL is equal to FALSE and availT is equal to TRUE, pDsY[0][0] is derived as follows:

$$pDsY[0][0]=(pY[0][-1]+2*pY[0][0]+pY[0][1]+2)>>2 \quad (8\text{-}170)$$

Otherwise (availL is equal to FALSE and availT is equal to FALSE), pDsY[0][0] is derived as follows:

$$pDsY[0][0]=pY[0][0] \quad (8\text{-}171)$$

Otherwise, the following applies:

pDsY[x][y] with x=1 . . . nTbW−1, y=0 . . . nTbH−1 is derived as follows:

$$pDsY[x][y]=(pY[2*x-1][2*y]+pY[2*x-1][2*y+1]+2*pY[2*x][2*y]+2*pY[2*x][2*y+1]+pY[2*x+1][2*y]+pY[2*x+1][2*y+1]+4)>>3 \quad (8\text{-}172)$$

If availL is equal to TRUE, pDsY[0][y] with y=0 . . . nTbH−1 is derived as follows:

$$pDsY[0][y]=(pY[-1][2*y]+pY[-1][2*y+1]+2*pY[0][2*y]+2*pY[0][2*y+1]+pY[1][2*y]+pY[1][2*y+1]+4)>>3 \quad (8\text{-}173)$$

Otherwise, pDsY[0][y] with y=0 . . . nTbH−1 is derived as follows:

$$pDsY[0][y]=(pY[0][2*y]+pY[0][2*y+1]+1)>>1 \quad (8\text{-}174)$$

4. When numSampL is greater than 0, *the selected neighbouring left chroma samples pSelC[idx] are set equal to p[ −1 ][ pickPosL[ idx ]] with idx = 0..(cntL − 1), and* the *selected* down-sampled neighbouring left luma samples *pSelDsY[ idx ]* with *idx = 0..(cntL−1)* are derived as follows:

*The variable y is set equal to pickPosL[ idx ].*

If sps_cclm_colocated_chroma_flag is equal to 1, the following applies:

*If y > 0 || availTL == TRUE,*

$$pSelDsY[\ idx\ ] = (pY[-2][2*y-1]+ pY[-3][2*y]+4*pY[-2][2*y]+pY[-1][2*y]+pY[-2][2*y+1]+4)>>3 \quad (8\text{-}175)$$

Otherwise, $$pSelDsY[\ idx\ ] =(pY[-3][0]+2*pY[-2][0]+pY[-1][0]+2)>>2 \quad (8\text{-}177)$$

Otherwise, the following applies:

$pSelDsY[idx] = (pY[-1][2*y]+pY[-1][2*y+1]+2*pY[-2][2*y]+2*pY[-2][2*y+1]+pY[-3][2*y]+pY[-3][2*y+1]+4)>>3$ (8-178)

5. When numSampT is greater than 0, the selcted neighbouring top chroma samples pSelDsY[ idx ] are set equal to pf pickPosT[ idx − cntL ]][ -1 ] with idx = cntL..( cntL + cntT − 1 ), and the down-sampled neighbouring top luma samples pSelDsY[ idx ] with idx = cntL..( cntL + cntT − 1 ) are specified as follows:

The variable x is set equal to pickPosT[ idx − cntL ].

If sps_cclm_colocated_chroma_flag is equal to 1, the following applies:
   If x>0:
      If bCTUboundary is equal to FALSE, the following applies:

$pSelDsY[idx] = (pY[2*x][-3]+pY[2*x-1][-2]+4*pY[2*x][-2]+pY[2*x+1][-2]+pY[2*x][-1]+4)>>3$ (8-179)

Otherwise (bCTUboundary is equal to TRUE), the following applies:

$pSelDsY[idx] = (pY[2*x-1][-1]+2*pY[2*x][-1]+pY[2*x+1][-1]+2)>>2$ (8-180)

Otherwise:
      If availTL is equal to TRUE and bCTUboundary is equal to FALSE, the following applies:

$pSelDsY[idx] = (pY[0][-3]+pY[-1][-2]+4*pY[0][-2]+pY[1][-2]+pY[0][-1]+4)>>3$ (8-181)

Otherwise if availTL is equal to TRUE and bCTUboundary is equal to TRUE, the following applies:

$pSelDsY[idx] = (pY[-1][-1]+2*pY[0][-1]+pY[1][-1]+2)>>2$ (8-182)

Otherwise if availTL is equal to FALSE and bCTUboundary is equal to FALSE, the following applies:

$pSelDsY[idx] = (pY[0][-3]+2*pY[0][-2]+pY[0][-1]+2)>>2$ (8-183)

Otherwise (availTL is equal to FALSE and bCTUboundary is equal to TRUE), the following applies:

$pSelDsY[idx] = pY[0][-1]$ (8-184)

Otherwise, the following applies:
   *If x > 0:*
      If bCTUboundary is equal to FALSE, the following applies:

$pSelDsY[idx] = (pY[2*x-1][-2]+pY[2*x-1][-1]+2*pY[2*x][-2]+2*pY[2*x][-1]+pY[2*x+1][-2]+pY[2*x+1][-1]+4)>>3$ (8-185)

Otherwise (bCTUboundary is equal to TRUE), the following applies:

$pSelDsY[idx] = (pY[2*x-1][-1]+2*pY[2*x][-1]+pY[2*x+1][-1]+2)>>2$ (8-186)

*Otherwise:*
   If availTL is equal to TRUE and bCTUboundary is equal to FALSE, the following applies:

$pSelDsY[idx] = (pY[-1][-2]+pY[-1][-1]+2*pY[0][-2]+2*pY[0][-1]+pY[1][-2]+pY[1][-1]+4)>>3$ (8-187)

Otherwise if availTL is equal to TRUE and bCTUboundary is equal to TRUE, the following applies:

$pSelDsY[idx] = (pY[-1][-1]+2*pY[0][-1]+pY[1][-1]+2)>>2$ (8-188)

Otherwise if availTL is equal to FALSE and bCTUboundary is equal to FALSE, the following applies:

$pSelDsY[idx] = (pY[0][-2]+pY[0][-1]+1)>>1$ (8-189)

Otherwise (availTL is equal to FALSE and bCTUboundary is equal to TRUE), the following applies:

$pSelDsY[idx] = pY[0][-1]$ (8-190)

6. *When cntT+ cntL is not equal to 0, the variables minY, maxY, minC the variables minY, maxY, minC follows:*

*When cntT+cntL is equal to 2,*
   *set pSelComp[3] equal to pSelComp[0], pSelComp[2] equal to pSelComp[1], pSelComp[0] equal to pSelComp[1], and pSelComp[1] equal to pSelComp[3], with Comp being replaced by DsY and C.*

*The arrays minGrpIdx[ ] and maxGrpIdx[ ] are set as:*
   *minGrpIdx[0] = 0, minGrpIdx[1] = 2, maxGrpIdx[0] = 1, maxGrpIdx[1] = 3.*

*If pSelDsY[minGrpIdx[0]] > pSelDsY[minGrpIdx[1]], Swap(minGrpIdx[0], minGrpIdx[1]).*

*If pSelDsY[maxGrpIdx[0]] > pSelDsY[maxGrpIdx[1]], Swap(maxGrpIdx[0], maxGrpIdx[1]).*

*If pSelDsY[minGrpIdx[0]] > pSelDsY[maxGrpIdx[1]], Swap(minGrpIdx, maxGrpIdx ).*

*If pSelDsY[minGrpIdx[1]] > pSelDsY[maxGrpIdx[0]], Swap(minGrpIdx[1], maxGrpIdx[0]).*

*maxY = ( pSelDsY[maxGrpIdx[0]] + pSelDsY[maxGrpIdx[1]] + 1 ) >> 1.*

*maxC = ( pSelC[maxGrpIdx[0]] + pSelC[maxGrpIdx[1]] + 1 ) >> 1.*

$$\underline{minY = (\,pSelDsY[minGrpIdx[0]]}$$
$$\underline{+ pSelDsY[minGrpIdx[1]]\ +1\,)>>1.}$$
$$\underline{minC = (\,pSelC[minGrpIdx[0]]}$$
$$\underline{+ pSelC[minGrpIdx[1]]\ +1\,)>>1.}$$

7. The variables a, b, and k are derived as follows:
   If numSampL is equal to 0, and numSampT is equal to 0, the following applies:

$k=0$     (8-208)

$a=0$     (8-209)

$b=1<<(BitDepth_C-1)$     (8-210)

Otherwise, the following applies:

$diff=maxY-minY$     (8-211)

If diff is not equal to 0, the following applies:

$diffC=maxC-minC$     (8-212)

$x=Floor(Log2(diff))$     (8-213)

$normDiff=((diff<<4)>>x)\&15$     (8-214)

$x+=(nomiDiff!=0)?1:0$     (8-215)

$y=Floor(Log2(Abs(diffC)))+1$     (8-216)

$a=(diffC*(divSigTable[normDiff]|8)+2^{y-1})>>y$     (8-217)

$k=((3+x-y)<1)?1:3+x-y$     (8-218)

$a=((3+x-y)<1)?Sign(a)*15:a$     (8-219)

$b=minC-((a*minY)>>k)$     (8-220)

where divSigTable[ ] is specified as follows:

$divSigTable[\,]=\{0, 7, 6, 5, 5, 4, 4, 3, 3, 2, 2, 1, 1, 1, 1, 0\}$     (8-221)

Otherwise (diff is equal to 0), the following applies:

$k=0$     (8-222)

$a=0$     (8-223)

$b=minC$     (8-224)

8. The prediction samples predSamples[x][y] with x=0 . . . nTbW−1, y=0 . . . nTbH−1 are derived as follows:

$predSamples[x][y]=Clip1C(((pDsY[x][y]*a)>>k)+b)$     (8-225)

2.2.3.3 Miscellaneous Intra Prediction Aspects

VTM4 includes many intra coding tools which are different from HEVC, for example, the following features have been included in the VVC test model 3 on top of the bock tree structure.
67 intra mode with wide angles mode extension
Block size and mode dependent 4 tap interpolation filter
Position dependent intra prediction combination (PDPC)
Cross component linear model intra prediction
Multi-reference line intra prediction
Intra sub-partitions

2.2.4 Inter Prediction in VVC

2.2.4.1 Combined Inter and Intra Prediction (CIIP)

In VTM4, when a CU is coded in merge mode, and if the CU contains at least 64 luma samples (that is, CU width times CU height is equal to or larger than 64), an additional flag is signalled to indicate if the combined inter/intra prediction (CIIP) mode is applied to the current CU.

In order to form the CIIP prediction, an intra prediction mode is first derived from two additional syntax elements. Up to four possible intra prediction modes can be used: DC, planar, horizontal, or vertical. Then, the inter prediction and intra prediction signals are derived using regular intra and inter decoding processes. Finally, weighted averaging of the inter and intra prediction signals is performed to obtain the CIIP prediction.

2.2.4.2 Miscellaneous Inter Prediction Aspects

VTM4 includes many inter coding tools which are different from HEVC, for example, the following features have been included in the VVC test model 3 on top of the bock tree structure.
Affine motion inter prediction
sub-block based temporal motion vector prediction
Adaptive motion vector resolution
8×8 block based motion compression for temporal motion prediction
High precision (1/16 pel) motion vector storage and motion compensation with 8-tap interpolation filter for luma component and 4-tap interpolation filter for chroma component
Triangular partitions
Combined intra and inter prediction
Merge with MVD (MMVD)
Symmetrical MVD coding
Bi-directional optical flow
Decoder side motion vector refinement
Bi-predictive weighted averaging

2.2.5 In-Loop Filters

There are totally three in-loop filters in VTM4. Besides deblocking filter and sample adaptive offset filter (SAO), the two loop filters in HEVC, adaptive loop filter (ALF) are applied in the VTM4. The order of the filtering process in the VTM4 is the deblocking filter, SAO and ALF.

In the VTM4, the SAO and deblocking filtering processes are almost same as those in HEVC.

In the VTM4, a new process called the luma mapping with chroma scaling was added (this process was previously known as the adaptive in-loop reshaper). This new process is performed before deblocking.

2.2.6 Luma Mapping with Chroma Scaling (LMCS, aka. In-Loop Reshaping)

Figure 4:
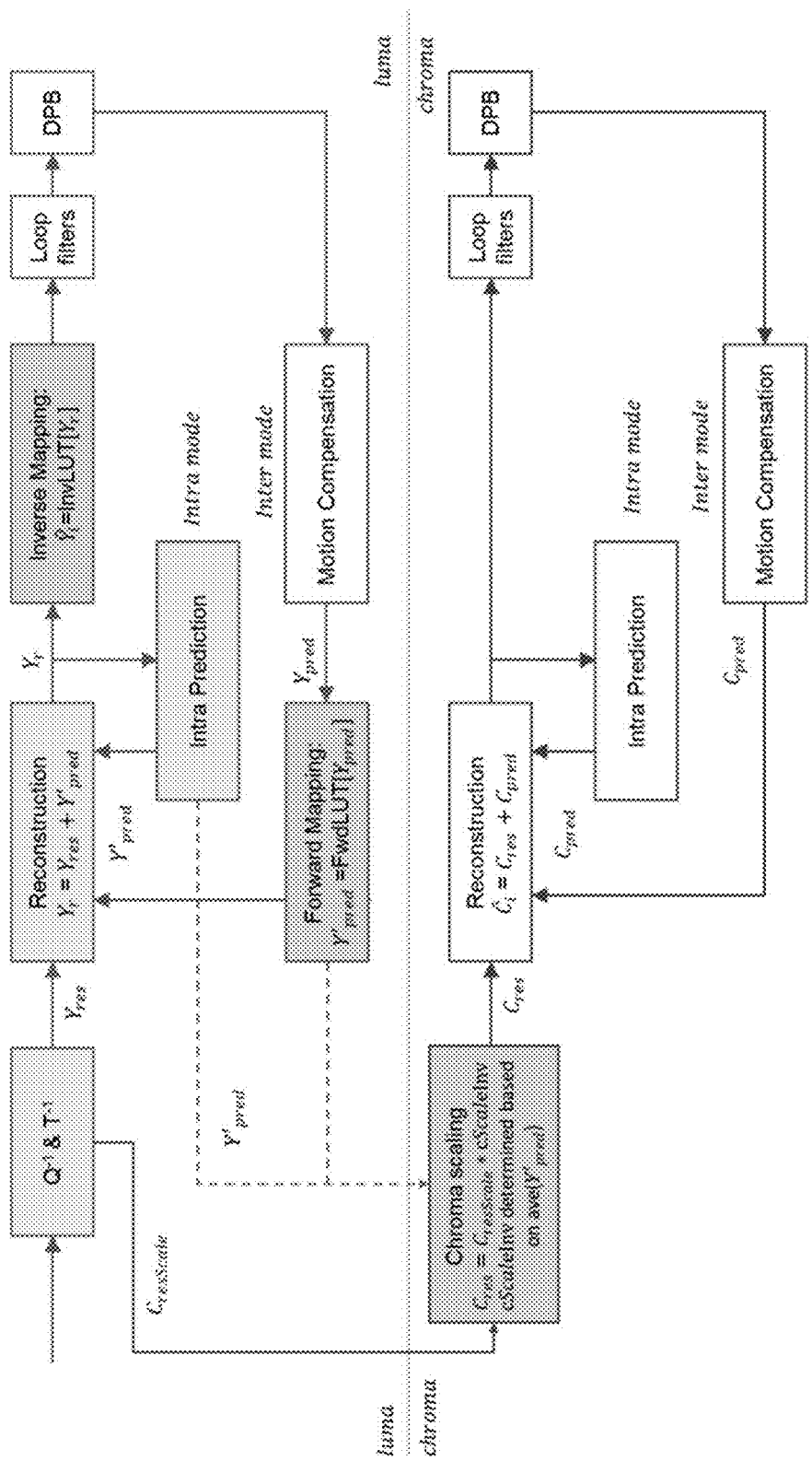
FIG. 4 shows an example of luma mapping with chroma scaling architecture.

In VTM4, a coding tool called the luma mapping with chroma scaling (LMCS) is added as a new processing block before the loop filters. LMCS has two main components: 1) in-loop mapping of the luma component based on adaptive piecewise linear models; 2) for the chroma components, luma-dependent chroma residual scaling is applied. FIG. 4 shows the LMCS architecture from decoder's perspective.

The light-blue shaded blocks in FIG. 4 indicate where the processing is applied in the mapped domain; and these include the inverse quantization, inverse transform, luma intra prediction and adding of the luma prediction together with the luma residual. The unshaded blocks in FIG. 4 indicate where the processing is applied in the original (i.e., non-mapped) domain; and these include loop filters such as deblocking, ALF, and SAO, motion compensated prediction, chroma intra prediction, adding of the chroma prediction together with the chroma residual, and storage of decoded pictures as reference pictures. The light-yellow shaded blocks in FIG. 4 are the new LMCS functional blocks, including forward and inverse mapping of the luma signal and a luma-dependent chroma scaling process. Like most other tools in VVC, LMCS can be enabled/disabled at the sequence level using an SPS flag.

2.2.6.1 Luma Mapping With Piecewise Linear Model

The in-loop mapping of the luma component adjusts the dynamic range of the input signal by redistributing the codewords across the dynamic range to improve compression efficiency. Luma mapping makes use of a forward mapping function, FwdMap, and a corresponding inverse mapping function, InvMap. The FwdMap function is signalled using a piecewise linear model with 16 equal pieces. InvMap function does not need to be signalled and is instead derived from the FwdMap function.

The luma mapping model is signalled at the tile group level. A presence flag is signalled first. If luma mapping model is present in the current tile group, corresponding piecewise linear model parameters are signalled. The piecewise linear model partitions the input signal's dynamic range into 16 equal pieces, and for each piece, its linear mapping parameters are expressed using the number of codewords assigned to that piece. Take 10-bit input as an example. Each of the 16 pieces will have 64 codewords assigned to it by default. The signalled number of codewords is used to calculate the scaling factor and adjust the mapping function accordingly for that piece. At the tile group level, another LMCS enable flag is signalled to indicate if the LMCS process as depicted in FIG. 4 is applied to the current tile group.

Each i-th piece, i=0 . . . 15, of the FwdMap piecewise linear model is defined by two input pivot points InputPivot[ ] and two output (mapped) pivot points MappedPivot[ ].

The InputPivot[ ] and MappedPivot[ ] are computed as follows (assuming 10-bit video):
1) OrgCW=64
2) For i=0:16, InputPivot[i]=i*OrgCW
3) For i=0:16, MappedPivot[i] is calculated as follows:

MappedPivot[0]=0;

for (i=0; i<16; i++)

MappedPivot[i+1]=MappedPivot[i]+SignalledCW[i]

where SignalledCW[i] is the signalled number of codewords for the i-th piece.

As shown in FIG. 4, for an inter-coded block, motion compensated prediction is performed in the mapped domain. In other words, after the motion-compensated prediction block $Y_{pred}$ is calculated based on the reference signals in the DPB, the FwdMap function is applied to map the luma prediction block in the original domain to the mapped domain, $Y'_{pred}$=FwdMap($Y_{pred}$). For an intra-coded block, the FwdMap function is not applied because intra prediction is performed in the mapped domain. After reconstructed block $Y_r$ is calculated, the InvMap function is applied to convert the reconstructed luma values in the mapped domain back to the reconstructed luma values in the original domain ($\hat{Y}_i$=InvMap($Y_r$)). The InvMap function is applied to both intra- and inter-coded luma blocks.

The luma mapping process (forward and/or inverse mapping) can be implemented using either look-up-tables (LUT) or using on-the-fly computation. If LUT is used, then FwdMapLUT and InvMapLUT can be pre-calculated and pre-stored for use at the tile group level, and forward and inverse mapping can be simply implemented as FwdMap ($Y_{pred}$)=FwdMapLUT[$Y_{pred}$] and InvMap ($Y_r$)=InvMapLUT [$Y_r$], respectively. Alternatively, on-the-fly computation may be used. Take forward mapping function FwdMap as an example. In order to figure out the piece to which a luma sample belongs, the sample value is right shifted by 6 bits (which corresponds to 16 equal pieces). Then, the linear model parameters for that piece are retrieved and applied on-the-fly to compute the mapped luma value. Let i be the piece index, a1, a2 be InputPivot[i] and InputPivot[i+1], respectively, and b1, b2 be MappedPivot[i] and MappedPivot[i+1], respectively. The FwdMap function is evaluated as follows:

FwdMap($Y_{pred}$)=((b2−b1)/(a2−a1))*($Y_{pred}$−a1)+b1

The InvMap function can be computed on-the-fly in a similar manner, except that conditional checks need to be applied instead of a simple right bit-shift when figuring out the piece to which the sample value belongs, because the pieces in the mapped domain are not equal sized.

2.2.6.2 Luma-Dependent Chroma Residual Scaling

Chroma residual scaling is designed to compensate for the interaction between the luma signal and its corresponding chroma signals. Whether chroma residual scaling is enabled or not is also signalled at the tile group level. If luma mapping is enabled and if dual tree partition (also known as separate chroma tree) is not applied to the current tile group, an additional flag is signalled to indicate if luma-dependent chroma residual scaling is enabled or not. When luma mapping is not used, or when dual tree partition is used in the current tile group, luma-dependent chroma residual scaling is disabled. Further, luma-dependent chroma residual scaling is always disabled for the chroma blocks whose area is less than or equal to 4.

Chroma residual scaling depends on the average value of the corresponding luma prediction block (for both intra- and inter-coded blocks). Denote avgY' as the average of the luma prediction block. The value of $C_{ScaleInv}$ is computed in the following steps:
1) Find the index $Y_{idx}$ of the piecewise linear model to which avgY' belongs based on the InvMap function.
2) $C_{ScaleInv}$=cScaleInv[$Y_{Idx}$], where $c_{ScaleInv}$[ ] is a pre-computed 16-piece LUT.

If the current block is coded as intra, CIIP, or intra block copy (IBC, a.k.a. current picture referencing or CPR) modes, avgY' is computed as the average of the intra-, CIIP-, or IBC-predicted luma values; otherwise, avgY' is computed as the average of the forward mapped inter predicted luma values ($Y'_{pred}$ in FIG. 4). Unlike luma mapping, which is performed on the sample basis, $C_{ScaleInv}$ is a constant value for the entire chroma block. With $C_{ScaleInv}$, chroma residual scaling is applied as follows:

Encoder side: $C_{ResScale}=C_{Res}*C_{Scale}=C_{Res}/C_{ScaleInv}$

Decoder side: $C_{Res}=C_{ResScale}/$
$C_{Scale}=C_{ResScale}*C_{ScaleInv}$

2.2.6.3 Corresponding Working Draft in JVET-M1001_v7 with the Adoption in JVET-N0220

The following spec is based on the modified working draft of JVET-M1001 and the adoption in JVET-N0220. The modification in the adopted JVET-N0220 is shown in bold and underlining.

Syntax Tables

In 7.3.2.1 Sequence Parameter Set RBSP Syntax

| | |
|---|---|
| sps_triangle_enabled_flag | u(1) |
| sps_lmcs_enabled_flag | u(1) |
| sps_ladf_enabled_flag | u(1) |

In 7.3.4.1 General Tile Group Header Syntax

| | |
|---|---|
| if( sps_lmcs_enabled_flag ) { | |
|   tile_group_lmcs_model_present_flag | u(1) |
|   if( tile_group_lmcs_model_present_flag ) | |
|     lmcs_data( ) | |
|   tile_group_lmcs_enabled_flag | u(1) |
|   if( tile_group_lmcs_enabled_flag && | |
|     !( qtbtt_dual_tree_intra_flag && tile_ | |
| group_type == I ) ) | |
|     tile_group_chroma_residual_scale_flag | u(1) |
| } | |
| if( NumTilesInCurrTileGroup > 1 ) { | |
|   offset_len_minus1 | ue(v) |
|   for( i = 0; i < NumTilesInCurrTileGroup − 1; i++ ) | |
|     entry_point_offset_minus1[ i ] | u(v) |
| } | |

In 7.3.4.4 Luma Mapping with Chroma Scaling Data Syntax

| lmcs_data ( ) { | Descriptor |
|---|---|
|   lmcs_min_bin_idx | ue(v) |
|   lmcs_delta_max_bin_idx | ue(v) |
|   lmcs_delta_cw_prec_minus1 | ue(v) |
|   for ( i = lmcs_min_bin_idx; i <= LmcsMaxBinIdx; i++ ) { | |
|     lmcs_delta_abs_cw[ i ] | u(v) |
|     if ( lmcs_delta_abs_cw[ i ] ) > 0 ) | |
|       lmcs_delta_sign_cw_flag[ i ] | u(1) |
|   } | |
| } | |

Semantics

In 7.4.3.1 Sequence Parameter Set RBSP Semantics sps_lmcs_enabled_flag equal to 1 specifies that luma mapping with chroma scaling is used in the CVS. sps_lmcs_enabled_flag equal to 0 specifies that luma mapping with chroma scaling is not used in the CVS.

tile_group_lmcs_model_present_flag equal to 1 specifies that lmcs_data( ) is present in the tile group header. tile_group_lmcs_model_present_flag equal to 0 specifies that lmcs_data( ) is not present in the tile group header. When tile_group_lmcs_model_present_flag is not present, it is inferred to be equal to 0.

tile_group_lmcs_enabled_flag equal to 1 specifies that luma mappin with chroma scaling is enabled for the current tile group. tile_group_lmcs_enabled_flag equal to 0 specifies that luma mapping with chroma scaling is not enabled for the current tile group. When tile_group_lmcs_enabled_flag is not present, it is inferred to be equal to 0.

tile_group_chroma_residual_scale_flag equal to 1 specifies that chroma residual scaling is enabled for the current tile group. tile_group_chroma_residual_scale _flag equal to 0 specifies that chroma residual scaling is not enabled for the current tile group. When the tile_group_chroma_residual_scale_flag is not present, it is inferred to be equal to 0.

In 7.4.5.4 Luma Mapping with Chroma Scaling Data Semantics lmcs_min_bin_idx specifies the minimum bin index used in the luma mapping with chroma scaling construction process. The value of lmcs_min_bin_idx shall be in the range of 0 to 15, inclusive.

lmcs_delta_max_bin_idx specifies the delta value between 15 and the maximum bin index LmcsMaxBinIdx used in the luma mapping with chroma scaling construction process. The value of lmcs_delta_max_bin_idx shall be in the range of 0 to 15, inclusive. The value of LmcsMaxBinIdx is set equal to 15-lmcs_delta_max_bin_idx. The value of Lmcs-MaxBinIdx shall be larger than or equal to lmcs_min_bin_idx.

lmcs_delta_cwprec_minus1 plus 1 specifies the number of bits used for the representation of the syntax lmcs_delta_abs_cw[i]. The value of lmcs_delta_cw_prec_minus1 shall be in the range of 0 to BitDepthY−2, inclusive.

lmcs_delta_abs_cw[i] specifies the absolute delta codeword value for the ith bin.

lmcs_delta_sign_cw_flag[i] specifies the sign of the variable lmcsDeltaCW[i] as follows:

If lmcs_delta_sign_cw_flag[i] is equal to 0, lmcsDeltaCW[i] is a positive value.

Otherwise (lmcs_delta_sign_cwjlag[i] is not equal to 0), lmcsDeltaCW[i] is a negative value.

When lmcs_delta_sign_cw_flag[i] is not present, it is inferred to be equal to 0.

The variable OrgCW is derived as follows:

$$OrgCW = (1 << BitDepthy)/16 \quad (7\text{-}70)$$

The variable lmcsDeltaCW[i], with i=lmcs_min_bin_idx..LmcsMaxBinIdx, is derived as follows:

$$\text{lmcsDeltaCW}[i] = (1 - 2*\text{lmcs\_delta\_sign\_cw\_flag}[i]) \\ *\text{lmcs\_delta\_abs\_cw}[i] \quad (7\text{-}71)$$

The variable lmcsCW[i] is derived as follows:

For i=0 . . . lmcs_min_bin_idx−1, lmcsCW[i] is set equal 0.

For i=lmcs_min_bin_idx . . . LmcsMaxBinIdx, the following applies:

$$\text{lmcsCW}[i] = OrgCW + \text{lmcsDeltaCW}[i] \quad (7\text{-}72)$$

The value of lmcsCW[i] shall be in the range of (OrgCW>>3) to (OrgCW<<3−1), inclusive.

For i=LmcsMaxBinIdx+1 . . . 15, lmcsCW[i] is set equal 0. It is a requirement of bitstream conformance that the following condition is true:

$$\Sigma_{i=0}^{15} = \text{lmcsCW}[i] <= (1 << BitDepth_Y) - 1 \quad (7\text{-}73)$$

The variable InputPivot[i], with i=0 . . . 16, is derived as follows:

$$InputPivot[i] = i * OrgCW \quad (7\text{-}74)$$

The variable LmcsPivot[i] with i=0 . . . 16, the variables ScaleCoeff[i] and InvScaleCoeff[i] with i=0 . . . 15, are derived as follows:

LmcsPivot[0]=0;

for (i=0; i<=15; i++){

LmcsPivot[$i$+1]=LmcsPivot[$i$]+lmcsCW[$i$]

*ScaleCoeff[ i ] = ( lmcsCW[ i ] *

− 1))) >> (Log2(OrgCW)) rgCW)*

*(7-75)* if (lmcsCW[i]==0)
InvScaleCoeff[i]=0
else

*InvScaleCoeff[ i ] = OrgCW * (1 << 11) /*

*lmcsCW[ i ]*

}

The variable ChromaScaleCoeff[i], with i=0 . . . 15, is derived as follows:
if (lmcsCW[i]==0)
ChromaScaleCoeff[i]=(1<<11)
else {

*ChromaScaleCoeff[ i ] = InvScaleCoeff[ i ]*

}

The variables ClipRange, LmcsMinVal, and LmcsMaxVal are derived as follows:

ClipRange=((lmcs_min_bin_idx>0)&&(LmcsMax-
BinIdx<15))            (7-77)

LmcsMinVal=16<<(BitDepth$_Y$−8)        (7-78)

LmcsMaxVal=235<<(BitDepth$_Y$−8)       (7-79)

NOTE—Arrays InputPivot[i] and LmcsPivot[i], ScaleCoeff[i], and InvScaleCoeff[i], ChromaScaleCoeff[i], ClipRange, LmcsMinVal and LmcsMaxVal, are updated only when tile_group_lmcs_model_present_flag is equal to 1. Thus, the lmcs model may be sent with an IRAP picture, for example, but lmcs is disabled for that IRAP picture.

3. DRAWBACKS OF EXISTING IMPLEMENTATIONS

The current design of LMCS/CCLM may have the following problems:
1. In LMCS coding tool, the chroma residual scaling factor is derived by the average value of the collocated luma prediction block, which results in a latency for processing the chroma samples in LMCS chroma residual scaling.
   a) In case of single/shared tree, the latency is caused by (a) waiting for all the prediction samples of the whole luma block available, and (b) averaging all the luma prediction samples obtained by (a).
   b) In case of dual/separate tree, the latency is even worse since separate block partitioning structure for luma and chroma components is enabled in I slices. Therefore, one chroma block may correspond to multiple luma blocks, and one 4×4 chroma block may correspond to a 64×64 luma block. Thus the worst case is that the chroma residual scaling factor of current 4×4 chroma block may need to wait until all the prediction samples in the whole 64×64 luma block are available. In a word, the latency issue in dual/separate tree would be much more serious.
2. In CCLM coding tool, the CCLM model computation for intra chroma prediction depends on the left and above reference samples of both luma block and chroma block. And the CCLM prediction for a chroma block depends on the collocated luma reconstructed samples of the same CU. This would cause high latency in dual/separate tree. In case of dual/separate tree, one 4×4 chroma block may correspond to a 64×64 luma block. Thus the worst case is that the CCLM process for the current chroma block may need wait until the corresponding whole 64×64 luma block being reconstructed. This latency issue is similar as LMCS chroma scaling in dual/separate tree.

4. EXAMPLE TECHNIQUES AND EMBODIMENTS

To tackle the problems, we propose several methods to remove/reduce/restrict the cross-component dependency in luma-dependent chroma residual scaling, CCLM, and other coding tools that rely on information from a different colour component.

The detailed embodiments described below should be considered as examples to explain general concepts. These embodiments should not be interpreted narrowly way. Furthermore, these embodiments can be combined in any manner.

It is noted that although the bullets described below explicitly mention LMCS/CCLM, the methods may be also applicable to other coding tools that rely on information from a different colour component. In addition, the term 'luma' and 'chroma' mentioned below may be replaced by 'a first color component' and 'a second color component' respectively, such as 'G component' and 'B/R component' in the RGB color format.

Figure 5:
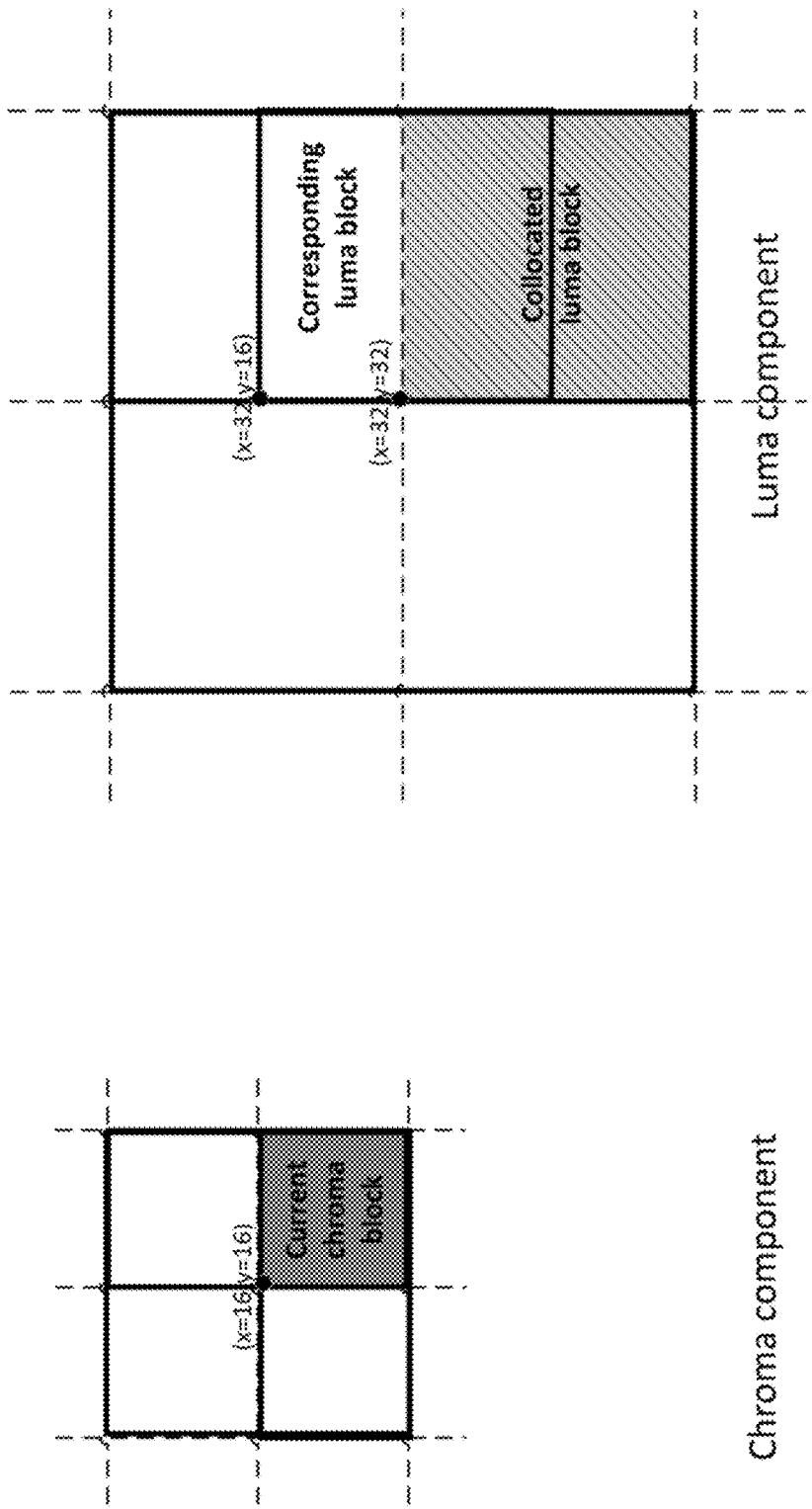
FIG. 5 shows an example of luma block and chroma block in different color formats.
Figure 6:
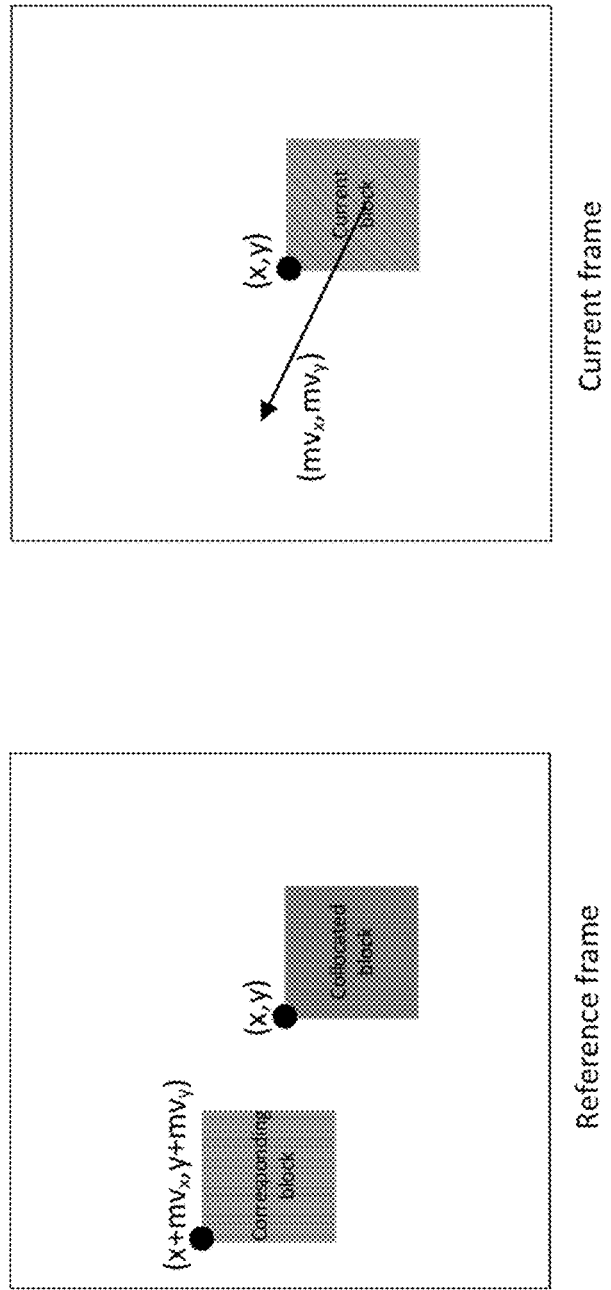
FIG. 6 shows an example of luma block and chroma block in same color formats.

In the following discussion, the definition a "collocated sample/block" aligns with the definition of collocated sample/block in VVC working draft JVET-M1001. To be more specific, in 4:2:0 colour format, suppose the top-left sample of a chroma block is at position (xTbC, yTbC), then the top-left sample of the collocated luma block location (xTbY, yTbY) is derived as follows: (xTbY, yTbY)= (xTbC<<1, yTbC<<1). As illustrated in FIG. 5, the top-left sample of the current chroma block is located at (x=16, y=16) in the chroma picture, then the top-left sample of its collocated luma block is located at (x=32,y=32) in the luma picture, regardless of the block partition of collocated luma block in the luma picture. For another example, saying in the same color component, the location of the top-left sample of the collocated block in the reference frame should be same with the location of the top-left sample of the current block in the current frame, as illustrated in FIG. 6, suppose the top-left sample of the current block is (x,y) in the current frame, then the top-left sample of the collocated block of the current block have the same location (x,y) in the reference frame.

In the following discussion, a "corresnponding block" may have different location with the current block. For an example, there might be a motion shift between the current block and its corresponding block in the reference frame. As illustrated in FIG. 6, suppose the current block is located at (x,y) in the current frame and it has a motion vector (mv$_x$, mv$_y$), then a corresponding block of the current block may be located at (x+mv$_x$,+mv$_y$) in the reference frame. And for an IBC coded block, the collocated luma block (pointed by zero vector) and the corresponding luma block (pointed by non-zero-BV) may locate in different places of the current frame. For another example, when the partition of luma block doesn't align with the partition of chroma block (in dual tree partition of I slices), the collocated luma block of the current chroma block may belong to a larger luma block which depends on the partition size of the overlapped luma coding block covering the top-left sample of the collocated luma block. As illustrated in FIG. 5, assume the bold rectangle denotes the partitions of the block, so that a 64×64 luma block is firstly split by an BT and then the right part of the 64×64 luma block is further split by a TT, which results in three luma blocks of sizes equal to 32×16, 32×32, 32×16, respectively. Thus looking at the top-left sample (x=32, y=32) of the collocated luma block of the current chroma block, it belongs to the center 32×32 luma block of the TT partition. In this case, we call the corresnponding luma block that covers the top-left sample of the collocated luma block as a "corresponding luma block". Therefore, in this example, the top-left sample of the corresponding luma block is located at (x=32, y=16).

Hereinafter, DMVD (decoder-side motion vector derivation) is used to represent BDOF (a.k.a BIO) or/and DMVR (decode-side motion vector refinement) or/and FRUC (frame rate up-conversion) or/and other method that refines motion vector or/and prediction sample value at decoder.

Removal of the Chroma Scaling Latency of LMCS and Model Computation of CCLM

1. It is proposed that for an inter-coded block, one or multiple reference samples of the current block in reference frames may be used to derive the chroma residual scaling factor in the LMCS mode.
   a) In one example, reference luma samples may be directly used to derive the chroma residual scaling factor.
      i. Alternatively, interpolation may be firstly applied to reference samples and the interpolated samples may be used to derive the chroma residual scaling factor.
      ii. Alternatively, reference samples in different reference frames may be utilized to derive the final reference samples that are used for the chroma residual scaling factor derivation.
         1) In one example, for bi-prediction coded blocks, the above method may be applied.
      iii. In one example, the intensities of reference samples may be converted to reshaping domain before being used to derive the chroma residual scaling factor.
      iv. In one example, linear combination of the reference samples may be used to derive the chroma residual scaling factor.
         1) For example, a×S+b may be used to derive the chroma residual scaling factor, where
   S is a reference sample, a and b are parameters. In one example, a and b may be derived by Localized Illuminate Compensation (LIC).
   b) In one example, the location of the reference luma samples in the reference frame may depend on the current block's motion vector(s).
      i. In one example, a reference sample belongs to a reference luma block, which is in a reference picture, and with the same width and height as the current luma block. The position of the reference luma sample in the reference picture may be calculated as the position of its corresponding luma sample in the current picture, adding a motion vector.
      ii. In one example, the position of the reference luma samples may be derived by the position of top-left (or center, or bottom-right) sample of the current luma block and current block's motion vector, referred as a corresponding luma sample in the reference frame.
         1) In one example, an integer motion vector may be used to derive the corresponding luma sample in the reference frame. In one example, the motion vector associated with one block may be either rounded toward zero, or rounded away from zero to derive the integer motion vector.
         2) Alternatively, a fractional motion vector may be used to derive the corresponding luma sample in the reference frame, so that the interpolation process may be required to derive the fractional reference samples.
      iii. Alternatively, the position of the reference luma samples may be derived by the position of top-left (or center, or bottom-right) sample of current luma block.
      iv. Alternatively, multiple corresponding luma samples at some pre-defined positions in the reference frame may be picked to calculate the chroma residual scaling factor.
   c) In one example, the median or average value of the multiple reference luma samples may be used to derive the chroma residual scaling factor.
   d) In one example, the reference luma samples in pre-defined reference frames may be used to derive the chroma residual scaling factor.
      i. In one example, the pre-defined reference frame may be the one with reference index equal to 0 of reference picture list 0.
      ii. Alternatively, the reference index and/or reference picture list for the pre-defined reference frame may be signaled in sequence/picture/tile group/slice/tile/CTU row/video unit level.
      iii. Alternatively, the reference luma samples in multiple reference frames may be derived and the averaged or weighted average values may be utilized to get the chroma residual scaling factor.

2. It is proposed that whether and how to derive the chroma residual scaling factor from luma samples in the LMCS mode may depend on whether the current block applies bi-prediction.
   a) In one example, the chroma residual scaling factor is derived for each prediction direction individually.

3. It is proposed that whether and how to derive the chroma residual scaling factor from luma samples in the LMCS mode may depend on whether the current block applies sub-block-based prediction.
   a) In one example, the sub-block-based prediction is affine prediction;
   b) In one example, the sub-block-based prediction is Alternative Temporal Motion Vector Prediction (ATMVP).
   c) In one example, the chroma residual scaling factor is derived for each sub-block individually.
   d) In one example, the chroma residual scaling factor is derived for the whole block even if it is predicted by sub-blocks.
      i. In one example, motion vector of one selected sub-block (e.g., top-left sub-block) may be used to identify the reference samples of current block as described in bullet 1.

4. It is proposed that the luma prediction values used to derive the chroma residual scaling factor may be intermediate luma prediction value instead of the final luma prediction value.
   a) In one example, the luma prediction values before the process of Bi-Directional Optical Flow (BDOF, a.k.a. BIO) may be used to derive the chroma residual scaling factor.
   b) In one example, the luma prediction values before the process of Decoder-side Motion Vector Refinement (DMVR) may be used to derive the chroma residual scaling factor.
   c) In one example, the luma prediction values before the process of LIC may be used to derive the chroma residual scaling factor.
   d) In one example, the luma prediction values before the process of Prediction Refinement Optical Flow (PROF) as proposed in JVET-N0236 may be used to derive the chroma residual scaling factor.
5. Intermediate motion vectors may be used to identify the reference samples.
   a) In one example, motion vector before the process of BDOF or/and DMVR or/and other DMVD methods may be used to identify the reference samples.
   b) In one example, the motion vector before the process of Prediction Refinement Optical Flow (PROF) as proposed in JVET-N0236 may be used to identify the reference samples.
6. The above methods may be applicable when the current block is coded with inter mode.
7. It is proposed that for an IBC-coded block, one or multiple reference samples in reference block of current frame may be used to derive the chroma residual scaling factor in the LMCS mode. When the block IBC-coded, the term "motion vector" may also be referred as "block vector", where the reference picture is set as the current picture.
   a) In one example, a reference sample belongs to a reference block, which is in the current picture, and with the same width and height as the current block. The position of the reference sample may be calculated as the position of its corresponding sample adding a motion vector.
   b) In one example, the position of the reference luma samples may be derived by the position of top-left (or center, or bottom-right) sample of current luma block adding a motion vector.
   c) Alternatively, the position of the reference luma samples may be derived by the position of top-left (or center, or bottom-right) sample of current luma block adding current block's block vector.
   d) Alternatively, multiple corresponding luma samples at some pre-defined positions in the reference region of current luma block may be picked to calculate the chroma residual scaling factor.
   e) In one example, multiple corresponding luma samples may be computed with a function to derive the chroma residual scaling factor.
      i. For example, the median or average value of multiple corresponding luma samples may be computed to derive the chroma residual scaling factor.
   f) In one example, the intensities of reference samples may be converted to reshaping domain before being used to derive the chroma residual scaling factor.
      i. Alternatively, the intensities of reference samples may be converted to original domain before being used to derive the chroma residual scaling factor
8. It is proposed that one or multiple prediction/reconstructed samples which are located at the identified location(s) of the current luma block in the current frame may be used to derive the chroma residual scaling factor for the current chroma block in the LMCS mode.
   a) In one example, if current block is inter-coded, the luma prediction (or reconstruction) sample located in the center of the current luma block may be picked to derive the chroma residual scaling factor.
   b) In one example, the average value of the first M×N luma prediction (or reconstruction) samples may be picked to derive the chroma residual scaling factor, where M×N could be smaller than collocated luma block size width×height.
9. It is proposed that the whole or partial of the procedure used to calculate the CCLM model may be used for the chroma residual scaling factor derivation of current chroma block in the LMCS mode.
   a) In one example, reference samples which are located at the identified locations of neighboring luma samples of the collocated luma block in CCLM model parameter derivation process may be utilized to derive chroma residual scaling factor.
      i. In one example, those reference samples may be directly used.
      ii. Alternatively, downsampling may be applied to those reference samples, and downsampled reference samples may be applied.
   b) In one example, K out of S reference samples selected for CCLM model computation may be used for chroma residual scaling factor derivation in the LMCS mode. E.g., K is equal to 1 and S is equal to 4.
   c) In one example, the average/minimum/maximum value of the reference samples of the collocated luma block in CCLM mode may be used for chroma residual scaling factor derivation in the LMCS mode.
10. How to select samples for derivation of chroma residual scaling factors may be dependent on the coded information of current block.
    a) The coded information may include QP, coding mode, POC, intra-prediction mode, motion information and so on.
    b) In one example, for IBC coded or Non-IBC coded blocks, the way to select samples may be different.
    c) In one example, the way to select samples may be different based on the reference picture information, such as POC distance between reference pictures and current picture.
11. It is proposed that the chroma residual scaling factor and/or the model computation of CCLM may depend on neighboring samples of a corresponding luma block which covers the top-left sample of the collocated luma block.
    a) The "corresponding luma coding block" may be defined as the coding block which covers the top-left position of the collocated luma coding block.
       i. FIG. 5 shows an example, where for an intra-coded chroma block in dual tree case, the CTU partition of chroma component may be different from the CTU partition of luma component. Firstly, a "corresponding luma coding block" covering the top-left sample of the collocated luma block of current chroma block is retrieved. Then by using the block size information of the "corresponding luma coding block", the top-left sample of the "corresponding luma coding block" can be derived, the top-left luma sample of the "corresponding luma coding block" covering the top-left sample of the collocated luma block is located at (x=32, y=16).
b) In one example, the reconstructed samples not in the "corresponding luma coding block" may be used to derive the chroma residual scaling factor and/or model computation of CCLM.
  i. In one example, the reconstructed samples adjacent to the "corresponding luma coding block" may be used to derive the chroma residual scaling factor and/or model computation of CCLM.
    1) In one example, N samples located at the left neighboring columns and/or the above neighboring rows of the "corresponding luma coding block" may be used to derive the chroma residual scaling factor and /or the model computation of CCLM, where N=1 . . . 2W+2H, W and H are the width and height of the "corresponding luma coding block".
      a) Suppose the top-left sample of the "corresponding luma coding block" is (xCb, yCb), then in one example, the above neighboring luma sample may locate at (xCb+W/2, yCb−1), or (xCb−1, yCb−1). In an alternative example, the left neighboring luma sample may locate at (xCb+W−1, yCb−1).
      b) In one example, the location(s) of the neighboring sample(s) may be fixed, and/or in a pre-defined checking order.
    2) In one example, 1 out of N neighboring samples may be selected to derive the chroma residual scaling factor and/or the model computation of CCLM. Assume N=3, and the checking order of the three neighbor samples (xCb−1, yCb−H−1), (xCb+W/2, yCb−1), (xCb−1, yCb−1), then the first available neighboring sample in the checking list may be selected to derive the chroma residual scaling factor.
    3) In one example, the median or average value of N samples located at the left neighboring columns and/or the above neighboring rows of the "corresponding luma coding block" may be used to derive the chroma residual scaling factor and/or the model computation of CCLM, where N=1 . . . 2W+2H, W and H are the width and height of the "corresponding luma coding block".
c) In one example, whether to perform the chroma residual scaling may depend on the "available" neighbouring samples of a corresponding luma block.
  i. In one example, the "availability" of neighbouring samples may depend on the encoding mode of the current block/sub-block or/and encoding mode of the neighbouring sample.
    1) In one example, for a block coded in inter mode, neighbouring samples coded in intra mode or/and IBC mode or/and CIIP mode or/and LIC mode may be considered as "unavailable".
    2) In one example, for a block coded in inter mode, neighbouring samples employs diffusion filter or/and bilateral filter or/and Hadamard transform filter may be considered as "unavailable".
  ii. In one example, the "availability" of the neighbouring samples may depend on the width and/or height of the current picture/tile/tile group/VPDU/slice.
    1) In one example, if the neighbouring block locates outside the current picture, then it is treated as "unavailable".
  iii. In one example, when there is no "available" neighbouring sample, chroma residual scaling may be disallowed.
  iv. In one example, when the number of "available" neighbouring samples is smaller than K (K>=1), chroma residual scaling may be disallowed.
  v. Alternatively, the unavailable neighbouring sample may be filled by a default fixed value, or padding, or substitution, so that the chroma residual scaling may always be applied.
    1) In one example, if the neighbouring sample is not available, then it may be filled by 1<<(bitDepth−1), where bitDepth specifies the bit depth of the samples of the luma/chroma components.
    2) Alternatively, if the neighbouring sample is not available, then it may be filled by padding from the surrounding samples located in the left/right/top/bottom neighbour.
    3) Alternatively, if the neighbouring sample is not available, then it may be substituted by the first available adjacent sample at a pre-defined checking order.
d) In one example, the filtered/mapped reconstructed samples neighboring the "corresponding luma coding block" may be used to derive the chroma residual scaling factor and/or the model computation of CCLM.
  i. In one example, the filtering/mapping process may include reference smoothing filtering for intra blocks, post-filtering such as bilateral filter, Hadamard transform based filter, forward mapping of reshaper domain and so on.

Restriction on Whether Chroma Residual Scaling and/or CCLM is Applied or Not

Figure 7:
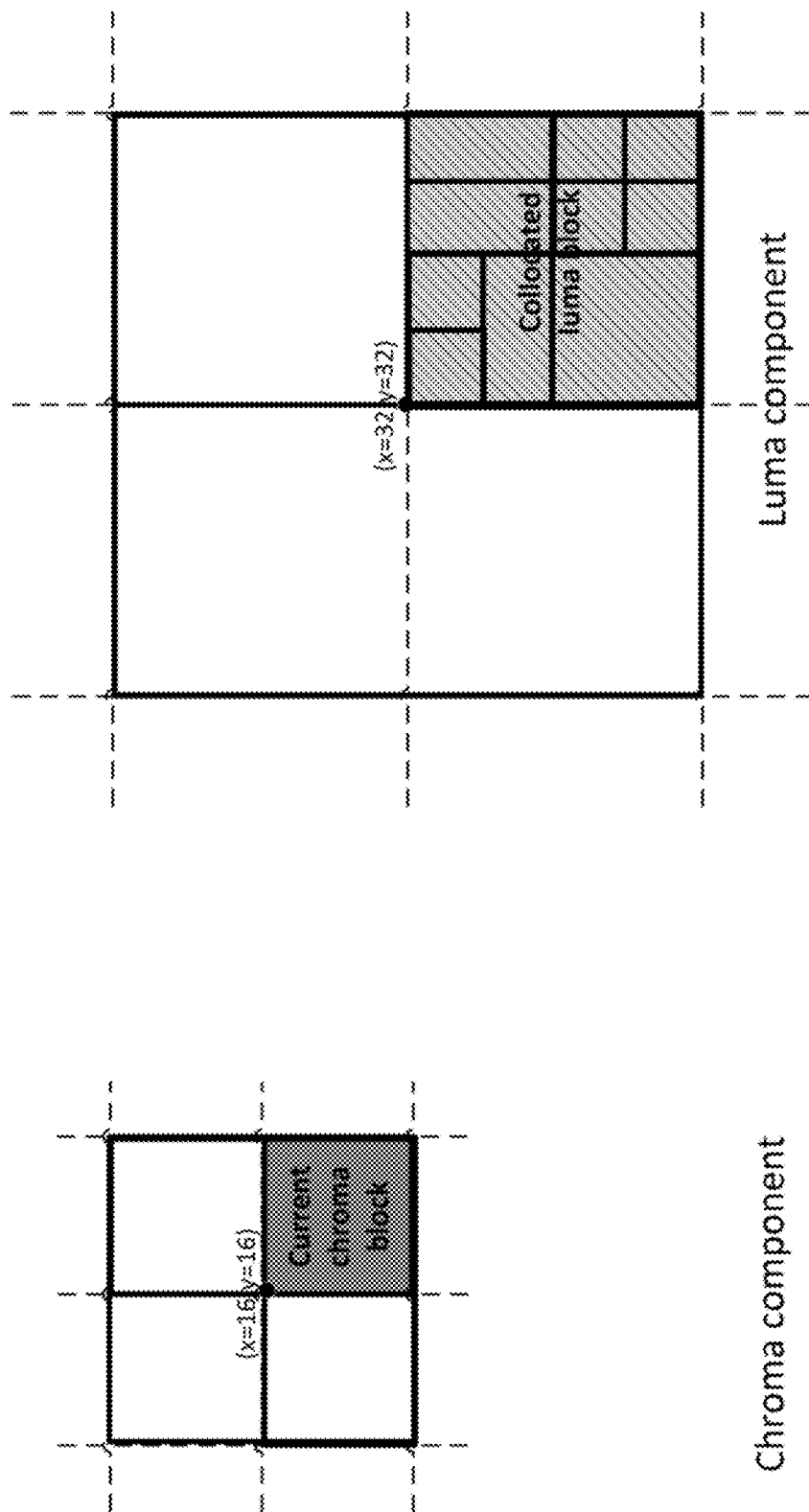
FIG. 7 shows an example of collocated luma block covering multiple formats.
Figure 8:
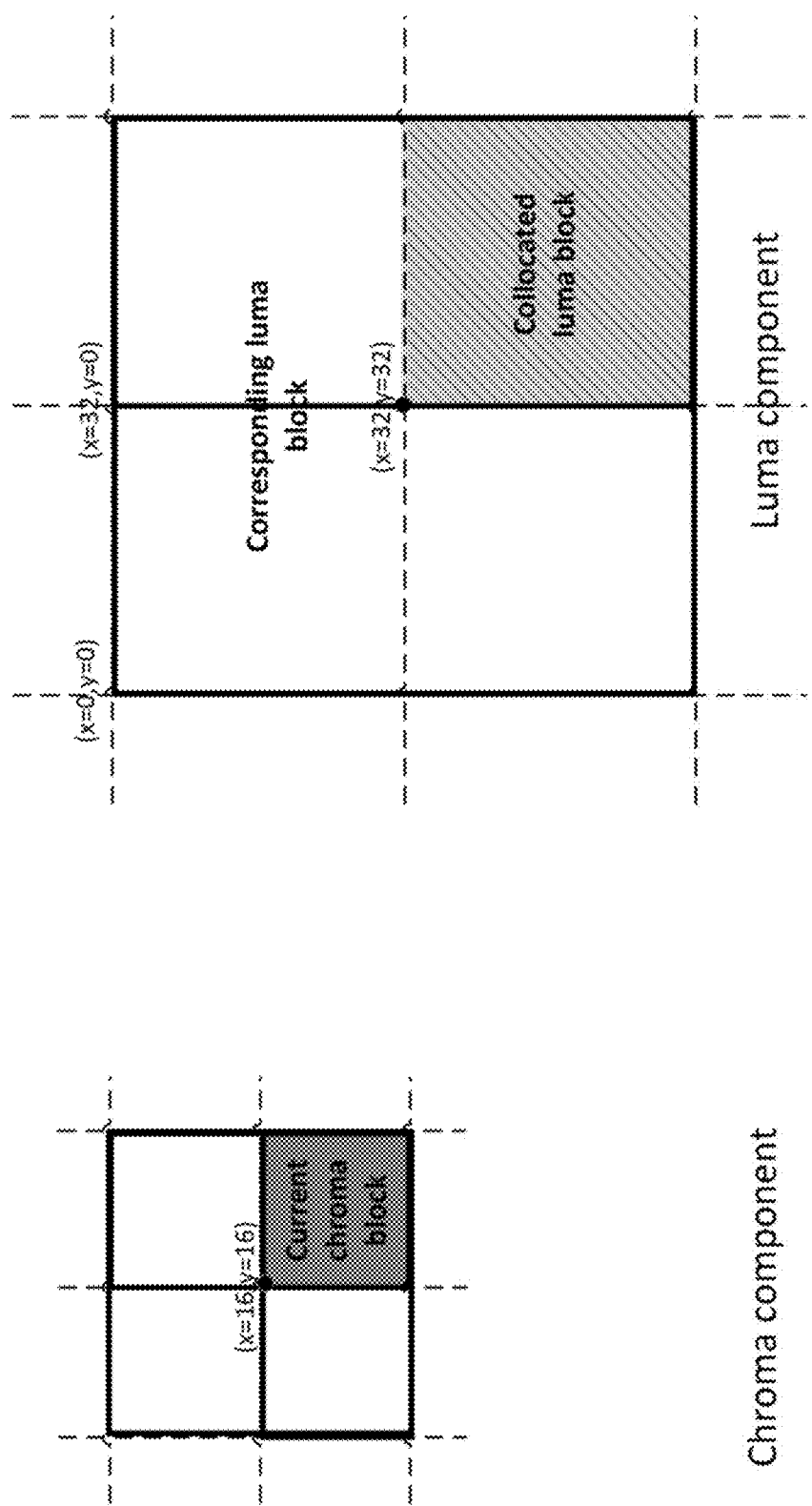
FIG. 8 shows an example of luma block within a larger luma block.
Figure 9:
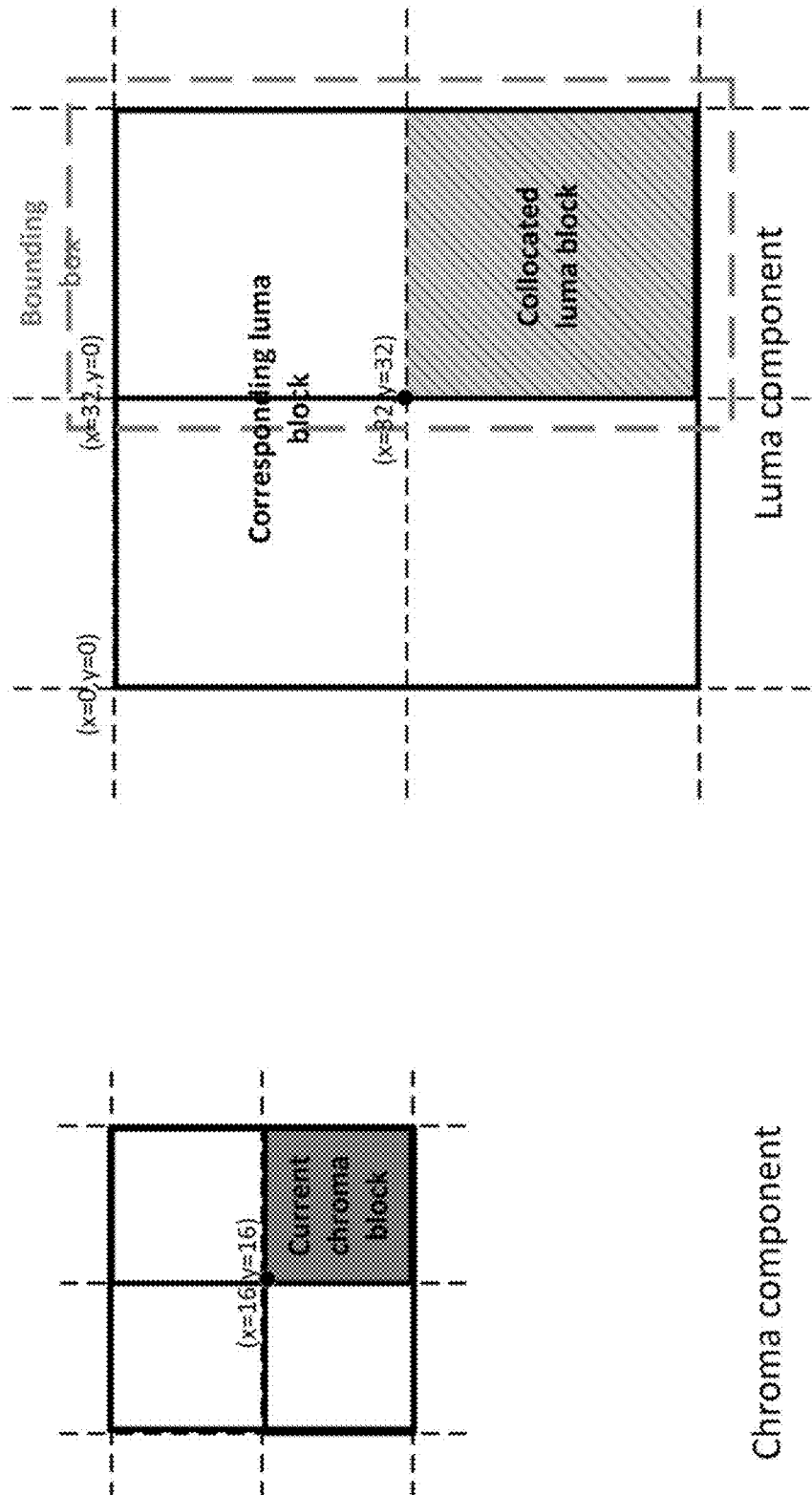
FIG. 9 shows an example of luma block within a larger luma block and within a bounding box.

12. It is proposed that whether the chroma residual scaling or CCLM is applied or not may depend on the partition of the corresponding and/or the collocated luma block.
  a) In one example, whether to enable or disable tools with cross-component information may depend on the number of CU/PU/TUs within the collocated luma (e.g., Y or G component) block.
    i. In one example, if the number of CU/PU/TUs within the collocated luma (e.g., Y or G component) block exceeds a number threshold, such tools may be disabled.
    ii. Alternatively, whether to enable or disable tools with cross-component information may depend on the partition tree depth.
      1) In one example, if the maximum (or minimum or average or other variation) quadtree depth of CUs within the collocated luma block exceeds a threshold, such tools may be disabled.
      2) In one example, if the maximum (or minimum or average or other variation) BT and/or TT depth of CUs within the collocated luma block exceeds a threshold, such tools may be disabled.
    iii. Alternatively, furthermore, whether to enable or disable tools with cross-component information may depend on the block dimension of the chroma block.
    iv. Alternatively, furthermore, whether to enable or disable tools with cross-component information may depend on whether the collocated luma cross multiple VPDUs/pre-defined region sizes.
    v. The thresholds in the above discussion may be fixed numbers, or may be signaled, or may be dependent on standard profiles/levels/tiers.

b) In one example, if the collocated luma block of current chroma block is divided by multiple partitions (e.g., in FIG. 7), then the chroma residual scaling and/or CCLM may be prohibited.
   i. Alternatively, if the collocated luma block of current chroma block is not split (e.g., within one CU/TU/PU), then the chroma residual scaling and/or CCLM may be applied.
c) In one example, if the collocated luma block of current chroma block contains more than M CUs/PUs/TUs, then the chroma residual scaling and/or CCLM may be prohibited.
   i. In one example, M may be an integer greater than 1.
   ii. In one example, M may be dependent on whether it is CCLM or chroma residual scaling process.
   iii. M may be fixed numbers, or may be signaled, or may be dependent on standard profiles/levels/tiers
d) The above-mentioned CUs within the collocated luma block may be interpreted to be all CUs within the collocated luma block. Alternatively, CUs within the collocated luma block may be interpreted to be partial CUs within the collocated luma block, such as CUs along the boundary of the collocated luma block.
e) The above-mentioned CUs within the collocated luma block may be interpreted to be sub-CUs or sub-blocks.
   i. For example, sub-CUs or sub-blocks may be used in ATMVP;
   ii. For example, sub-CUs or sub-blocks may be used in affine prediction;
   iii. For example, sub-CUs or sub-blocks may be used in Intra Sub-Partitions (ISP) mode.
f) In one example, if the CU/PU/TU covering the top-left luma sample of the collocated luma block is larger than a pre-defined luma block size, then the chroma residual scaling and/or CCLM may be prohibited.
   i. An example is depicted in FIG. 8, the collocated luma block is 32×32 but it is within a corresponding luma block with size equal to 64×64, then if the pre-defined luma block size is 32×64, the chroma residual scaling and/or CCLM is prohibited in this case
   ii. Alternatively, if the collocated luma block of current chroma block is not split, and the corresponding luma block covering the top-left luma sample of the collocated luma blocks is completely included within a pre-defined bounding box, then the chroma residual scaling and/or CCLM for current chroma block may be applied. The bounding box may be defined as a rectangle with width W and height H, denoted by WxH, as shown in FIG. 9, where the corresponding luma block is with width 32 and height 64, and the bounding box is with width 40 and height 70.
      1) In one example, the size WxH of the bounding box may be defined according to the CTU width and/or height, or according to the CU width and/or height, or according to arbitrary values.
g) In one example, if the collocated luma block of current chroma block is divided by multiple partitions, then only the prediction samples (or reconstructed samples) inside the pre-defined partition of the collocated luma block are used to derive the chroma residual scaling factor in LMCS mode.
   i. In one example, the average of all the prediction samples (or reconstructed samples) in the first partition of the collocated luma block are used to derive the chroma residual scaling factor in the LMCS mode.
   ii. Alternatively, the top-left prediction sample (or reconstructed sample) in the first partition of the collocated luma block is used to derive the chroma residual scaling factor in the LMCS mode.
   iii. Alternatively, the center prediction sample (or reconstructed sample) in the first partition of the collocated luma block is used to derive the chroma residual scaling factor in the LMCS mode.
h) It is proposed that whether and how to apply the cross-component tools such as CCLM and LMCS may depend on the coding mode(s) of one or multiple luma CUs which cover at least one sample of the collocated luma block.
   i. For example, the cross-component tools are disabled if one or multiple luma CUs which cover at least one sample of the collocated luma block are coded with affine mode;
   ii. For example, the cross-component tools are disabled if one or multiple luma CUs which cover at least one sample of the collocated luma block are coded with bi-prediction;
   iii. For example, the cross-component tools are disabled if one or multiple luma CUs which cover at least one sample of the collocated luma block are coded with BDOF;
   iv. For example, the cross-component tools are disabled if one or multiple luma CUs which cover at least one sample of the collocated luma block are coded with DMVR;
   v. For example, the cross-component tools are disabled if one or multiple luma CUs which cover at least one sample of the collocated luma block are coded with matrix affine prediction mode as proposed in JVET-N0217;
   vi. For example, the cross-component tools are disabled if one or multiple luma CUs which cover at least one sample of the collocated luma block are coded with inter mode;
   vii. For example, the cross-component tools are disabled if one or multiple luma CUs which cover at least one sample of the collocated luma block are coded with ISP mode;
   viii. In one example, "one or multiple luma CUs which cover at least one sample of the collocated luma block" may refer the corresponding luma block.
i) When CCLM/LMCS is prohibited, signalling of the indication of usage of CCLM/LMCS may be skipped.
j) In this disclosure, CCLM may refer to any variants modes of CCLM, including LM mode, LM-T mode, and LM-L mode.

13. It is proposed that whether and how to apply the cross-component tools such as CCLM and LMCS may be performed on part of a chroma block.
   a) In one example, whether and how to apply the cross-component tools such as CCLM and LMCS at chroma subblock level.
      i. In one example, a chroma subblock is defined as a 2×2 or 4×4 block in a chroma CU.
      ii. In one example, for a chroma subblock, when the corresponding luma coding block of the current chroma CU covers all samples of the corresponding block of the subblock, CCLM may be applied.
      iii. In one example, for a chroma subblock, when not all samples of the corresponding block are covered by the corresponding luma coding block of the current chroma CU, CCLM is not applied.
    iv. In one example, the parameters of CCLM or LMCS are derived for each chroma subblock as treating the subblock as a chroma CU.
    v. In one example, when CCLM or LMCS are applied for a chroma subblock, the collocated block's samples may be used.

Applicability of Chroma Residual Scaling in LMCS Mode

14. It is proposed that whether luma dependent chroma residual scaling can be applied may be signalled at other syntax level in addition to the tile group header as specified in JVET-M1001.
    a) For example, a chroma_residual_scale_flag may be signalled at sequence level (e.g. in SPS), at picture level (e.g. in PPS or picture header), at slice level (e.g. in slice header), at tile level, at CTU row level, at CTU level, at CU level. chroma_residual_scale_flag equal to 1 specifies that chroma residual scaling is enabled for the CUs below the signalled syntax level. chroma_residual_scale_flag equal to 0 specifies that chroma residual scaling is not enabled for below the signalled syntax level. When chroma_residual_scale_flag is not present, it is inferred to be equal to 0.
    b) In one example, if chroma residual scaling is constrained at a partition node level. Then chroma_residual_scale_flag may not be signalled and inferred to be 0 for CUs covered by the partition node. In one example, a partition node may be a CTU (CTU is treated as the root node of quaternary tree partition).
    c) In one example, if chroma residual scaling is constrained for chroma block size equal or smaller than 32×32, then chroma_residual_scale_flag may not be signalled and inferred to be 0 for chroma block size equal or smaller than 32×32.

Applicability of CCLM Mode

15. It is proposed that whether CCLM mode can be applied may be signalled at other syntax levels in addition to the sps level as specified in JVET-M1001.
    a) For example, it may be signalled at picture level (e.g. in PPS or picture header), at slice level (e.g. in slice header), at tile group level (e.g. in tile group header), at tile level, at CTU row level, at CTU level, at CU level.
    b) In one example, cclm_flag may not be signalled and inferred to be 0 if CCLM cannot be applied.
        i. In one example, if chroma residual scaling is constrained for chroma block size equal or smaller than 8×8, then cclm_flag may not be signalled and inferred to be 0 for chroma block size equal or smaller than 8×8.

Unification of Chroma Residual Scaling Factor Derivation for Intra Mode and Inter Mode 16. Chroma residual scaling factor may be derived after encoding/decoding a luma block and may be stored and used for following coded blocks.
    a) In one example, certain prediction samples or/and intermediate prediction samples or/and reconstructed samples or/and reconstructed samples before loop filtering (e.g., before processed by deblocking filter or/and SAO filter or/and bilateral filter or/and Hadamard transform filter or/and ALF filter) in the luma block may be used for derivation of the chroma residual scaling factor.
        i. For example, partial samples in the bottom row or/and right column of the luma block may be used for derivation of the chroma residual scaling factor.
    b) In single tree case, when encoding a block coded in intra mode or/and IBC mode or/and inter mode, derived chroma residual scaling factor of neighboring blocks may be used for deriving scaling factor of the current block.
        i. In one example, certain neighboring blocks may be checked in order, and the first available chroma residual scaling factor may be used for the current block.
        ii. In one example, certain neighboring blocks may be checked in order, and a scaling factor may be derived based on the first K available neighboring chroma residual scaling factors.
        iii. In one example, for a block coded in inter mode or/and CIIP mode, if a neighboring block is coded in intra mode or/and IBC mode or/and CIIP mode, chroma residual scaling factor of the neighboring block may be considered as "unavailable".
        iv. In one example, neighboring blocks may be checked in order of left (or above left)->above (or above right).
            1) Alternatively, neighboring blocks may be checked in order of above (or above right)->left (or above left).
    c) In separate tree case, when encoding a chroma block, the corresponding luma block may be first identified. Then, derived chroma residual scaling factor of its (e.g., the corresponding luma block) neighboring blocks may be used for deriving scaling factor of the current block.
        i. In one example, certain neighboring blocks may be checked in order, and the first available chroma residual scaling factor may be used for the current block.
        ii. In one example, certain neighboring blocks may be checked in order, and a scaling factor may be derived based on the first K available neighboring chroma residual scaling factors.
    d) Neighboring blocks may be checked in a predefined order.
        i. In one example, neighboring blocks may be checked in order of left (or above left)->above (or above right)
        ii. In one example, neighboring blocks may be checked in order of above (or above right)->left (or above left).
        iii. In one example, neighboring blocks may be checked in order of below left->left->above right->above->above left.
        iv. In one example, neighboring blocks may be checked in order of left->above->above right->below left->above left.
    e) In one example, whether to apply chroma residual scaling may depend on the "availability" of neighbouring block.
        i. In one example, when there is no "available" neighbouring block, chroma residual scaling may be disallowed.
        ii. In one example, when the number of "available" neighbouring blocks is smaller than K (K>=1), chroma residual scaling may be disallowed.
        iii. Alternatively, when there is no "available" neighbouring block, chroma residual scaling factor may be derived by a default value.
            1) In one example, a default value 1<<(BitDepth−1) may be used to derive the chroma residual scaling factor.

5. EXAMPLE IMPLEMENTATIONS OF THE DISCLOSED TECHNOLOGY

Figure 10:
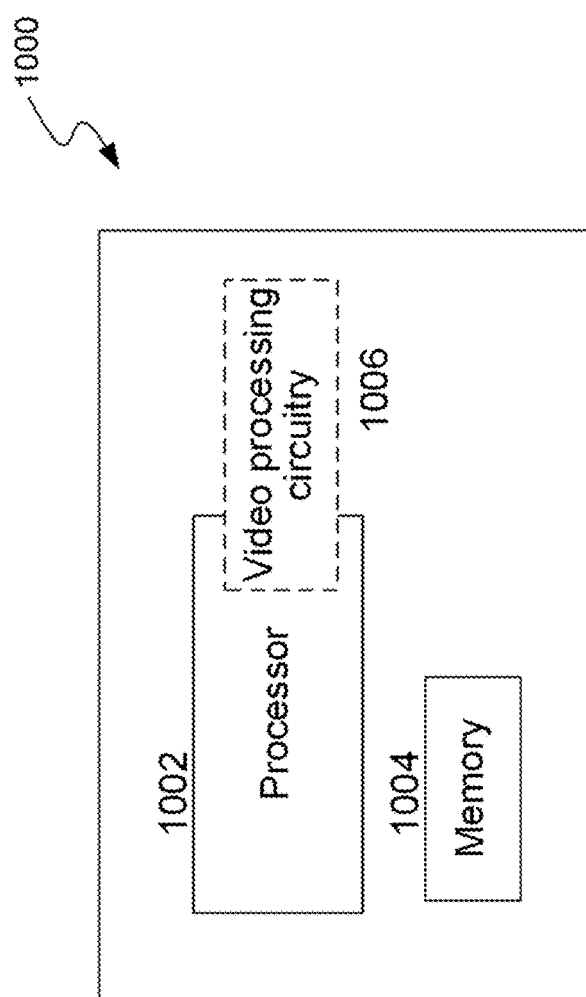
FIG. 10 is a block diagram of an example of a hardware platform for implementing a visual media decoding or a visual media encoding technique described in the present document.

FIG. 10 is a block diagram of a video processing apparatus 1000. The apparatus 1000 may be used to implement one or more of the methods described herein. The apparatus 1000 may be embodied in a smartphone, tablet, computer, Internet of Things (IoT) receiver, and so on. The apparatus 1000 may include one or more processors 1002, one or more memories 1004 and video processing hardware 1006. The processor(s) 1002 may be configured to implement one or more methods (including, but not limited to, methods 800 and 900) described in the present document. The memory (memories) 1004 may be used for storing data and code used for implementing the methods and techniques described herein. The video processing hardware 1006 may be used to implement, in hardware circuitry, some techniques described in the present document.

In some embodiments, the video coding methods may be implemented using an apparatus that is implemented on a hardware platform as described with respect to FIG. 10.

Figure 11:
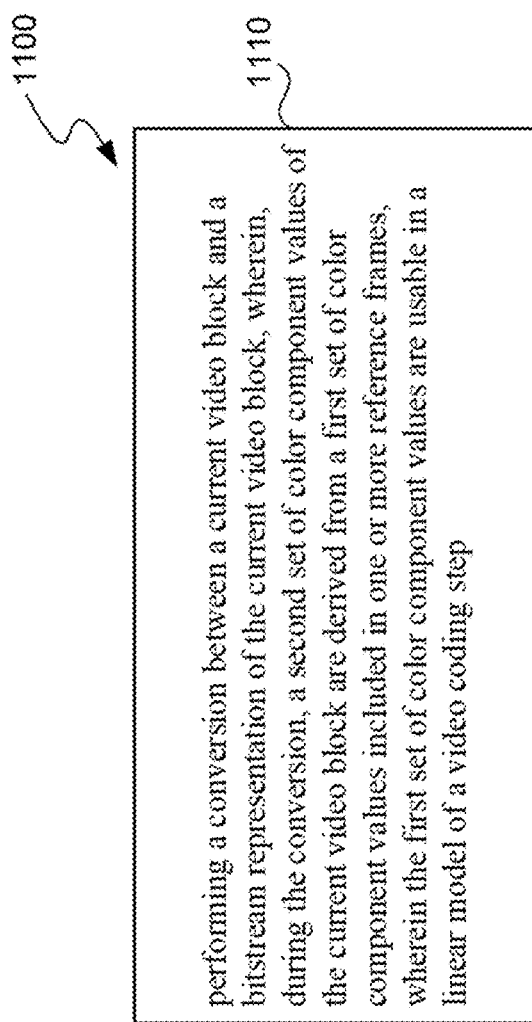
FIG. 11 shows a flowchart of an example method for linear model derivations for cross-component prediction in accordance with the disclosed technology.

FIG. 11 shows a flowchart of an example method 1100 for linear model derivations for cross-component prediction in accordance with the disclosed technology. The method 1100 includes, at step 1110, performing a conversion between a current video block and a bitstream representation of the current video block, wherein, during the conversion, a second set of color component values of the current video block are derived from a first set of color component values included in one or more reference frames, wherein the first set of color component values are usable in a linear model of a video coding step.

Some embodiments may be described using the following clause-based format.

1. A method for video processing, comprising:
performing a conversion between a current video block and a bitstream representation of the current video block, wherein, during the conversion, a second set of color component values of the current video block are derived from a first set of color component values included in one or more reference frames, wherein the first set of color component values are usable in a linear model of a video coding step.

2. The method of clause 1, wherein the first set of color component values are interpolated prior to use in the linear model of the video coding step.

3. The method of any one or more of clauses 1-2, wherein a linear combination of the first set of color component values are usable as parameters in the linear model.

4. The method of clause 1, wherein locations of the first set of color component values included in the one or more reference frames are selected based, at least in part, on motion information of the current video block.

5. The method of clause 4, wherein a position of a luma component value in the one or more reference frames is calculated from a position of a corresponding luma component value in the current video block and the motion information of the current video block.

6. The method of clause 5, wherein the position of the corresponding luma component value is a top-left sample, a center sample, or a bottom-right sample in the current video block.

7. The method of clause 6, wherein the motion information of the current video block corresponds to an integer motion vector or a fractional motion vector.

8. The method of clause 7, wherein the fractional motion vector is derived using a fractional luma component value in the one or more reference frames.

9. The method of clause 7, wherein the integer motion vector is derived by rounding towards zero or away from zero.

10. The method of clause 1, wherein locations of the first set of color component values included in the one or more reference frames are pre-defined positions.

11. The method of any one or more of clauses 1-10, wherein a median or an average of the first set of color component values are used to derive the second set of color component values of the current video block.

12. The method of any one or more of clauses 1-11, wherein the one or more reference frames are pre-defined reference frames.

13. The method of clause 12, wherein the pre-defined reference frames include a frame with a reference index of a reference picture list.

14. The method of clause 13, wherein the reference index is zero and the reference picture list is zero.

15. The method of clause 13, wherein the reference index and/or the reference picture list is signaled in the bitstream representation associated with one or more of the following: a sequence, a picture, a tile, a group, a slice, a tile, a coding tree unit row, or a video block.

16. The method of clause 1, wherein the second set of color component values of the current video block are derived from a mathematical mean or a weighted average of the first set of color component values included in the one or more reference frames.

17. The method of clause 1, wherein the second set of color component values of the current video block are selectively derived from the first set of color component values included in the one or more reference frames, based on whether the current video block is a bi-prediction coded block.

18. The method of clause 17, wherein the second set of color component values of the current video block are individually derived for each prediction direction of the first set of color component values.

19. The method of clause 1, wherein the second set of color component values of the current video block are selectively derived from the first set of color component values included in the one or more reference frames, based on whether the current video block is associated with sub-block-based prediction.

20. The method of clause 1, wherein the sub-block-based prediction corresponds to affine prediction or alternative temporal motion vector prediction (ATMVP).

21. The method of any one or more of clauses 19-20, wherein the second set of color component values of the current video block are derived for individual sub-blocks.

22. The method of any one or more of clauses 19-21, wherein the second set of color component values of the current video block are derived for an entirety of the current video block regardless of the sub-block-based prediction.

23. The method of any one or more of clauses 19-22, wherein the first set of color component values included in one or more reference frames are selected based, at least in part on, a motion vector of a sub-block of the current video block.

24. The method of any one or more of clauses 1-23, wherein the first set of color component values included in one or more reference frames are intermediate color component values.

25. The method of any one or more of clauses 1-24, wherein the video coding step precedes another video coding step.

26. The method of clause 25, wherein the first set of color component values included in the one or more reference frames are selected based, at least in part on, an intermediate motion vector of the current video block or a sub-block of the current video block, and wherein the intermediate motion vector is calculated prior to the another video coding step.

27. The method of any one or more of clauses 24-26, wherein the another video coding step includes one or a combination of the following steps: a Bi-Directional Optical Flow (BDOF) step, a decoder-side motion vector refinement (DMVR) step, a prediction refinement optical flow (PROF) step.

28. The method of any one or more of clauses 1-27, wherein the first set of color component values included in the one or more reference frames correspond to MxN luma component values associated with a corresponding luma block.

29. The method of clause 28, wherein the corresponding luma block is a collocated luma block of the current video block.

30. The method of clause 29, wherein a product of M and N is smaller than a product of a block width and a block height of the collocated luma block of the current video block.

31. The method of any one or more of clauses 27-30, wherein the first set of color component values included in the one or more reference frames correspond to at least a portion of reference samples identified at positions of neighboring luma samples of the collocated luma block.

32. The method of any one or more of clauses 1-31, wherein the first set of color component values are down sampled prior to use in the linear model of the video coding step.

33. The method of clause 1, wherein the second set of color component values of the current video block are selected, based, at least in part on, one or more of the following information of the current video block: a quantization parameter, a coding mode, or a picture order count (POC).

34. The method of clause 31, wherein the positions of the neighboring luma samples are such that a top left sample of the collocated luma block is covered.

35. The method of clause 28, wherein the first set of color component values included in the one or more reference frames correspond to at least a portion of reference samples identified at positions external to the corresponding luma block.

36. The method of clause 28, wherein the second set of color component values of the current video block are selectively derived from the first set of color component values included in the one or more reference frames, based on availability of neighboring samples of the corresponding luma block.

37. The method of clause 28, wherein the availability of the neighboring samples of the corresponding luma block is based on one or more of: a use of a coding mode of the current video block, a use of a coding mode of the neighboring samples of the corresponding luma block, a use of a type of a filter associated with the neighboring samples of the corresponding luma block, or a location of the neighboring samples of the corresponding luma block relative to the current video blocks or sub-blocks thereof.

38. The method of clause 28, further comprising:
in response to a lack of the availability of the neighboring samples of the corresponding luma block, substituting, filling, or padding unavailable samples with other samples.

39. The method of clause 28, further comprising:
applying a smoothing filter to samples neighboring the corresponding luma block.

40. A method for video processing, comprising:
performing a conversion between a current video block and a bitstream representation of the current video block, wherein, during the conversion, a second set of color component values of the current video block are derived from a first set of color component values included in one or more reference frames, wherein the first set of color component values are usable in a linear model of a video coding step; and
in response to determining that the first set of color component values included in the one or more reference frames is a collocated luma block of the current video block, selectively enabling or disabling derivation of the second set of color component values of the current video block, based on one or more conditions associated with the collocated luma block of the current video block.

41. The method of clause 40, wherein the one or more conditions associated with the collocated luma block of the current video block include: a partition size of the collocated luma block, a number of coding units of the collocated luma block achieving a threshold number, a top-left luma sample of the collocated luma block achieving a threshold size, a partition tree depth of the collocated luma block, or a corresponding luma block covering the top-left luma sample of the collocated luma block, or a corresponding luma block covering the top-left luma sample of the collocated luma block and additionally included within a bounding box of pre-defined size.

42. The method of clause 40, wherein information indicating the selectively enabling or disabling the derivation is included in the bitstream representation.

43. The method of clause 28, wherein the availability of neighboring samples of the corresponding luma block is associated with checking for the neighboring samples according to a pre-defined order.

44. The method of any one or more of clause 1-43, wherein the second set of color component values of the current video block are stored for use in connection with one or more other video blocks.

45. The method of any one or more of clauses 1-44, wherein the linear model corresponds to a cross-component linear model (CCLM) and the video coding step corresponds to a luma mapping with chroma scaling (LMCS) mode.

46. The method of any one or more of clauses 1-45, wherein the current video block is an inter-coded block, a bi-prediction coded block, or an intra block copy (IBC) coded block.

47. The method of any one or more of clauses 1-46, wherein the first set of color component values correspond to luma sample values and the second set of color component values correspond to chroma scaling factors.

48. An apparatus in a video system comprising a processor and a non-transitory memory with instructions thereon, wherein the instructions upon execution by the processor, cause the processor to implement the method in any one of clauses 1 to 47.

49. A computer program product stored on a non-transitory computer readable media, the computer program product including program code for carrying out the method in any one of clauses 1 to 47.

Figure 12:
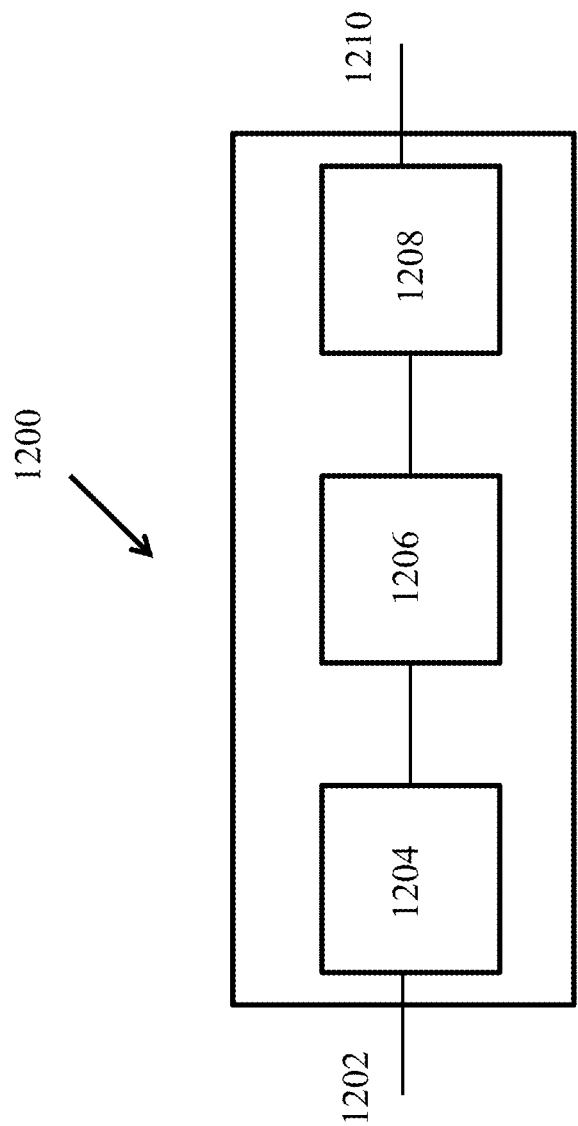
FIG. 12 is a block diagram of an example video processing system in which disclosed techniques may be implemented.

FIG. 12 is a block diagram showing an example video processing system 1200 in which various techniques disclosed herein may be implemented. Various implementations may include some or all of the components of the system 1200. The system 1200 may include input 1202 for receiving video content. The video content may be received in a raw or uncompressed format, e.g., 8 or 10 bit multi-component pixel values, or may be in a compressed or encoded format. The input 1202 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1200 may include a coding component 1204 that may implement the various coding or encoding methods described in the present document. The coding component 1204 may reduce the average bitrate of video from the input 1202 to the output of the coding component 1204 to produce a coded representation of the video. The coding techniques are therefore sometimes called video compression or video transcoding techniques. The output of the coding component 1204 may be either stored, or transmitted via a communication connected, as represented by the component 1206. The stored or communicated bitstream (or coded) representation of the video received at the input 1202 may be used by the component 1208 for generating pixel values or displayable video that is sent to a display interface 1210. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 13:
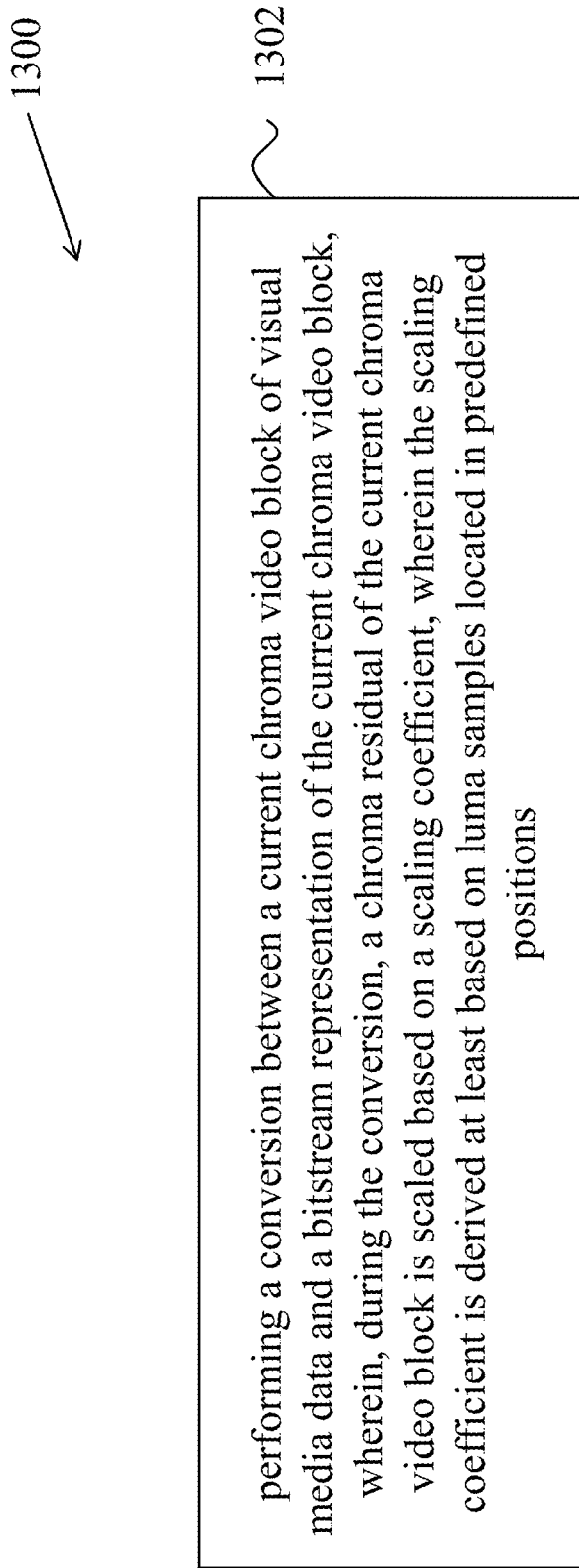
FIG. 13 shows a flowchart of an example method for visual media processing.

FIG. 13 shows a flowchart of an example method for visual media processing. Steps of this flowchart are discussed in connection with example embodiments 7d and 7e8 in Section 4 of this document. At step 1302, the process performs a conversion between a current chroma video block of visual media data and a bitstream representation of the current chroma video block, wherein, during the conversion, a chroma residual of the current chroma video block is scaled based on a scaling coefficient, wherein the scaling coefficient is derived at least based on luma samples located in predefined positions.

Figure 14:
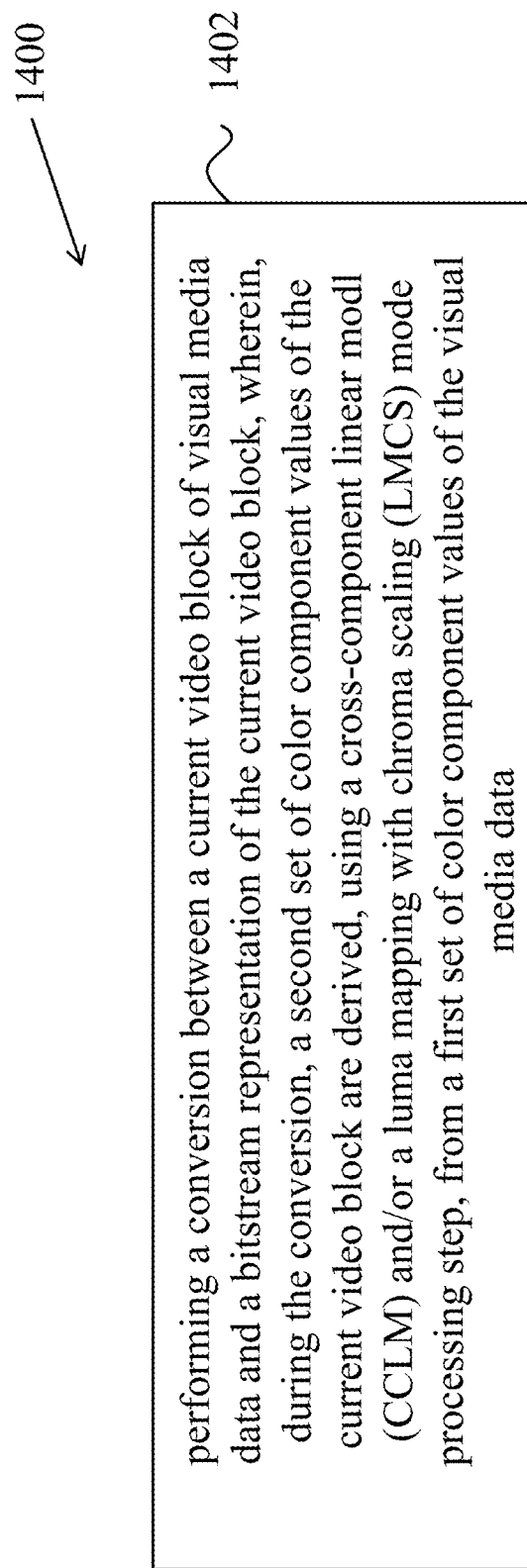
FIG. 14 shows a flowchart of an example method for visual media processing.

FIG. 14 shows a flowchart of an example method for visual media processing. Steps of this flowchart are discussed in connection with example embodiment 1 in Section 4 of this document. At step 1402, the process performs a conversion between a current video block of visual media data and a bitstream representation of the current video block, wherein, during the conversion, a second set of color component values of the current video block are derived, using a cross-component linear model (CCLM) and/or a luma mapping with chroma scaling (LMCS) mode processing step, from a first set of color component values of the visual media data.

Figure 15:
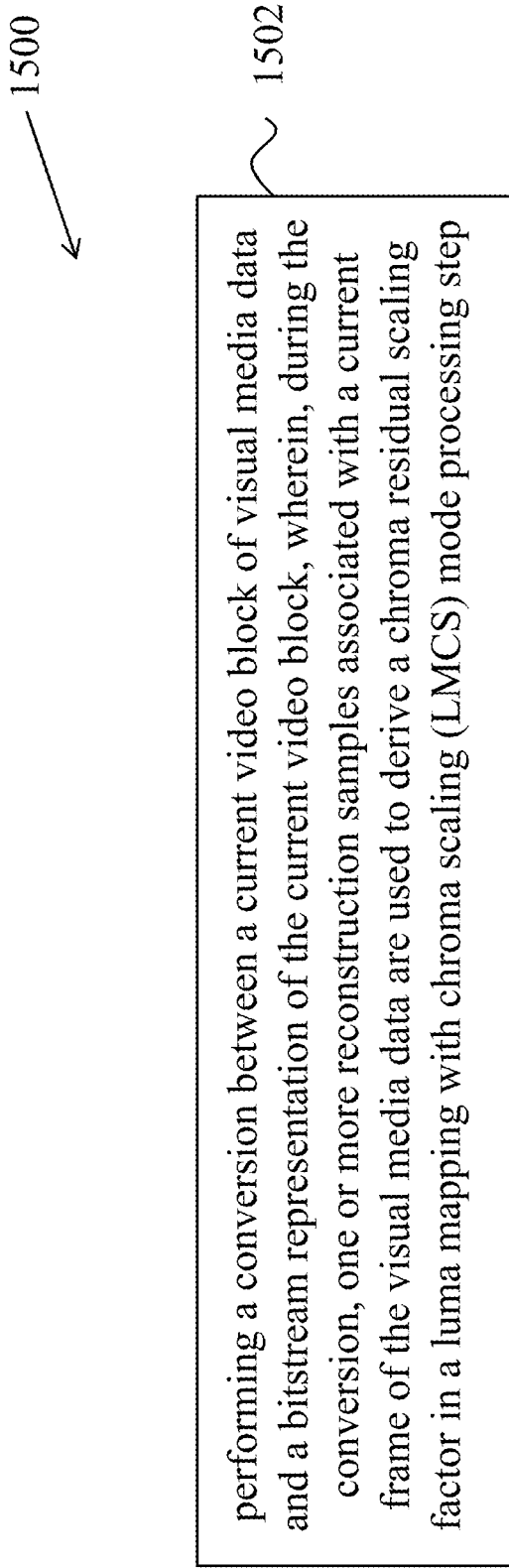
FIG. 15 shows a flowchart of an example method for visual media processing.

FIG. 15 shows a flowchart of an example method for visual media processing. Steps of this flowchart are discussed in connection with example embodiment 7 in Section 4 of this document. At step 1502, the process performs a conversion between a current video block of visual media data and a bitstream representation of the current video block, wherein, during the conversion, one or more reconstruction samples associated with a current frame of the visual media data are used to derive a chroma residual scaling factor in a luma mapping with chroma scaling (LMCS) mode processing step.

FIG. 16 shows a flowchart of an example method for visual media processing. Steps of this flowchart are discussed in connection with example embodiment 8 in Section 4 of this document. At step 1602, the process performs a conversion between a current video block of visual media data and a bitstream representation of the current video block, wherein, during the conversion, one or more luma prediction samples or luma reconstruction samples in a current frame other than a reference frame and are used to derive a chroma residual scaling factor in a luma mapping with chroma scaling (LMCS) mode processing step.

Figure 17:
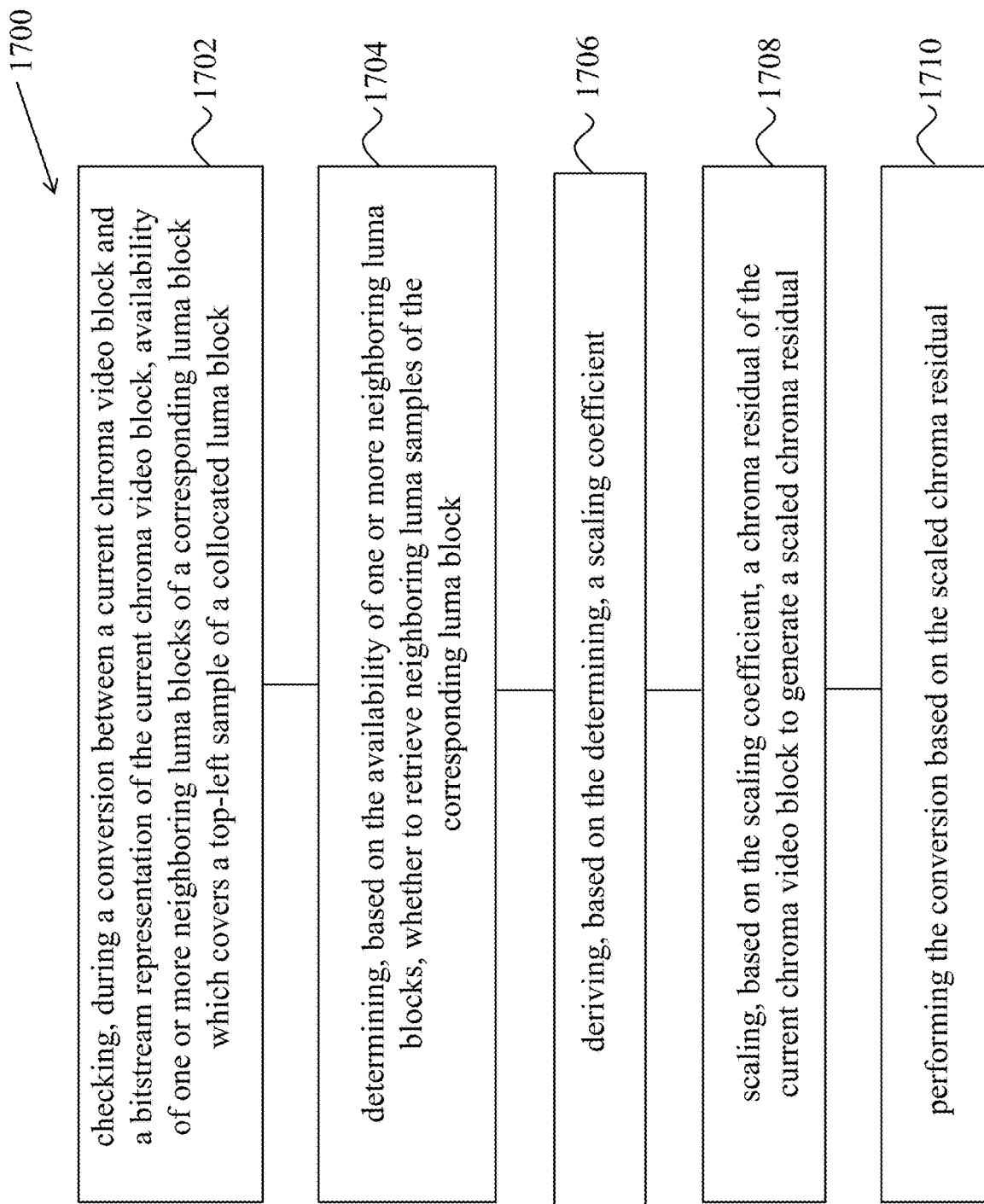
FIG. 17 shows a flowchart of an example method for visual media processing.

FIG. 17 shows a flowchart of an example method for visual media processing. Steps of this flowchart are discussed in connection with example embodiments 11a, 11b, 11c, and 11d in Section 4 of this document. At step 1702, the process checks, during a conversion between a current chroma video block and a bitstream representation of the current chroma video block, availability of one or more neighboring luma blocks of a corresponding luma block which covers a top-left sample of a collocated luma block. At step 1704, the process determines, based on the availability of one or more neighboring luma blocks, whether to retrieve neighboring luma samples of the corresponding luma block. At step 1706, the process derives, based on the determining, a scaling coefficient. At step 1708, the process scales, based on the scaling coefficient, a chroma residual of the current chroma video block to generate a scaled chroma residual. At step 1710, the process performs the conversion based on the scaled chroma residual.

Figure 18:
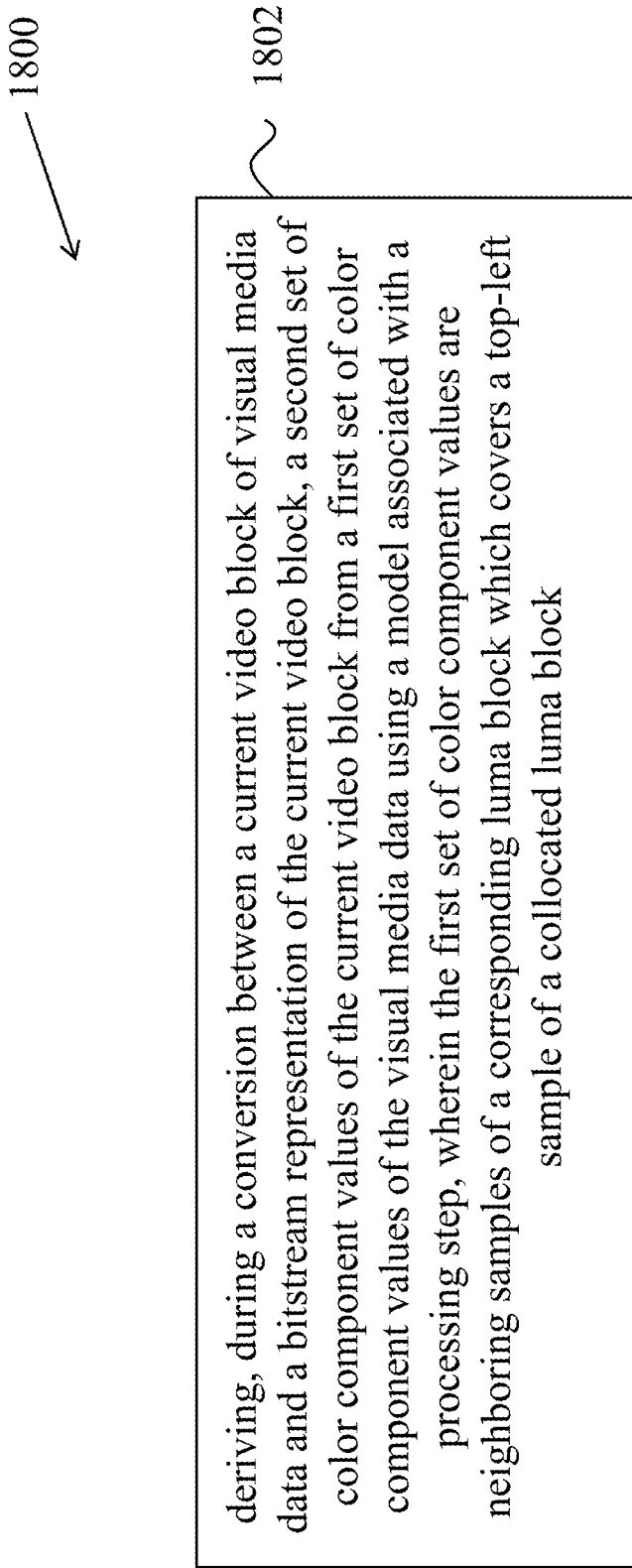
FIG. 18 shows a flowchart of an example method for visual media processing.

FIG. 18 shows a flowchart of an example method for visual media processing. Steps of this flowchart are discussed in connection with example embodiment 11 in Section 4 of this document. At step 1802, the process derives, during a conversion between a current video block of visual media data and a bitstream representation of the current video block, a second set of color component values of the current video block from a first set of color component values of the visual media data using a model associated with a processing step, wherein the first set of color component values are neighboring samples of a corresponding luma block which covers a top-left sample of a collocated luma block.

FIG. 19 shows a flowchart of an example method for visual media processing. Steps of this flowchart are discussed in connection with example embodiment 12 in Section 4 of this document. At step 1902, the process, during a conversion between a current chroma video block of visual media data and a bitstream representation of the current chroma video block, makes a determination of selectively enabling or disabling application of a cross-component linear model (CCLM) and/or a chroma residual scaling (CRS) on the current chroma video block, based at least in part on one or more conditions associated with a collocated luma block of the current chroma video block.

FIG. 20 shows a flowchart of an example method for visual media encoding. Steps of this flowchart are discussed in connection with example embodiment 14 in Section 4 of this document. At step 2002, the process selectively enables or disables application of a luma dependent chroma residual scaling (CRS) on chroma components of a current video block of visual media data for encoding the current video block in a video region of a visual media data into a bitstream representation of the visual media data. At step 2004, the process makes a determination of including or excluding a field in the bitstream representation of the visual media data, wherein the field is indicative of the selectively enabling or disabling and, if included, is signaled, other than at a first syntax level associated with the current video block.

Figure 21:
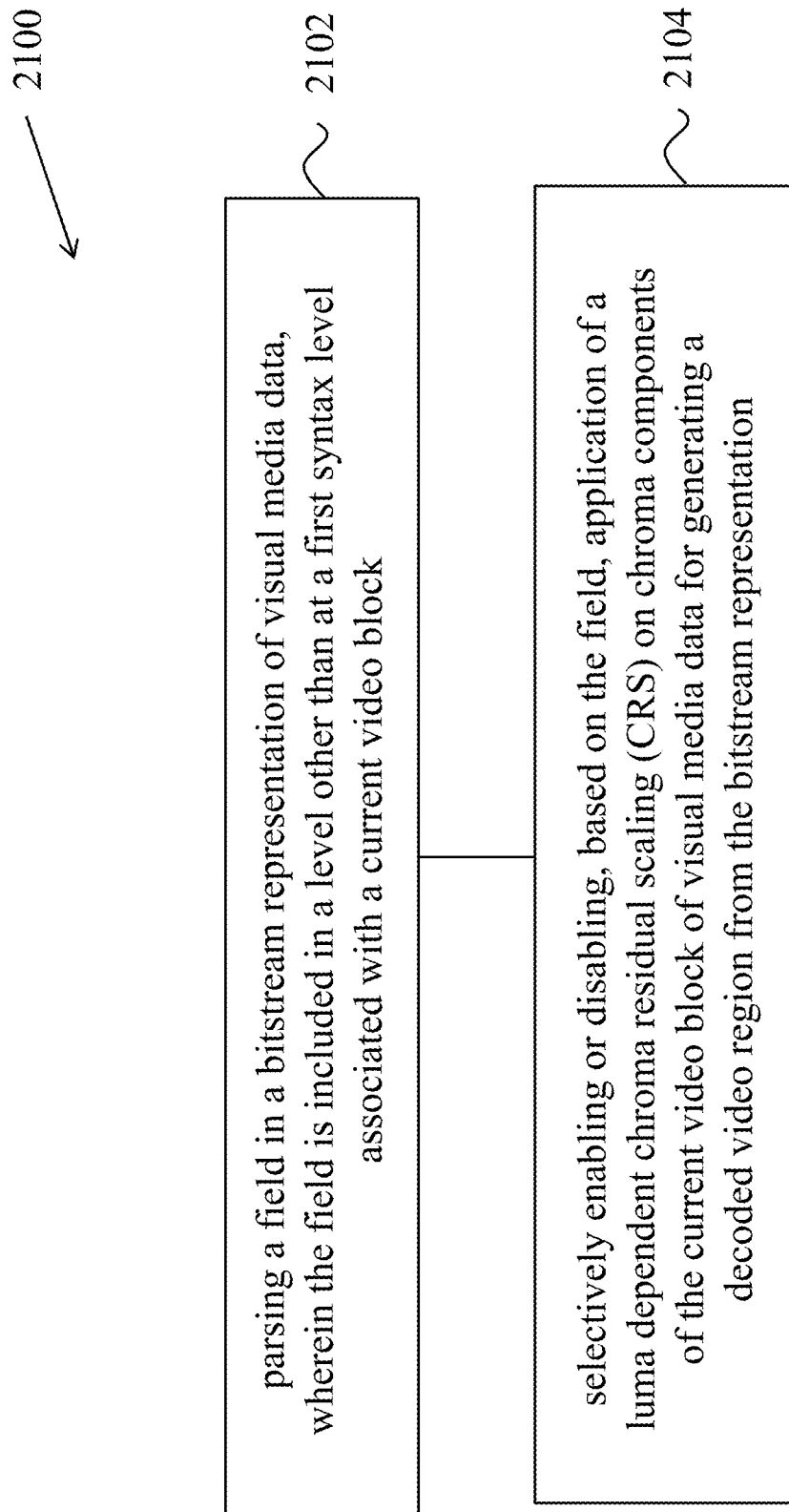
FIG. 21 shows a flowchart of an example method for visual media processing.

FIG. 21 shows a flowchart of an example method for visual media decoding. Steps of this flowchart are discussed in connection with example embodiment 14 in Section 4 of this document. At step 2102, the process parses a field in a bitstream representation of visual media data, wherein the field is included in a level other than at a first syntax level associated with a current video block. At step 2104, the process selectively enables or disables, based on the field, application of a luma dependent chroma residual scaling (CRS) on chroma components of the current video block of visual media data for generating a decoded video region from the bitstream representation.

FIG. 22 shows a flowchart of an example method for visual media encoding. Steps of this flowchart are discussed in connection with example embodiment 15 in Section 4 of this document. At step 2202, the process selectively enables or disables application of a cross-component linear model (CCLM) on a current video block of visual media data for encoding the current video block into a bitstream representation of the visual media data. At step 2204, the process makes a determination of including or excluding a field in a bitstream representation of the visual media data, wherein the field is indicative of the selectively enabling or disabling and, if included, is signaled, other than at a first syntax level associated with the current video block.

Figure 23:
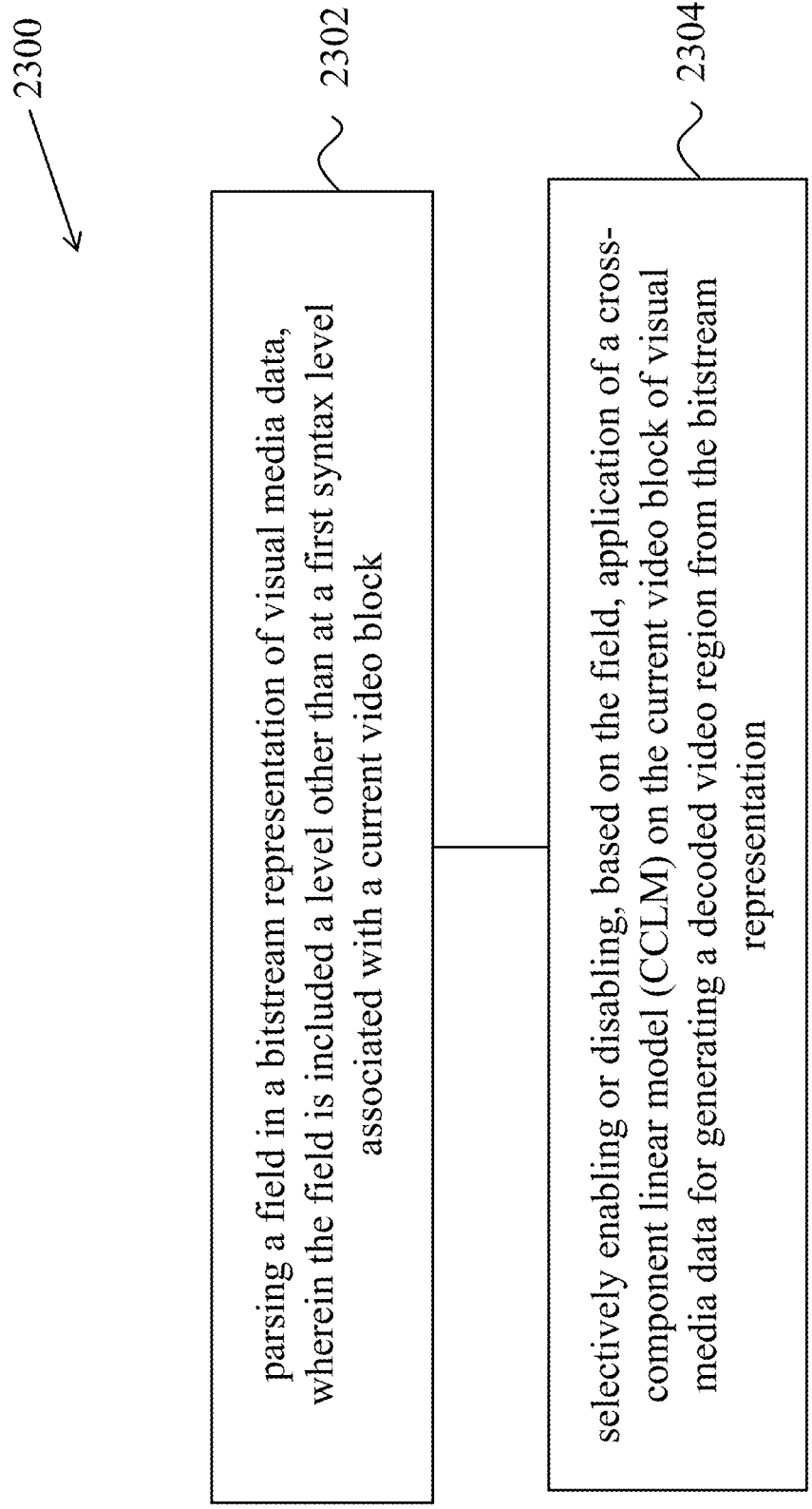
FIG. 23 shows a flowchart of an example method for visual media processing.

FIG. 23 shows a flowchart of an example method for visual media decoding. Steps of this flowchart are discussed in connection with example embodiment 15 in Section 4 of this document. At step 2302, the process parses a field in a bitstream representation of visual media data, wherein the field is included a level other than at a first syntax level associated with a current video block. At step 2304, the process selectively enables or disables, based on the field, application of a cross-component linear model (CCLM) on the current video block of visual media data for generating a decoded video region from the bitstream representation.

Some embodiments discussed in the present document are now presented in clause-based format.

X1. A method for visual media processing, comprising:
performing a conversion between a current chroma video block of visual media data and a bitstream representation of the current chroma video block, wherein, during the conversion, a chroma residual of the current chroma video block is scaled based on a scaling coefficient, wherein the scaling coefficient is derived at least based on luma samples located in predefined positions.

X2. The method of clause X1, wherein the scaling coefficient is computed using a function applied on the luma samples in the predefined positions.

X3. The method of clause X1, wherein the function is a median value function or a rounding-based average value function.

X4. The method of clause X1, wherein the predefined positions are determined based on a collocated luma block corresponding to the current chroma video block.

A1.
A method for visual media processing, comprising:
performing a conversion between a current video block of visual media data and a bitstream representation of the current video block, wherein, during the conversion, a second set of color component values of the current video block are derived, using a cross-component linear model (CCLM) and/or a luma mapping with chroma scaling (LMCS) mode processing step, from a first set of color component values of the visual media data.

A2. The method of clause A1, wherein the first set of color component values are reference samples of the current video block and the second set of color components values is a chroma residual scaling factor in the LMCS mode.

A3. The method of clause A2, wherein the reference samples are reference luma samples that are interpolated prior to deriving a chroma residual scaling factor.

A4. The method of clause A1, wherein the first set of color component values are reference samples included in different reference frames.

A5. The method of any one or more of clauses A1-A4, wherein a position of a reference sample is calculated from a position of a corresponding luma component value in the current video block and a motion information of the current video block.

A6. The method of clause A5, wherein the position of the corresponding luma component value is a top-left sample, a center sample, or a bottom-right sample in the current video block.

A7. The method of clause A6, wherein the motion information of the current video block corresponds to an integer motion vector or a fractional motion vector.

A8. The method of clause A7, wherein the fractional motion vector is derived using a fractional luma component value in a reference frame.

A9. The method of clause A7, wherein the integer motion vector is derived by rounding towards zero or away from zero.

A10. The method of any one or more of clauses A1-A2, wherein the first set of color component values are included in pre-defined reference frames of the visual media data.

A11. The method of any one or more of clauses A1-A10, wherein a median or an average of the first set of color component values are used to derive the second set of color component values of the current video block.

A12. The method of clause A10, wherein the pre-defined reference frames include a frame with a reference index of a reference picture list.

A13. The method of clause A12, wherein the reference index is zero and the reference picture list is zero.

A14. The method of any one or more of clauses A1-A2, wherein the first set of color component values are included in multiple reference frames of the visual media data and a weighted combination of the first set of color component values are used to derive the second set of color component values.

A15. The method of clause A13, wherein the reference index and/or the reference picture list is/are signaled as fields in the bitstream representation associated with one or more of the following: a sequence, a group of pictures, a picture, a tile, a tile group, a slice, a subpicture, a coding tree unit row, a coding tree unit, a virtual pipeline data unit (VPDU), or a video block.

A16. The method of clause A1, wherein the second set of color component values of the current video block are selectively derived from the first set of color component values, based on whether the current video block is a bi-prediction coded block.

A17. The method of clause A16, wherein the second set of color component values of the current video block are individually derived for each prediction direction associated with the first set of color component values.

A18. The method of clause A1, wherein the second set of color component values of the current video block are selectively derived from the first set of color component values, based on whether the current video block is associated with sub-block-based prediction.

A19. The method of clause A18, wherein the sub-block-based prediction corresponds to affine prediction or alternative temporal motion vector prediction (ATMVP).

A20. The method of any one or more of clauses A18-A19, wherein the second set of color component values of the current video block are derived for individual sub-blocks.

A21. The method of any one or more of clauses A18-A19, wherein the second set of color component values of the current video block are derived for an entirety of the current video block regardless of the sub-block-based prediction.

A22. The method of any one or more of clauses A18-A21, wherein the first set of color component values are selected based, at least in part on, a motion vector of a sub-block of the current video block.

A23. The method of any one or more of clauses A18-A21, wherein a motion vector associated with a sub-block of the current video block are used to select the first set of color component values.

A24. The method of any one or more of clauses A1-A23, wherein the first set of color component values are intermediate color component values.

A25. The method of any one or more of clauses A1-A24, wherein the LMCS mode processing step precedes another subsequent processing step.

A26. The method of clause A25, wherein the first set of color component values are selected based, at least in part on, an intermediate motion vector of the current video block or a sub-block of the current video block, and wherein the intermediate motion vector is calculated prior to the another video coding step.

A27. The method of any clause A26, wherein the another processing step includes one or a combination of the following: a Bi-Directional Optical Flow (BDOF) step, a decoder-side motion vector refinement (DMVR) step, or a prediction refinement optical flow (PROF) step.

A28. A method for visual media processing, comprising:
performing a conversion between a current video block of visual media data and a bitstream representation of the current video block, wherein, during the conversion, one or more reconstruction samples associated with a current frame of the visual media data are used to derive a chroma residual scaling factor in a luma mapping with chroma scaling (LMCS) mode processing step.

A29. The method of clause A28, wherein the current video block is intra block copy (IBC) coded.

A30. The method of clause A28, wherein the one or more reconstruction samples are reference samples in a reference block associated with the current frame.

A31. The method of clause A28, wherein locations of the one or more reconstruction samples are pre-defined.

A32. The method of clause A31, wherein the one or more reconstruction samples are reconstructed luma samples located at an above row and a left column that are adjacent to a block covering a corresponding luma block of the current video block.

A33. The method of clause A28, wherein locations of the one or more reconstruction samples are based on a position of a corresponding luma block of the current video block and a motion information of the current video block.

A34. A method for visual media processing, comprising:
performing a conversion between a current video block of visual media data and a bitstream representation of the current video block, wherein, during the conversion, one or more luma prediction samples or luma reconstruction samples in a current frame other than a reference frame and are used to derive a chroma residual scaling factor in a luma mapping with chroma scaling (LMCS) mode processing step.

A35. The method of any clause A34, wherein the one or more luma prediction samples or luma reconstruction samples are located in a neighboring region of a MxN luma block that covers a corresponding luma block.

A36. The method of clause A35, wherein the corresponding luma block is a collocated luma block of the current video block.

A37. The method of clause A36, wherein a product of M and N is smaller than a product of a block width and a block height of the collocated luma block of the current video block.

A38. The method of clause A36, wherein M and N are a predefined width and a predefined height of a video block that covers the collocated luma block of the current video block.

A39. The method of clause A36, wherein M and N are a width and a height of a virtual pipeline data unit (VPDU) that covers the collocated luma block of the current video block.

A40. The method of any one or more of clauses A1-A39, wherein, during the conversion, the reference samples are directly used or down sampled prior to use in derivation.

A41. The method of any or more of clauses A1-A40, wherein samples used in deriving chroma residual scaling factors are selected, based, at least in part on, one or more of the following information of the current video block: a quantization parameter, a coding mode, or a picture order count (POC).

A42. The method of any one or more of clauses A1-A41, wherein the current video block is an inter-coded block, an intra-coded block, a bi-prediction coded block, or an intra block copy (IBC) coded block.

A43. The method of any one or more of clauses A1-A42, wherein the first set of color component values correspond to luma sample values and the second set of color component values correspond to chroma scaling factors of the current video block.

A44. The method of any one or more of clauses A1-A43, wherein the conversion includes generating the bitstream representation from the current video block.

A45. The method of any one or more of clauses A1-A43, wherein the conversion includes generating pixel values of the current video block from the bitstream representation.

A46. A video encoder apparatus comprising a processor configured to implement a method recited in any one or more of clauses A1-A45.

A47. A video decoder apparatus comprising a processor configured to implement a method recited in any one or more of clauses A1-A45.

A48. A computer readable medium having code stored thereon, the code embodying processor-executable instructions for implementing a method recited in any one or more of clauses A1-A38.

Y1. A method for visual media processing, comprising:

checking, during a conversion between a current chroma video block and a bitstream representation of the current chroma video block, availability of one or more neighboring luma blocks of a corresponding luma block which covers a top-left sample of a collocated luma block;

determining, based on the availability of one or more neighboring luma blocks, whether to retrieve neighboring luma samples of the corresponding luma block;

deriving, based on the determining, a scaling coefficient;

scaling, based on the scaling coefficient, a chroma residual of the current chroma video block to generate a scaled chroma residual; and performing the conversion based on the scaled chroma residual.

Y2. The method of clause Y1, wherein the one or more neighboring luma blocks include a left neighboring luma block and an above neighboring luma block.

Y3. The method of clause Y1, wherein the neighboring luma samples includes one or more left neighboring sample columns and/or one or more above neighboring sample rows of the corresponding luma block.

Y4. The method of any one or more of clauses Y1 or Y3, wherein the neighboring luma samples are retrieved and rounding-based averaged to derive the scaling coefficient in a case that the one or more neighboring luma blocks are available.

Y5. The method of clause Y1 or Y3, wherein the neighboring luma samples are retrieved and a median value of the neighboring luma samples is used to derive the scaling coefficient in a case that the one or more neighboring luma blocks are available.

Y6. The method of clause Y3, wherein a number of neighboring luma samples is N, wherein 1<=N<=2W+2H, W and H are a width and a height of the corresponding luma block.

Y7. The method of clause Y1 or Y2, wherein availability of the one or more neighboring luma blocks is determined based on a width and/or a height of a current picture, a tile, a tile group, a virtual pipeline data unit (VPDU), or a slice.

Y8. The method of clause Y7, wherein the one or more neighboring luma blocks are unavailable in a case that the one or more neighboring block are located in a different picture, a different tile, a different tile grop, a different VPDU, or a different slice.

Y9. The method of clause Y1, wherein the neighboring luma samples of the corresponding are skipped from retrieval in a case that the one or more neighboring luma blocks are unavailable.

Y10. The method of clause Y9, wherein the scaling coefficient is derived in a case that the neighboring luma samples of the corresponding are skipped from retrieval.

Y11. The method of clause Y10, wherein the scaling coefficient is derived base on a default value.

Y12. The method of clause Y11, wherein the default value is based on a bit depth of the current chroma video block and the collocated luma block.

Y13. The method of clause Y12, wherein the default value is expressed as 1<<(bitDepth−1), where bitDepth denotes the bit depth of the current chroma video block and the collocated luma block.

Y14. The method of clause Y1, wherein the neighboring luma samples are reconstructed based on forward mapping.

B1. A method for visual media processing, comprising:

deriving, during a conversion between a current video block of visual media data and a bitstream representation of the current video block, a second set of color component values of the current video block from a first set of color component values of the visual media data using a model associated with a processing step, wherein the first set of color component values are neighboring samples of a corresponding luma block which covers a top-left sample of a collocated luma block.

B2. The method of clause B1, wherein the current video block is one of: an intra-coded video block having a dual tree partition or an intra-coded block having a single tree partition or an inter-coded video block having a single tree partition.

B3. The method of any one or more of clauses B1-B2, wherein the first set of color component values correspond to at least a portion of reference samples identified at positions external to the corresponding luma block.

B4. The method of clause B3, wherein the portion of reference samples identified at the positions external to the corresponding luma block include samples adjacent to the corresponding luma coding block.

B5. The method of clause B4, wherein the samples adjacent to the corresponding luma coding block include N samples located at left neighboring columns and/or above neighboring rows of the corresponding luma coding block, where N=1 . . . 2W+2H, W and H are a width and a height of the corresponding luma coding block.

B6. The method of clause B5, wherein an above neighboring luma sample is located at (xCb+W/2, yCb−1) or (xCb−1, yCb−1) when the top-left sample of the collocated luma block is located at (xCb, yCb).

B7. The method of clause B5, wherein a left neighboring luma sample is located at (xCb+W−1, yCb−1) when the top-left sample of the collocated luma block is located at (xCb, yCb).

B8. The method of clause B4, wherein the portion of reference samples identified at the positions external to the corresponding luma block are at pre-defined positions.

B9. The method of clause B4, wherein the second set of color component values of the current video block are derived based on a median or arithmetic mean of N samples located at left neighboring columns and/or above neighboring rows of the corresponding luma coding block.

B10. The method of any one or more of clauses B1-B2, wherein the second set of color component values of the current video block are selectively derived from the first set of color component values, based on availability of neighboring samples of the corresponding luma block.

B11. The method of clause B10, wherein the availability of the neighboring samples of the corresponding luma block is based on one or more of: a use of a coding mode of the current video block, a use of a coding mode of the neighboring samples of the corresponding luma block, a use of a type of a filter associated with the neighboring samples of the corresponding luma block, a location of the neighboring samples of the corresponding luma block relative to the current video blocks or sub-blocks thereof, a width of a current picture/subpicture/tile/tile group/VPDU/slice, and/or a height of a current picture/subpicture/tile/tile group/VPDU/slice/coding tree unit (CTU) row.

B12. The method of clause B10, further comprising:

in response to determining a lack of the availability of the neighboring samples of the corresponding luma block, substituting, filling, or padding unavailable samples with other samples.

B13. The method of clause B12, wherein the lack of the availability of the neighboring samples of the corresponding luma block is based at least in part on determining that when a coding mode of the current video block is inter mode, the coding mode of the neighbouring samples are intra mode and/or an intra block copy (IBC) mode and/or a combined inter-intra prediction (CIIP) mode and/or a localized illuminate compensation (LIC) mode.

B14. The method of clause B12, wherein the lack of the availability of the neighboring samples of the corresponding luma block is based at least in part on determining that when a coding mode of the current video block is inter mode, the neighbouring samples are subjected to a diffusion filter and/or a bilateral filter and/or a Hadamard transform filter.

B15. The method of clause B12, wherein the lack of the availability of the neighboring samples of the corresponding luma block is based at least in part on determining that a neighboring block is located outside a current picture/subpicture/tile/tile group/VPDU/slice/coding tree unit (CTU) row associated with the current video block.

B16. The method of any one or more of clauses B12-B15, further comprising:
in response to determining the lack of the availability of the neighboring samples of the corresponding luma block, disabling derivation of the second set of color component values of the current video block from the first set of color component values.

B17. The method of clause B10, further comprising:
in response to determining that a number of available neighboring samples is less than a threshold, disabling derivation of the second set of color component values of the current video block from the first set of color component values.

B18. The method of clause B17, wherein the threshold is one.

B19. The method of clause B12, wherein, if a neighboring sample is determined to be not available, then the neighboring sample is filled by 1<<(bitDepth−1) samples, where bitDepth denotes a bit depth of the first set of samples of color component values or the second set of samples of color component values.

B20. The method of clause B12, wherein, if a neighboring sample is determined to be not available, then the neighboring sample is substituted by a first available adjacent sample in accordance with a pre-defined checking order.

B21. The method of clause B13, wherein, if a neighboring sample is determined to be not available, then the neighboring sample is padded using one or more of: a left neighbouring sample, a right neighbouring sample, a top neighbouring sample, or a bottom neighbouring sample.

B22. The method of clause B10, further comprising:
applying a smoothing filter to samples neighboring the corresponding luma block that are used in derivation of the second set of color component values of the current video block.

B23. The method of clause, B22, wherein the smoothing filter includes one or more of the following: a bilateral filter, a Hadamard transform-based filter, or a forward mapping of reshaper domain.

B24. The method of any one or more of clauses B1-B23, wherein the second set of color component values of the current video block are stored for use in connection with one or more other video blocks.

B25. The method of any one or more of clauses B1-B23, wherein the model corresponds to a cross-component linear model (CCLM) and/or the processing step corresponds to a luma mapping with chroma scaling (LMCS) mode.

B26. The method of any one or more of clauses B1-B23, wherein the current video block is an intra-coded block, an inter-coded block, a bi-prediction coded block, or an intra block copy (IBC) coded block.

B27. The method of any one or more of clauses B1-B23, wherein the first set of color component values correspond to luma sample values and the second set of color component values correspond to chroma scaling factors of the current video block.

B28. The method of any one or more of clauses B1-B23, wherein the conversion includes generating the bitstream representation from the current video block.

B29. The method of any one or more of clauses B1-B23, wherein the conversion includes generating pixel values of the current video block from the bitstream representation.

B30. A video encoder apparatus comprising a processor configured to implement a method recited in any one or more of clauses B1-B23.

B31. A video decoder apparatus comprising a processor configured to implement a method recited in any one or more of clauses B1-B23.

B32. A computer readable medium having code stored thereon, the code embodying processor-executable instructions for implementing a method recited in any one or more of clauses B1-B23.

C1. A method for visual media processing, comprising:
during a conversion between a current chroma video block of visual media data and a bitstream representation of the current chroma video block, making a determination of selectively enabling or disabling application of a cross-component linear model (CCLM) and/or a chroma residual scaling (CRS) on the current chroma video block, based at least in part on one or more conditions associated with a collocated luma block of the current chroma video block.

C2. The method of clause C1, wherein the one or more conditions associated with the collocated luma block of the current chroma video block include: a partition size of the collocated luma block, a number of coding units of the collocated luma block achieving a threshold number, a top-left luma sample of the collocated luma block achieving a threshold size, a partition tree depth of the collocated luma block, or a corresponding luma block covering the top-left luma sample of the collocated luma block, a corresponding luma block covering the top-left luma sample of the collocated luma block and additionally included within a bounding box of pre-defined size, a coding mode of one or multiple coding units (CUs) covering at least one sample of the collocated luma block, and/or a dimension of the current chroma video block.

C3. The method of any one or more of clauses C1-C2, wherein the application of the CCLM and/or the CRS on the current chroma video block is disabled in response to determining that the collocated luma block of the current chroma video block is divided into multiple partitions.

C4. The method of any one or more of clauses C1-C2, wherein the application of the CCLM and/or the CRS on the current chroma video block is enabled in response to determining that the collocated luma block of the current chroma video block is not divided into multiple partitions.

C5. The method of any one or more of clauses C1-C2, wherein the application of the CCLM and/or the CRS on the current chroma video block is disabled in response to determining that the collocated luma block of the current chroma video block includes more than one of: a threshold number of coding units and/or a threshold number of partition units and/or a threshold number of transform units.

C6. The method of clause C5, wherein the threshold number is one.

C7. The method of clause C5, wherein the threshold number is based at least in part on whether the CCLM and/or the CRS is applied.

C8. The method of clause C5, wherein the threshold number is fixed or included in the bitstream representation.

C9. The method of clause C5, wherein the threshold number is based at least in part on profiles/levels/tiers associated with the current chroma video block.

C10. The method of clause C5, wherein the coding units and/or the partition units and/or the transform units are fully located within the collocated luma block.

C11. The method of clause C5, wherein the coding units and/or the partition units and/or the transform units are partially located within the collocated luma block.

C12. The method of clause C11, wherein the coding units and/or the partition units and/or the transform units are partially located along a boundary of the collocated luma block.

C13. The method of clause C5, wherein coding units and/or the partition units and/or the transform units are associated with sub-block-based prediction.

C14. The method of clause C13, wherein the sub-block-based prediction corresponds to Intra Sub-Partitions (ISP) or affine prediction or alternative temporal motion vector prediction (ATMVP).

C15. The method of any one or more of clauses C1-C2, wherein the application of the CCLM and/or the CRS on the current chroma video block is disabled in response to determining that a coding unit and/or a partition unit and/or a transform unit covering a top-left luma sample of the collocated luma block is larger than a pre-defined block size.

C16. The method of clause C15, wherein the collocated luma block is of size 32×32 and included within a corresponding luma block of size 64×64, and the pre-defined luma block size is 32×64.

C17. The method of clause C2, wherein the application of the CCLM and/or the CRS on the current chroma video block is enabled in response to determining that the collocated luma block of the current chroma video block is not split, and the corresponding luma block covering the top-left luma sample of the collocated luma block is entirely included within the bounding box of pre-defined size.

C18. The method of clause C17, wherein the corresponding luma block is of size 32×64 and the bounding box is of size 40×70.

C19. The method of clause C17, wherein the pre-defined size of the bounding box is based in part on a size of a coding tree unit (CTU) associated with the current chroma video block and/or a size of a coding unit (CU) associated with the current chroma video block.

C20. The method of any one or more of clauses C1-C2, wherein the collocated luma block of the current chroma video block is divided into multiple partitions and prediction samples or reconstructed samples inside one or more of the multiple partitions are used to derive values associated with the CRS of the current chroma video block.

C21. The method of clause C20, wherein an average of the prediction samples or the reconstructed samples inside a first partition of the collocated luma block of the current chroma video block is used to derive the values associated with the CRS of the current chroma video block.

C22. The method of clause C20, wherein a top-left prediction sample or a top-left reconstructed sample inside a first partition of the collocated luma block of the current chroma video block is used to derive the values associated with the CRS of the current chroma video block.

C23. The method of clause C20, wherein a center prediction sample or a center reconstructed sample inside a first partition of the collocated luma block of the current chroma video block is used to derive the color component values of the current chroma video block.

C24. The method of clause C2, wherein the application of the CCLM and/or the CRS on the current chroma video block is disabled in response to determining that the coding mode of the one or multiple coding units (CUs) covering the at least one sample of the collocated luma block is one of: an affine mode, a bi-prediction mode, a Bi-Directional Optical Flow (BDOF) mode, a DMVR mode, a matrix affine prediction mode, an inter mode, or an Intra Sub-Partitions (ISP) mode.

C25. The method of clause C2, wherein the one or multiple coding units (CUs) covering the at least one sample of the collocated luma block is the corresponding luma block.

C26. The method of any one or more of clauses C1-C25, further comprising:

indicating, based on a field in the bitstream representation, that the CCLM and/or the CRS is selectively enabled or disabled on the current chroma video block.

C27. The method of any one or more of clauses C1-C26, wherein the selectively enabling or disabling the application of the CCLM and/or the CRS on the current chroma video block is performed on one or more sub-blocks of the current chroma video block.

C28. The method of clause C27, wherein the one or more sub-blocks of the current chroma video block is of size 2×2 or 4×4.

C29. The method of clause C27, wherein the application of the CCLM and/or the CRS is enabled for a sub-block of the current chroma video block when the corresponding luma coding block of the current chroma video block covers all samples of a corresponding block of the subblock.

C30. The method of clause C27, wherein the application of the CCLM and/or the CRS is disabled for a sub-block of the current chroma video block when all samples of a corresponding block of the subblock are not covered by the corresponding luma coding block.

C31. The method of clause C27, wherein parameters of the CCLM and/or the CRS are associated with each sub-block of the current chroma video block.

C32. The method of clause C27, wherein the selectively enabling or disabling the application of the CCLM and/or the CRS on a sub-block of the current chroma video block is based on samples included within the collocated luma block.

C33. The method of any one or more of clauses C1-C32, wherein the current chroma video block is an inter-coded block, an intra-coded block, a bi-prediction coded block, or an intra block copy (IBC) coded block.

C34. The method of any one or more of clauses C1-C33, wherein the conversion includes generating the bitstream representation from the current chroma video block.

C35. The method of any one or more of clauses C1-C33, wherein the conversion includes generating pixel values of the current chroma video block from the bitstream representation.

C36. A video encoder apparatus comprising a processor configured to implement a method recited in any one or more of clauses C1-C33.

C37. A video decoder apparatus comprising a processor configured to implement a method recited in any one or more of clauses C1-C33.

C38. A computer readable medium having code stored thereon, the code embodying processor-executable instructions for implementing a method recited in any one or more of clauses C1-C33.

D1. A method for visual media encoding, comprising:

selectively enabling or disabling application of a luma dependent chroma residual scaling (CRS) on chroma components of a current video block of visual media data for encoding the current video block in a video region of a visual media data into a bitstream representation of the visual media data; and making a determination of including or excluding a field in the bitstream representation of the visual media data, wherein the field is indicative of the selectively enabling or disabling and, if included, is signaled, other than at a first syntax level associated with the current video block.

D2. A method for visual media decoding, comprising:

parsing a field in a bitstream representation of visual media data, wherein the field is included in a level other than at a first syntax level associated with a current video block; and selectively enabling or disabling, based on the field, application of a luma dependent chroma residual scaling (CRS) on chroma components of the current video block of visual media data for generating a decoded video region from the bitstream representation.

D3. The method of any one or more of clauses D1-D2, wherein the first syntax level is a tile group header level, and wherein the field is included at one of: a sequence parameter set (SPS) associated with the current video block, a tile associated with the current video block, a coding tree unit (CTU) row associated with the current video block, a coding tree unit (CTU) associated with the current video block, a virtual pipeline data unit (VPDU) associated with the current video block, or a coding unit (CU) associated with the current video block.

D4. The method of any one or more of clauses D1-D3, wherein the field is a flag denoted as chroma_residual_scale_flag.

D5. The method of any one or more of clauses D1-D4, wherein the field is associated with a syntax level, and wherein, if the field is one, the application of the luma dependent chroma residual scaling below the syntax level is enabled, and if the field is zero, the application of the luma dependent chroma residual scaling below the syntax level is disabled.

D6. The method of clause D5, wherein the field is associated with a partition node level, and wherein, if the field is one, the application of the luma dependent chroma residual scaling below the partition node level is enabled, and if the field is zero, the application of the luma dependent chroma residual scaling below the partition node level is disabled.

D7. The method of any one or more of clauses D1-D4, wherein the field is associated with a threshold dimension, and wherein, if the field is one, the application of the luma dependent chroma residual scaling for video blocks at or above the threshold dimension is enabled, and if the field is zero, the application of the luma dependent chroma residual scaling for video blocks below the threshold dimension is disabled.

D8. The method of clause D7, wherein the threshold dimension is 32×32.

D9. The method of any one or more of clauses D1-D8, wherein the field is not signaled in the bitstream representation and absence of the field in the bitstream representation is used to infer that the application of the luma dependent chroma residual scaling is disabled, and the field is inferred to be zero.

D10. The method of any one or more of clauses D1-D9, wherein values associated with the luma dependent CRS of the current video block are stored for use in connection with one or more other video blocks.

D11. The method of clause D10, wherein the values associated with the luma dependent CRS are derived subsequent to an encoding or decoding of a luma block.

D12. The method of clause D11, wherein, in the luma block, prediction samples and/or intermediate prediction samples and/or reconstructed samples and/or reconstructed samples before loop filtering are used to derive the values associated with the luma dependent CRS.

D13. The method of clause D12, wherein the loop filtering includes a use of: a deblocking filter and/or a sample adaptive offset (SAO) filter and/or a bilateral filter and/or a Hadamard transform filter and/or an adaptive loop filter (ALF).

D14. The method of clause D11, wherein samples in a bottom row and/or a right column of the luma block are used to derive the values associated with the luma dependent CRS.

D15. The method of clause D11, wherein samples associated with neighboring blocks are used to derive the values associated with the luma dependent CRS.

D16. The method of clause D15, wherein the current video block is an intra-coded block, an inter-coded block, a bi-prediction coded block, or an intra block copy (IBC) coded block.

D17. The method of clause D15, wherein availability of samples associated with the neighboring blocks is checked according to a pre-defined order.

D18. The method of clause D17, wherein the pre-defined order relative to the current video block is one of: left to right, above left to above right, left to above, above left to above right, above to left, above right to above left.

D19. The method of clause D17, wherein the pre-defined order relative to the current video block is one of: below left to left to above right to above to above left.

D20. The method of clause D17, wherein the pre-defined order relative to the current video block is one of: left to above to above right to below left to above left.

D21. The method of clause D17, wherein the pre-defined order is associated with samples in a first-available subset of the neighboring blocks.

D22. The method of clause D15, wherein, if the current video block is an inter-coded block and a neighboring block is an intra-coded block, an IBC-coded block, or a CIIP-coded block, then the samples associated with the neighboring block are determined to be unavailable.

D23. The method of clause D15, wherein, if the current video block is an CIIP-coded block and a neighboring block is an intra-coded block, an IBC-coded block, or a CIIP-coded block, then the samples associated with the neighboring block are determined to be unavailable.

D24. The method of clause D15, further comprising:

in response to determining that a number of the neighboring blocks is less than a threshold value, disabling derivation of the luma dependent CRS.

D25. The method of clause D24, wherein the threshold value is one.

D26. The method of clause D24, wherein, if a sample from a neighboring block is determined to be not available, then the sample is filled by 1<<(bitDepth−1) samples, where bitDepth denotes a bit depth of the chroma components or luma components.

E1. A method for visual media encoding, comprising:

selectively enabling or disabling application of a cross-component linear model (CCLM) on a current video block of visual media data for encoding the current video block into a bitstream representation of the visual media data; and making a determination of including or excluding a field in a bitstream representation of the visual media data, wherein the field is indicative of the selectively enabling or disabling and, if included, is signaled, other than at a first syntax level associated with the current video block.

E2. A method for visual media decoding, comprising:

parsing a field in a bitstream representation of visual media data, wherein the field is included a level other than at a first syntax level associated with a current video block; and selectively enabling or disabling, based on the field, application of a cross-component linear model (CCLM) on the current video block of visual media data for generating a decoded video region from the bitstream representation.

E3. The method of any one or more of clauses E1-E2, wherein the first syntax level is a sequence parameter set (SPS) level, and wherein the field is included at one of: a picture parameter set (PPS) associated with the current video block, a slice associated with the current video block, a picture header associated with the current video block, a tile associated with the current video block, a tile group associated with the current video block, a coding tree unit (CTU) row associated with the current video block, a coding tree unit (CTU) associated with the current video block, a virtual pipeline data unit (VPDU) associated with the current video block, or a coding unit (CU) associated with the current video block.

E4. The method of any one or more of clauses E1-E3, wherein the field is a flag denoted as cclm_flag.

E5. The method of clause any one or more of clauses E1-E4, wherein, absence of the field in the bitstream representation is used to infer that the application of the CCLM is disabled.

E6. The method of clause any one or more of clauses E1-E4, wherein, presence of the field in the bitstream representation is used to infer that the application of the CCLM is enabled.

E7. The method of clause E5, wherein, if a dimension of the current video block is less than or equal to a threshold dimension, the field is excluded in the bitstream representation, and thereby exclusion of the field is used to infer that the application of the CCLM is disabled.

E8. The method of clause E7, wherein the threshold dimension is 8×8.

F1. A video encoder apparatus comprising a processor configured to implement a method recited in any one or more of clauses X1-E8.

F2. A video decoder apparatus comprising a processor configured to implement a method recited in any one or more of clauses X1-E8.

F3. A computer readable medium having code stored thereon, the code embodying processor-executable instructions for implementing a method recited in any one or more of clauses X1-E8 .

In the present document, the term "video processing" or "visual media processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
determining, for a conversion between a chroma block of a video and a bitstream of the video, whether to enable or disable a cross-component linear model intra prediction on the chroma block, based on whether one or more luma video units which cover at least one sample of a corresponding luma region of the chroma block are coded with a subblock-based prediction mode, wherein the chroma block is in a dual tree structure in which a luma component and at least one chroma component have separate partition tree structures;
in response to the cross-component linear model intra prediction enabled, determining parameters of the cross-component linear model at least based on neighboring chroma samples of the chroma block;
applying the cross-component linear model to derive prediction values of the chroma block based on the parameters; and
performing the conversion based on the prediction values, wherein the parameters of the cross-component linear model are derived by following:
checking an availability of one or more neighboring chroma blocks of the chroma block;
finding R chroma samples from neighboring chroma samples in the one or more neighboring chroma blocks to determine the parameters of the cross-component linear model, wherein R is an integer greater than 2, and wherein at least one neighboring chroma sample does not belong to the R chroma samples based on a size of the chroma block.

2. The method of claim 1, wherein the subblock-based prediction mode corresponds to an intra sub-partitions mode.

3. The method of claim 1, wherein the cross-component linear model is disabled in response to the one or more luma video units being coded with the subblock- based prediction mode.

4. The method of claim 1, wherein whether to enable or disable the cross-component linear model intra prediction on the chroma block is further based on partition information of the one or more luma video units.

5. The method of claim 4, wherein the partition information includes a partition tree depth of the one or more luma video units.

6. The method of claim 5, wherein the partition tree depth is a quadtree depth.

7. The method of claim 1, wherein whether to enable or disable the cross-component linear model intra prediction on the chroma block is further based on a block dimension of one or more chroma video units which cover at least one sample of a corresponding chroma region of the chroma block.

8. The method of claim 1, wherein whether to enable or disable the cross-component linear model intra prediction on the chroma block is further based on whether the one or more luma video units are split from multi-type partition tree operation different from a quadtree partition operation.

9. The method of claim 1, wherein in response to the one or more neighboring chroma blocks being unavailable, the prediction values of the chroma block are set to 1<< (bitDepth−1), where bitDepth is a bit depth of the video.

10. The method of claim 1, wherein the conversion includes encoding the chroma block into the bitstream.

11. The method of claim 1, wherein the conversion includes decoding the chroma block from the bitstream.

12. An apparatus for processing video data comprising a processor and a non-transitory memory with instructions thereon, wherein the instructions upon execution by the processor, cause the processor to:
determine, for a conversion between a chroma block of a video and a bitstream of the video, whether to enable or disable a cross-component linear model intra prediction on the chroma block, based on whether one or more luma video units which cover at least one sample of a corresponding luma region of the chroma block are coded with a subblock-based prediction mode, wherein the chroma block is in a dual tree structure in which a luma component and at least one chroma component have separate partition tree structures;

in response to the cross-component linear model intra prediction enabled, determine parameters of the cross-component linear model at least based on neighboring chroma samples of the chroma block;

apply the cross-component linear model to derive prediction values of the chroma block based on the parameters; and perform the conversion based on the prediction values, wherein the parameters of the cross-component linear model are derived by following:

checking an availability of one or more neighboring chroma blocks of the chroma block:

finding R chroma samples from neighboring chroma samples in the one or more neighboring chroma blocks to determine the parameters of the cross-component linear model, wherein R is an integer greater than 2, and wherein at least one neighboring chroma sample does not belong to the R chroma samples based on a size of the chroma block.

13. The apparatus of claim 12, wherein the subblock-based prediction mode corresponds to an intra sub-partitions mode.

14. The apparatus of claim 12, wherein whether to enable or disable the cross-component linear model intra prediction on the chroma block is further based on partition information of the one or more luma video units, the partition information includes a partition tree depth of the one or more luma video units, and the partition tree depth is a quadtree depth.

15. The apparatus of claim 12, wherein in response to the one or more neighboring chroma blocks being unavailable, the prediction values of the chroma block are set to 1<<(bitDepth−1), where bitDepth is a bit depth of the video.

16. A non-transitory computer-readable storage medium storing instructions that cause a processor to:

determine, for a conversion between a chroma block of a video and a bitstream of the video, whether to enable or disable a cross-component linear model intra prediction on the chroma block, based on whether one or more luma video units which cover at least one sample of a corresponding luma region of the chroma block are coded with a subblock-based prediction mode, wherein the chroma block is in a dual tree structure in which a luma component and at least one chroma component have separate partition tree structures;

in response to the cross-component linear model intra prediction enabled, determine parameters of the cross-component linear model at least based on neighboring chroma samples of the chroma block;

apply the cross-component linear model to derive prediction values of the chroma block based on the parameters; and perform the conversion based on the prediction values, wherein the parameters of the cross-component linear model are derived by following:

checking an availability of one or more neighboring chroma blocks of the chroma block:

finding R chroma samples from neighboring chroma samples in the one or more neighboring chroma blocks to determine the parameters of the cross-component linear model, wherein R is an integer greater than 2, and wherein at least one neighboring chroma sample does not belong to the R chroma samples based on a size of the chroma block.

17. The non-transitory computer-readable storage medium of claim 16, wherein the subblock-based prediction mode corresponds to an intra sub-partitions mode.

18. The non-transitory computer-readable storage medium of claim 16, wherein whether to enable or disable the cross-component linear model intra prediction on the chroma block is further based on partition information of the one or more luma video units, the partition information includes a partition tree depth of the one or more luma video units, and the partition tree depth is a quadtree depth.

19. A non-transitory computer-readable recording medium storing a bitstream of a video which is generated by a method performed by a video processing apparatus, wherein the method comprises:

determining, whether to enable or disable a cross-component linear model intra prediction on a chroma block of a video, based on whether one or more luma video units which cover at least one sample of a corresponding luma region of the chroma block are coded with a subblock-based prediction mode, wherein the chroma block is in a dual tree structure in which a luma component and at least one chroma component have separate partition tree structures;

in response to the cross-component linear model intra prediction enabled, determining parameters of the cross-component linear model at least based on neighboring chroma samples of the chroma block;

applying the cross-component linear model to derive prediction values of the chroma block based on the parameters; and generating the bitstream of the video based on the determining, wherein the parameters of the cross-component linear model are derived by following:

checking an availability of one or more neighboring chroma blocks of the chroma block;

finding R chroma samples from neighboring chroma samples in the one or more neighboring chroma blocks to determine the parameters of the cross-component linear model, wherein R is an integer greater than 2, and wherein at least one neighboring chroma sample does not belong to the R chroma samples based on a size of the chroma block.

20. The non-transitory computer-readable recording medium of claim 19, wherein the subblock-based prediction mode corresponds to an intra sub-partitions mode, and whether to enable or disable the cross-component linear model intra prediction on the chroma block is further based on partition information of the one or more luma video units, the partition information includes a partition tree depth of the one or more luma video units, and the partition tree depth is a quadtree depth.

* * * * *